US010300690B2

(12) United States Patent
Landa et al.

(10) Patent No.: US 10,300,690 B2
(45) Date of Patent: *May 28, 2019

(54) INK FILM CONSTRUCTIONS

(71) Applicant: LANDA CORPORATION LTD., Rehovot (IL)

(72) Inventors: Benzion Landa, Nes Ziona (IL); Sagi Abramovich, Ra'anana (IL); Galia Golodetz, Rehovot (IL); Gregory Nakhmanovich, Rishon Lezion (IL); Alon Asher, Tel Aviv (IL); Mattetyahu Litvak, Tel Aviv (IL)

(73) Assignee: LANDA CORPORATION LTD., Rehovot ( * ) Notice: Subject to any disclaimer, the term of this patent is extended or adjusted under 35 U.S.C. 154(b) by 161 days.

This patent is subject to a terminal disclaimer.

(21) Appl. No.: 15/083,204

(22) Filed: Mar. 28, 2016

(65) Prior Publication Data

US 2016/0297190 A1  Oct. 13, 2016

Related U.S. Application Data

(63) Continuation of application No. 14/382,875, filed as application No. PCT/IB2013/000822 on Mar. 5, 2013, now Pat. No. 9,327,496.

(Continued)

(51) Int. Cl.
*B41J 2/01* (2006.01)
*B41M 5/03* (2006.01)
(Continued)

(52) U.S. Cl.
CPC ..................... *B41J 2/01* (2013.01); *B32B 3/10* (2013.01); *B32B 5/02* (2013.01); *B41M 5/0256* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 2,839,181 A   6/1958  Renner
3,697,551 A  10/1972  Thomson
(Continued)

FOREIGN PATENT DOCUMENTS

CN  1200085 A  11/1998
CN  1324901 A  12/2001
(Continued)

OTHER PUBLICATIONS

JP H06100807 Machine Translation (by EPO and Google)—published Apr. 12, 1994; Seiko Instr Inc.
(Continued)

*Primary Examiner* — Manish S Shah
(74) *Attorney, Agent, or Firm* — Marc Van Dyke; Fourth Dimension IP

(57) ABSTRACT

An ink film construction including: (a) a first printing substrate selected from the group consisting of an uncoated fibrous printing substrate, a commodity coated fibrous printing substrate, and a plastic printing substrate; and (b) an ink dot set contained within a square geometric projection projecting on the first printing substrate, the ink dot set containing at least 10 distinct ink dots, fixedly adhered to a surface of the first printing substrate, all the ink dots within the square geometric projection being counted as individual members of the set, each of the ink dots containing at least one colorant dispersed in an organic polymeric resin, each of the dots having an average thickness of less than 2,000 nm, and a diameter of 5 to 300 micrometers; each ink dot of the ink dots having a generally convex shape in which a
(Continued)

deviation from convexity, ($DC_{dot}$), is defined by: $DC_{dot}=1-AA/CSA$, AA being a calculated projected area of the dot, the area disposed generally parallel to the first fibrous printing substrate; and CSA being a surface area of a convex shape that minimally bounds a contour of the projected area; wherein a mean deviation from convexity ($DC_{dot\ mean}$) of the ink dot set is at most 0.05.

15 Claims, 26 Drawing Sheets

Related U.S. Application Data

(60) Provisional application No. 61/645,085, filed on May 10, 2012, provisional application No. 61/645,086, filed on May 10, 2012, provisional application No. 61/645,075, filed on May 10, 2012, provisional application No. 61/645,076, filed on May 10, 2012, provisional application No. 61/645,077, filed on May 10, 2012, provisional application No. 61/641,653, filed on May 2, 2012, provisional application No. 61/641,258, filed on May 1, 2012, provisional application No. 61/641,223, filed on May 1, 2012, provisional application No. 61/641,133, filed on May 1, 2012, provisional application No. 61/640,881, filed on May 1, 2012, provisional application No. 61/640,493, filed on Apr. 30, 2012, provisional application No. 61/619,349, filed on Apr. 2, 2012, provisional application No. 61/619,372, filed on Apr. 2, 2012, provisional application No. 61/611,570, filed on Mar. 15, 2012, provisional application No. 61/611,567, filed on Mar. 15, 2012, provisional application No. 61/611,557, filed on Mar. 15, 2012, provisional application No. 61/607,537, filed on Mar. 6, 2012, provisional application No. 61/606,985, filed on Mar. 5, 2012, provisional application No. 61/606,913, filed on Mar. 5, 2012.

(51) Int. Cl.

| | | |
|---|---|---|
| *B32B 3/10* | (2006.01) | |
| *B32B 5/02* | (2006.01) | |
| *C09D 11/322* | (2014.01) | |
| *B41M 5/025* | (2006.01) | |
| *C09D 11/324* | (2014.01) | |
| *C09D 133/08* | (2006.01) | |
| *C09D 175/08* | (2006.01) | |
| *C09D 183/04* | (2006.01) | |
| *D21H 19/58* | (2006.01) | |
| *D21H 19/62* | (2006.01) | |
| *D06Q 1/00* | (2006.01) | |
| *D06P 3/00* | (2006.01) | |
| *B05D 1/00* | (2006.01) | |
| *D06P 1/00* | (2006.01) | |

(52) U.S. Cl.
CPC ............. *B41M 5/03* (2013.01); *C09D 11/322* (2013.01); *C09D 11/324* (2013.01); *C09D 133/08* (2013.01); *C09D 175/08* (2013.01); *C09D 183/04* (2013.01); *D21H 19/58* (2013.01); *D21H 19/62* (2013.01); *B05D 1/00* (2013.01); *D06P 1/00* (2013.01); *D06P 3/00* (2013.01); *D06Q 1/00* (2013.01); *Y10T 428/24802* (2015.01); *Y10T 428/24934* (2015.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; C09D 11/36; C09D 11/40; C09D 11/30; C09D 11/38; C09D 11/32; C09D 11/322; C09D 11/324; C09D 11/101; C09D 11/102; C09D 11/005; C09D 11/54; C09D 11/52; C09D 11/328; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| | | |
|---|---|---|
| 3,898,670 A | 8/1975 | Erikson et al. |
| 3,947,113 A | 3/1976 | Buchan et al. |
| 4,009,958 A | 3/1977 | Kurita et al. |
| 4,093,764 A | 6/1978 | Duckett et al. |
| 4,293,866 A | 10/1981 | Takita et al. |
| 4,401,500 A | 8/1983 | Hamada et al. |
| 4,535,694 A | 8/1985 | Fukuda |
| 4,538,156 A | 8/1985 | Durkee et al. |
| 4,642,654 A | 2/1987 | Toganoh et al. |
| 4,853,737 A | 8/1989 | Hartley et al. |
| 4,976,197 A | 12/1990 | Yamanari et al. |
| 5,012,072 A | 4/1991 | Martin et al. |
| 5,039,339 A | 8/1991 | Phan et al. |
| 5,099,256 A | 3/1992 | Anderson |
| 5,106,417 A | 4/1992 | Hauser et al. |
| 5,128,091 A | 7/1992 | Agur et al. |
| 5,190,582 A | 3/1993 | Shinozuka et al. |
| 5,198,835 A | 3/1993 | Ando et al. |
| 5,246,100 A | 9/1993 | Stone et al. |
| 5,305,099 A | 4/1994 | Morcos |
| 5,352,507 A | 10/1994 | Bresson et al. |
| 5,406,884 A | 4/1995 | Okuda et al. |
| 5,471,233 A | 11/1995 | Okamoto et al. |
| 5,552,875 A | 9/1996 | Sagiv et al. |
| 5,587,779 A | 12/1996 | Heeren et al. |
| 5,608,004 A | 3/1997 | Toyoda et al. |
| 5,613,669 A | 3/1997 | Grueninger |
| 5,614,933 A | 3/1997 | Hindman et al. |
| 5,623,296 A | 4/1997 | Fujino et al. |
| 5,660,108 A | 8/1997 | Pensavecchia |
| 5,677,719 A | 10/1997 | Granzow |
| 5,679,463 A | 10/1997 | Visser et al. |
| 5,698,018 A | 12/1997 | Bishop et al. |
| 5,723,242 A | 3/1998 | Woo et al. |
| 5,733,698 A | 3/1998 | Lehman et al. |
| 5,736,250 A | 4/1998 | Heeks et al. |
| 5,772,746 A | 6/1998 | Sawada et al. |
| 5,777,576 A | 7/1998 | Zur et al. |
| 5,777,650 A | 7/1998 | Blank |
| 5,841,456 A | 11/1998 | Takei et al. |
| 5,859,076 A | 1/1999 | Kozma et al. |
| 5,880,214 A | 3/1999 | Okuda |
| 5,883,144 A | 3/1999 | Bambara et al. |
| 5,883,145 A | 3/1999 | Hurley et al. |
| 5,884,559 A | 3/1999 | Okubo et al. |
| 5,891,934 A | 4/1999 | Moffatt et al. |
| 5,895,711 A | 4/1999 | Yamaki et al. |
| 5,902,841 A | 5/1999 | Jaeger et al. |
| 5,923,929 A | 7/1999 | Ben et al. |
| 5,929,129 A | 7/1999 | Feichtinger |
| 5,932,659 A | 8/1999 | Bambara et al. |
| 5,935,751 A | 8/1999 | Matsuoka et al. |
| 5,978,631 A | 11/1999 | Lee |
| 5,978,638 A | 11/1999 | Tanaka et al. |
| 5,991,590 A | 11/1999 | Chang et al. |
| 6,004,647 A | 12/1999 | Bambara et al. |

(56) References Cited

U.S. PATENT DOCUMENTS

| | | |
|---|---|---|
| 6,009,284 A | 12/1999 | Weinberger et al. |
| 6,024,018 A | 2/2000 | Darel et al. |
| 6,024,786 A | 2/2000 | Gore |
| 6,033,049 A | 3/2000 | Fukuda |
| 6,045,817 A | 4/2000 | Ananthapadmanabhan et al. |
| 6,053,438 A | 4/2000 | Romano, Jr. et al. |
| 6,055,396 A | 4/2000 | Pang |
| 6,059,407 A | 5/2000 | Komatsu et al. |
| 6,071,368 A | 6/2000 | Boyd et al. |
| 6,094,558 A | 7/2000 | Shimizu et al. |
| 6,102,538 A | 8/2000 | Ochi et al. |
| 6,103,775 A | 8/2000 | Bambara et al. |
| 6,108,513 A | 8/2000 | Landa et al. |
| 6,132,541 A | 10/2000 | Heaton |
| 6,143,807 A | 11/2000 | Lin et al. |
| 6,166,105 A | 12/2000 | Santilli et al. |
| 6,195,112 B1 | 2/2001 | Fassler et al. |
| 6,196,674 B1 | 3/2001 | Takemoto |
| 6,213,580 B1 | 4/2001 | Segerstrom et al. |
| 6,214,894 B1 | 4/2001 | Bambara et al. |
| 6,221,928 B1 | 4/2001 | Kozma et al. |
| 6,234,625 B1 | 5/2001 | Wen |
| 6,242,503 B1 | 6/2001 | Kozma et al. |
| 6,257,716 B1 | 7/2001 | Yanagawa et al. |
| 6,261,688 B1 | 7/2001 | Kaplan et al. |
| 6,262,137 B1 | 7/2001 | Kozma et al. |
| 6,262,207 B1 | 7/2001 | Rao et al. |
| 6,303,215 B1 | 10/2001 | Sonobe et al. |
| 6,316,512 B1 | 11/2001 | Bambara et al. |
| 6,332,943 B1 | 12/2001 | Herrmann et al. |
| 6,354,700 B1 | 3/2002 | Roth |
| 6,357,870 B1 | 3/2002 | Beach et al. |
| 6,358,660 B1 | 3/2002 | Agler et al. |
| 6,363,234 B2 | 3/2002 | Landa et al. |
| 6,364,451 B1 | 4/2002 | Silverbrook |
| 6,383,278 B1 | 5/2002 | Hirasa et al. |
| 6,386,697 B1 | 5/2002 | Yamamoto et al. |
| 6,390,617 B1 | 5/2002 | Iwao |
| 6,397,034 B1 | 5/2002 | Tarnawskyj et al. |
| 6,402,317 B2 | 6/2002 | Yanagawa et al. |
| 6,409,331 B1 | 6/2002 | Gelbart |
| 6,432,501 B1 | 8/2002 | Yang et al. |
| 6,438,352 B1 | 8/2002 | Landa et al. |
| 6,454,378 B1 | 9/2002 | Silverbrook et al. |
| 6,471,803 B1 | 10/2002 | Pelland et al. |
| 6,530,321 B2 | 3/2003 | Andrew et al. |
| 6,530,657 B2 | 3/2003 | Polierer |
| 6,531,520 B1 | 3/2003 | Bambara et al. |
| 6,551,394 B2 | 4/2003 | Hirasa et al. |
| 6,551,716 B1 | 4/2003 | Landa et al. |
| 6,559,969 B1 | 5/2003 | Lapstun |
| 6,575,547 B2 | 6/2003 | Sakuma |
| 6,586,100 B1 | 7/2003 | Pickering et al. |
| 6,590,012 B2 | 7/2003 | Miyabayashi |
| 6,608,979 B1 | 8/2003 | Landa et al. |
| 6,623,817 B1 | 9/2003 | Yang et al. |
| 6,630,047 B2 | 10/2003 | Jing et al. |
| 6,639,527 B2 | 10/2003 | Johnson |
| 6,648,468 B2 | 11/2003 | Shinkoda et al. |
| 6,678,068 B1 | 1/2004 | Richter et al. |
| 6,682,189 B2 | 1/2004 | May et al. |
| 6,685,769 B1 | 2/2004 | Karl et al. |
| 6,704,535 B2 | 3/2004 | Kobayashi et al. |
| 6,709,096 B1 | 3/2004 | Beach et al. |
| 6,716,562 B2 | 4/2004 | Uehara et al. |
| 6,719,423 B2 | 4/2004 | Chowdry et al. |
| 6,720,367 B2 | 4/2004 | Taniguchi et al. |
| 6,755,519 B2 | 6/2004 | Gelbart et al. |
| 6,761,446 B2 | 7/2004 | Chowdry et al. |
| 6,770,331 B1 | 8/2004 | Mielke et al. |
| 6,789,887 B2 | 9/2004 | Yang et al. |
| 6,827,018 B1 | 12/2004 | Hartmann et al. |
| 6,881,458 B2 * | 4/2005 | Ludwig ................. B41M 5/52 428/32.17 |
| 6,898,403 B2 | 5/2005 | Baker et al. |
| 6,912,952 B1 | 7/2005 | Landa et al. |
| 6,916,862 B2 | 7/2005 | Ota et al. |
| 6,917,437 B1 | 7/2005 | Myers et al. |
| 6,970,674 B2 | 11/2005 | Sato et al. |
| 6,974,022 B2 | 12/2005 | Saeki |
| 6,982,799 B2 | 1/2006 | Lapstun |
| 7,025,453 B2 * | 4/2006 | Ylitalo ................. B41M 5/0011 347/101 |
| 7,057,760 B2 | 6/2006 | Lapstun et al. |
| 7,084,202 B2 | 8/2006 | Pickering et al. |
| 7,128,412 B2 | 10/2006 | King et al. |
| 7,160,377 B2 | 1/2007 | Zoch et al. |
| 7,204,584 B2 | 4/2007 | Lean et al. |
| 7,224,478 B1 | 5/2007 | Lapstun et al. |
| 7,271,213 B2 | 9/2007 | Hoshida et al. |
| 7,296,882 B2 | 11/2007 | Buehler et al. |
| 7,300,133 B1 | 11/2007 | Folkins et al. |
| 7,300,147 B2 | 11/2007 | Johnson |
| 7,304,753 B1 | 12/2007 | Richter et al. |
| 7,322,689 B2 | 1/2008 | Kohne et al. |
| 7,360,887 B2 | 4/2008 | Konno |
| 7,362,464 B2 | 4/2008 | Kitazawa |
| 7,459,491 B2 | 12/2008 | Tyvoll et al. |
| 7,527,359 B2 | 5/2009 | Stevenson et al. |
| 7,575,314 B2 * | 8/2009 | Desie ................. C09D 11/101 347/100 |
| 7,612,125 B2 | 11/2009 | Muller et al. |
| 7,655,707 B2 | 2/2010 | Ma |
| 7,655,708 B2 | 2/2010 | House et al. |
| 7,699,922 B2 | 4/2010 | Breton et al. |
| 7,708,371 B2 | 5/2010 | Yamanobe |
| 7,709,074 B2 | 5/2010 | Uchida et al. |
| 7,712,890 B2 | 5/2010 | Yahiro |
| 7,732,543 B2 | 6/2010 | Loch et al. |
| 7,732,583 B2 | 6/2010 | Annoura et al. |
| 7,808,670 B2 | 10/2010 | Lapstun et al. |
| 7,810,922 B2 | 10/2010 | Gervasi et al. |
| 7,845,788 B2 | 12/2010 | Oku |
| 7,867,327 B2 | 1/2011 | Sano et al. |
| 7,876,345 B2 | 1/2011 | Houjou |
| 7,910,183 B2 | 3/2011 | Wu |
| 7,919,544 B2 | 4/2011 | Matsuyama et al. |
| 7,942,516 B2 | 5/2011 | Ohara et al. |
| 7,977,408 B2 | 7/2011 | Matsuyama et al. |
| 7,985,784 B2 | 7/2011 | Kanaya et al. |
| 8,002,400 B2 | 8/2011 | Kibayashi et al. |
| 8,012,538 B2 | 9/2011 | Yokouchi |
| 8,042,906 B2 | 10/2011 | Chiwata et al. |
| 8,059,309 B2 | 11/2011 | Lapstun et al. |
| 8,095,054 B2 | 1/2012 | Nakamura |
| 8,109,595 B2 | 2/2012 | Tanaka et al. |
| 8,147,055 B2 | 4/2012 | Cellura et al. |
| 8,177,351 B2 | 5/2012 | Taniuchi et al. |
| 8,186,820 B2 | 5/2012 | Chiwata |
| 8,192,904 B2 | 6/2012 | Nagai et al. |
| 8,215,762 B2 | 7/2012 | Ageishi |
| 8,242,201 B2 | 8/2012 | Goto et al. |
| 8,256,857 B2 | 9/2012 | Folkins et al. |
| 8,263,683 B2 | 9/2012 | Gibson et al. |
| 8,264,135 B2 | 9/2012 | Ozolins et al. |
| 8,295,733 B2 | 10/2012 | Imoto |
| 8,303,072 B2 | 11/2012 | Shibata et al. |
| 8,304,043 B2 | 11/2012 | Nagashima et al. |
| 8,353,589 B2 | 1/2013 | Ikeda et al. |
| 8,474,963 B2 | 7/2013 | Hasegawa et al. |
| 8,536,268 B2 | 9/2013 | Karjala et al. |
| 8,546,466 B2 | 10/2013 | Yamashita et al. |
| 8,556,400 B2 | 10/2013 | Yatake et al. |
| 8,693,032 B2 | 4/2014 | Goddard et al. |
| 8,711,304 B2 | 4/2014 | Mathew et al. |
| 8,714,731 B2 | 5/2014 | Leung et al. |
| 8,746,873 B2 | 6/2014 | Tsukamoto et al. |
| 8,779,027 B2 | 7/2014 | Idemura et al. |
| 8,802,221 B2 | 8/2014 | Noguchi et al. |
| 8,894,198 B2 | 11/2014 | Hook et al. |
| 8,919,946 B2 | 12/2014 | Suzuki et al. |
| 9,186,884 B2 | 11/2015 | Landa et al. |
| 9,229,664 B2 | 1/2016 | Landa et al. |
| 9,327,496 B2 | 5/2016 | Landa et al. |

(56) References Cited

U.S. PATENT DOCUMENTS

| | | |
|---|---|---|
| 9,353,273 B2 | 5/2016 | Landa et al. |
| 9,505,208 B2 | 11/2016 | Shmaiser et al. |
| 9,517,618 B2 | 12/2016 | Landa et al. |
| 9,566,780 B2 | 2/2017 | Landa et al. |
| 9,568,862 B2 | 2/2017 | Shmaiser et al. |
| 9,643,400 B2 | 5/2017 | Landa et al. |
| 9,643,403 B2 | 5/2017 | Landa et al. |
| 9,776,391 B2 | 10/2017 | Landa et al. |
| 9,782,993 B2 | 10/2017 | Landa et al. |
| 9,849,667 B2 | 12/2017 | Landa et al. |
| 9,902,147 B2 | 2/2018 | Shmaiser et al. |
| 9,914,316 B2 | 3/2018 | Landa et al. |
| 2001/0022607 A1 | 9/2001 | Takahashi et al. |
| 2002/0041317 A1 | 4/2002 | Kazhiwazaki |
| 2002/0064404 A1 | 5/2002 | Iwai |
| 2002/0102374 A1 | 8/2002 | Gervasi et al. |
| 2002/0150408 A1 | 10/2002 | Mosher et al. |
| 2002/0164494 A1 | 11/2002 | Grant et al. |
| 2002/0197481 A1 | 12/2002 | Jing et al. |
| 2003/0004025 A1 | 1/2003 | Okuno et al. |
| 2003/0018119 A1 | 1/2003 | Frenkel et al. |
| 2003/0032700 A1 | 2/2003 | Morrison et al. |
| 2003/0054139 A1 | 3/2003 | Ylitalo et al. |
| 2003/0055129 A1 | 3/2003 | Alford |
| 2003/0118381 A1 | 6/2003 | Law |
| 2003/0129435 A1 | 7/2003 | Blankenship et al. |
| 2003/0186147 A1 | 10/2003 | Pickering et al. |
| 2003/0214568 A1 | 11/2003 | Nishikawa et al. |
| 2003/0234849 A1 | 12/2003 | Pan et al. |
| 2004/0003863 A1 | 1/2004 | Eckhardt |
| 2004/0020382 A1 | 2/2004 | McLean et al. |
| 2004/0087707 A1 | 5/2004 | Zoch et al. |
| 2004/0228642 A1 | 11/2004 | Iida et al. |
| 2004/0229976 A1 | 11/2004 | Kakiuchi et al. |
| 2004/0246324 A1 | 12/2004 | Nakashima |
| 2004/0246326 A1 | 12/2004 | Dwyer et al. |
| 2005/0031807 A1 | 2/2005 | Quintens et al. |
| 2005/0082146 A1 | 4/2005 | Axmann |
| 2005/0110855 A1 | 5/2005 | Taniuchi et al. |
| 2005/0134874 A1 | 6/2005 | Overall et al. |
| 2005/0150408 A1 | 7/2005 | Hesterman |
| 2005/0235870 A1 | 10/2005 | Ishihara |
| 2005/0266332 A1 | 12/2005 | Pavlisko et al. |
| 2005/0272334 A1 | 12/2005 | Wang et al. |
| 2006/0135709 A1 | 6/2006 | Hasegawa et al. |
| 2006/0164488 A1 | 7/2006 | Taniuchi et al. |
| 2006/0164489 A1 | 7/2006 | Vega et al. |
| 2006/0233578 A1 | 10/2006 | Maki et al. |
| 2007/0014595 A1 | 1/2007 | Kawagoe |
| 2007/0029171 A1 | 2/2007 | Nemedi |
| 2007/0120927 A1 | 5/2007 | Snyder et al. |
| 2007/0134030 A1 | 6/2007 | Lior et al. |
| 2007/0146462 A1 | 6/2007 | Taniuchi et al. |
| 2007/0176995 A1 | 8/2007 | Kadomatsu et al. |
| 2007/0189819 A1 | 8/2007 | Uehara et al. |
| 2007/0229639 A1 | 10/2007 | Yahiro |
| 2007/0285486 A1 | 12/2007 | Harris et al. |
| 2008/0006176 A1 | 1/2008 | Houjou |
| 2008/0030536 A1 | 2/2008 | Furukawa et al. |
| 2008/0032072 A1 | 2/2008 | Taniuchi et al. |
| 2008/0044587 A1 | 2/2008 | Maeno et al. |
| 2008/0055356 A1 | 3/2008 | Yamanobe |
| 2008/0055381 A1 | 3/2008 | Doi et al. |
| 2008/0074462 A1 | 3/2008 | Hirakawa |
| 2008/0112912 A1 | 5/2008 | Springob et al. |
| 2008/0118657 A1 | 5/2008 | Taverizatshy et al. |
| 2008/0138546 A1 | 6/2008 | Soria et al. |
| 2008/0166495 A1 | 7/2008 | Maeno et al. |
| 2008/0167185 A1 | 7/2008 | Hirota |
| 2008/0196612 A1 | 8/2008 | Rancourt et al. |
| 2008/0196621 A1 | 8/2008 | Ikuno et al. |
| 2009/0022504 A1 | 1/2009 | Kuwabara et al. |
| 2009/0041932 A1 | 2/2009 | Ishizuka et al. |
| 2009/0074492 A1 | 3/2009 | Ito |
| 2009/0080949 A1 | 3/2009 | Yamanobe et al. |
| 2009/0082503 A1 | 3/2009 | Yanagi et al. |
| 2009/0087565 A1 | 4/2009 | Houjou |
| 2009/0098385 A1 | 4/2009 | Kaemper et al. |
| 2009/0116885 A1 | 5/2009 | Ando |
| 2009/0165937 A1 | 7/2009 | Inoue et al. |
| 2009/0190951 A1 | 7/2009 | Torimaru et al. |
| 2009/0202275 A1 | 8/2009 | Nishida et al. |
| 2009/0211490 A1 | 8/2009 | Ikuno et al. |
| 2009/0237479 A1 | 9/2009 | Yamashita et al. |
| 2009/0256896 A1 | 10/2009 | Scarlata |
| 2009/0279170 A1 | 11/2009 | Miyazaki et al. |
| 2009/0315926 A1 | 12/2009 | Yamanobe |
| 2009/0317555 A1 | 12/2009 | Hori |
| 2009/0318591 A1 | 12/2009 | Ageishi et al. |
| 2010/0012023 A1 | 1/2010 | Lefevre et al. |
| 2010/0066796 A1 | 3/2010 | Yanagi et al. |
| 2010/0075843 A1 | 3/2010 | Ikuno et al. |
| 2010/0086692 A1 | 4/2010 | Ohta et al. |
| 2010/0091064 A1 | 4/2010 | Araki et al. |
| 2010/0111577 A1 | 5/2010 | Soria et al. |
| 2010/0231623 A1 | 9/2010 | Hirato |
| 2010/0239789 A1 | 9/2010 | Umeda |
| 2010/0282100 A1 | 11/2010 | Okuda et al. |
| 2010/0285221 A1 | 11/2010 | Oki et al. |
| 2010/0303504 A1 | 12/2010 | Funamoto et al. |
| 2010/0310281 A1 | 12/2010 | Miura et al. |
| 2011/0044724 A1 | 2/2011 | Funamoto et al. |
| 2011/0058001 A1 | 3/2011 | Gila et al. |
| 2011/0085828 A1 | 4/2011 | Kosako et al. |
| 2011/0141188 A1 | 6/2011 | Morita |
| 2011/0150541 A1 | 6/2011 | Michibata |
| 2011/0169889 A1 | 7/2011 | Kojima et al. |
| 2011/0195260 A1 | 8/2011 | Lee et al. |
| 2011/0199414 A1 | 8/2011 | Lang |
| 2011/0234683 A1 | 9/2011 | Komatsu |
| 2011/0234689 A1 | 9/2011 | Saito |
| 2011/0269885 A1 | 11/2011 | Imai |
| 2011/0279554 A1 | 11/2011 | Dannhauser et al. |
| 2011/0304674 A1 | 12/2011 | Sambhy et al. |
| 2012/0013694 A1 | 1/2012 | Kanke |
| 2012/0013928 A1 | 1/2012 | Yoshida et al. |
| 2012/0026224 A1 | 2/2012 | Anthony et al. |
| 2012/0039647 A1 | 2/2012 | Brewington et al. |
| 2012/0094091 A1 | 4/2012 | Van Mil et al. |
| 2012/0098882 A1 | 4/2012 | Onishi et al. |
| 2012/0105561 A1 | 5/2012 | Taniuchi et al. |
| 2012/0113180 A1 | 5/2012 | Tanaka et al. |
| 2012/0113203 A1 | 5/2012 | Kushida et al. |
| 2012/0127250 A1 | 5/2012 | Kanasugi et al. |
| 2012/0127251 A1 | 5/2012 | Tsuji et al. |
| 2012/0140009 A1 | 6/2012 | Kanasugi et al. |
| 2012/0156375 A1 | 6/2012 | Brust et al. |
| 2012/0162302 A1 | 6/2012 | Oguchi et al. |
| 2012/0194830 A1 | 8/2012 | Gaertner et al. |
| 2012/0237260 A1 | 9/2012 | Sengoku et al. |
| 2012/0287260 A1 | 11/2012 | Lu et al. |
| 2013/0088543 A1 | 4/2013 | Tsuji et al. |
| 2013/0242016 A1* | 9/2013 | Edwards ............... B41J 2/2114 347/102 |
| 2013/0338273 A1 | 12/2013 | Shimanaka et al. |
| 2014/0011125 A1 | 1/2014 | Inoue et al. |
| 2014/0043398 A1 | 2/2014 | Butler et al. |
| 2014/0104360 A1 | 4/2014 | Häcker et al. |
| 2014/0232782 A1 | 8/2014 | Mukai et al. |
| 2014/0339056 A1 | 11/2014 | Iwakoshi et al. |
| 2015/0015650 A1 | 1/2015 | Landa et al. |
| 2015/0022602 A1 | 1/2015 | Landa et al. |
| 2015/0024648 A1 | 1/2015 | Landa et al. |
| 2015/0025179 A1 | 1/2015 | Landa et al. |
| 2015/0072090 A1 | 3/2015 | Landa et al. |
| 2015/0118503 A1 | 4/2015 | Landa et al. |
| 2015/0336378 A1 | 11/2015 | Guttmann et al. |
| 2016/0075130 A1 | 3/2016 | Landa et al. |
| 2016/0222232 A1 | 8/2016 | Landa et al. |
| 2016/0297978 A1 | 10/2016 | Landa et al. |
| 2016/0369119 A1 | 12/2016 | Landa et al. |
| 2017/0192374 A1 | 7/2017 | Landa et al. |
| 2017/0361602 A1 | 12/2017 | Landa et al. |
| 2018/0065358 A1 | 3/2018 | Landa et al. |

(56) References Cited

U.S. PATENT DOCUMENTS

| | | |
|---|---|---|
| 2018/0079201 A1 | 3/2018 | Landa et al. |
| 2018/0117906 A1 | 5/2018 | Landa et al. |
| 2018/0126726 A1 | 5/2018 | Shmaiser et al. |
| 2018/0134031 A1 | 5/2018 | Shmaiser et al. |
| 2018/0222235 A1 | 8/2018 | Landa et al. |
| 2018/0259888 A1 | 9/2018 | Mitsui et al. |
| 2019/0023919 A1 | 1/2019 | Landa et al. |

FOREIGN PATENT DOCUMENTS

| | | |
|---|---|---|
| CN | 1493514 A | 5/2004 |
| CN | 1720187 A | 1/2006 |
| CN | 1261831 C | 6/2006 |
| CN | 1809460 A | 7/2006 |
| CN | 1289368 C | 12/2006 |
| CN | 101177057 A | 5/2008 |
| CN | 101544101 A | 9/2009 |
| CN | 101607468 A | 12/2009 |
| CN | 101873982 A | 10/2010 |
| CN | 102248776 A | 11/2011 |
| CN | 102555450 A | 7/2012 |
| CN | 102925002 | 2/2013 |
| CN | 103991293 A | 8/2014 |
| CN | 104284850 A | 1/2015 |
| DE | 102010060999 A1 | 6/2012 |
| EP | 0457551 A2 | 11/1991 |
| EP | 0499857 A1 | 8/1992 |
| EP | 0606490 A1 | 7/1994 |
| EP | 0609076 A2 | 8/1994 |
| EP | 0613791 A2 | 9/1994 |
| EP | 0784244 A2 | 7/1997 |
| EP | 0843236 A2 | 5/1998 |
| EP | 1013466 A2 | 6/2000 |
| EP | 1146090 A2 | 10/2001 |
| EP | 1158029 A1 | 11/2001 |
| EP | 1247821 A2 | 10/2002 |
| EP | 1454968 A1 | 9/2004 |
| EP | 2028238 A1 | 2/2009 |
| EP | 2042317 A1 | 4/2009 |
| EP | 2228210 A1 | 9/2010 |
| EP | 2270070 A1 | 1/2011 |
| EP | 2683556 A1 | 1/2014 |
| GB | 1520932 A | 8/1978 |
| GB | 2321430 A | 7/1998 |
| JP | S567968 A | 1/1981 |
| JP | S60199692 A | 10/1985 |
| JP | S64181 A | 1/1989 |
| JP | H05147208 A | 6/1993 |
| JP | H06100807 | 4/1994 |
| JP | H06100807 A | 4/1994 |
| JP | H07112841 A | 5/1995 |
| JP | H07238243 A | 9/1995 |
| JP | H0862999 A | 3/1996 |
| JP | H08112970 | 5/1996 |
| JP | 2529651 B2 | 8/1996 |
| JP | H09281851 A | 10/1997 |
| JP | H1142811 A | 2/1999 |
| JP | H11503244 A | 3/1999 |
| JP | H11106081 A | 4/1999 |
| JP | 2000169772 A | 6/2000 |
| JP | 2000206801 A | 7/2000 |
| JP | 3177985 B2 | 6/2001 |
| JP | 2001206522 A | 7/2001 |
| JP | 2002020666 A | 1/2002 |
| JP | 2002169383 A | 6/2002 |
| JP | 2002229276 A | 8/2002 |
| JP | 2002234243 A | 8/2002 |
| JP | 2002278365 A | 9/2002 |
| JP | 2002326733 A | 11/2002 |
| JP | 2002371208 A | 12/2002 |
| JP | 2003057967 A | 2/2003 |
| JP | 2003114558 A | 4/2003 |
| JP | 2003183557 A | 7/2003 |
| JP | 2003211770 A | 7/2003 |
| JP | 2003246135 A | 9/2003 |
| JP | 2003246484 A | 9/2003 |
| JP | 2003292855 A | 10/2003 |
| JP | 2004009632 A | 1/2004 |
| JP | 2004019022 A | 1/2004 |
| JP | 2004025708 A | 1/2004 |
| JP | 2004034441 A | 2/2004 |
| JP | 2004114377 A | 4/2004 |
| JP | 2004114675 A | 4/2004 |
| JP | 2004148687 A | 5/2004 |
| JP | 2004231711 A | 8/2004 |
| JP | 2004261975 A | 9/2004 |
| JP | 2005014255 A | 1/2005 |
| JP | 2005014256 A | 1/2005 |
| JP | 2005215247 A | 8/2005 |
| JP | 2005307184 A | 11/2005 |
| JP | 2006095870 A | 4/2006 |
| JP | 2006102975 A | 4/2006 |
| JP | 2006137127 A | 6/2006 |
| JP | 2006143778 | 6/2006 |
| JP | 2006152133 | 6/2006 |
| JP | 2006263984 | 10/2006 |
| JP | 2006347081 A | 12/2006 |
| JP | 2006347085 | 12/2006 |
| JP | 2007069584 A | 3/2007 |
| JP | 2007190745 A | 8/2007 |
| JP | 2007216673 A | 8/2007 |
| JP | 2007253347 A | 10/2007 |
| JP | 2008006816 A | 1/2008 |
| JP | 2008018716 A | 1/2008 |
| JP | 2008019286 A | 1/2008 |
| JP | 2008142962 A | 6/2008 |
| JP | 2008532794 A | 8/2008 |
| JP | 2008201564 A | 9/2008 |
| JP | 2008255135 A | 10/2008 |
| JP | 2009040892 A | 2/2009 |
| JP | 2009045794 A | 3/2009 |
| JP | 2009045885 A | 3/2009 |
| JP | 2009083314 | 4/2009 |
| JP | 2009083317 | 4/2009 |
| JP | 2009083325 | 4/2009 |
| JP | 2009096175 A | 5/2009 |
| JP | 2009148908 A | 7/2009 |
| JP | 2009154330 A | 7/2009 |
| JP | 2009190375 A | 8/2009 |
| JP | 2009202355 A | 9/2009 |
| JP | 2009214318 A | 9/2009 |
| JP | 2009214439 A | 9/2009 |
| JP | 2009226852 A | 10/2009 |
| JP | 2009226886 A | 10/2009 |
| JP | 2009233977 A | 10/2009 |
| JP | 2009234219 A | 10/2009 |
| JP | 2010005815 A | 1/2010 |
| JP | 2010054855 A | 3/2010 |
| JP | 2010105365 A | 5/2010 |
| JP | 2010173201 A | 8/2010 |
| JP | 2010184376 | 8/2010 |
| JP | 2010214885 A | 9/2010 |
| JP | 2010228192 A | 10/2010 |
| JP | 2010241073 A | 10/2010 |
| JP | 2010247528 | 11/2010 |
| JP | 2010247528 A | 11/2010 |
| JP | 2010258193 A | 11/2010 |
| JP | 2010260204 A | 11/2010 |
| JP | 2010286570 A | 12/2010 |
| JP | 2011025431 A | 2/2011 |
| JP | 2011144271 | 6/2011 |
| JP | 2011523601 A | 8/2011 |
| JP | 2011173325 A | 9/2011 |
| JP | 2011173326 A | 9/2011 |
| JP | 2011186346 A | 9/2011 |
| JP | 2011189627 A | 9/2011 |
| JP | 2011201951 A | 10/2011 |
| JP | 2011224032 A | 11/2011 |
| JP | 2012042943 A | 3/2012 |
| JP | 2012086499 A | 5/2012 |
| JP | 2012111194 A | 6/2012 |
| JP | 2012139905 A | 7/2012 |
| JP | 2013001081 A | 1/2013 |
| JP | 2013060299 A | 4/2013 |

(56) References Cited

FOREIGN PATENT DOCUMENTS

| | | | |
|---|---|---|---|
| JP | 2013103474 A | 5/2013 | |
| JP | 2013121671 A | 6/2013 | |
| JP | 2013129158 A | 7/2013 | |
| WO | 8600327 A1 | 1/1986 | |
| WO | WO-9307000 A1 | 4/1993 | |
| WO | WO-9631809 A1 | 10/1996 | |
| WO | WO-97007991 A1 | 3/1997 | |
| WO | WO-9736210 A1 | 10/1997 | |
| WO | WO-9821251 A1 | 5/1998 | |
| WO | WO-9855901 A1 | 12/1998 | |
| WO | 0154902 A1 | 8/2001 | |
| WO | WO-0170512 A1 | 9/2001 | |
| WO | 02068191 A1 | 9/2002 | |
| WO | 02078868 A2 | 10/2002 | |
| WO | 2004113082 A1 | 12/2004 | |
| WO | WO-2006069205 A1 | 6/2006 | |
| WO | WO-2006073696 A1 | 7/2006 | |
| WO | WO-2006091957 A2 | 8/2006 | |
| WO | WO-2007009871 A2 | 1/2007 | |
| WO | 2007145378 A1 | 12/2007 | |
| WO | 2008078841 A1 | 7/2008 | |
| WO | WO-2009025809 A1 | 2/2009 | |
| WO | 2012014825 A1 | 2/2012 | |
| WO | 2012148421 A1 | 11/2012 | |
| WO | 2013060377 A1 | 5/2013 | |
| WO | WO-2013087249 A1 | 6/2013 | |
| WO | 2013132339 A1 | 9/2013 | |
| WO | 2013132340 A1 | 9/2013 | |
| WO | 2013132343 A1 | 9/2013 | |
| WO | 2013132345 A1 | 9/2013 | |
| WO | 2013132418 A2 | 9/2013 | |
| WO | 2013132438 A2 | 9/2013 | |
| WO | 2013132439 A1 | 9/2013 | |
| WO | WO-2013132356 A1 | 9/2013 | |
| WO | WO-2013132419 A1 | 9/2013 | |
| WO | WO-2013132420 A1 | 9/2013 | |
| WO | WO-2013132424 A1 | 9/2013 | |
| WO | WO-2013132432 A1 | 9/2013 | |
| WO | WO-2013136220 A1 | 9/2013 | |
| WO | 2015036960 A1 | 3/2015 | |
| WO | WO-2015036864 A1 | 3/2015 | |
| WO | WO-2015036906 A1 | 3/2015 | |
| WO | WO-2016166690 A1 | 10/2016 | |

OTHER PUBLICATIONS

"Solubility of Alcohol", in http://www.solubilityofthings.com/water/alcohol; downloaded on Nov. 30, 2017.
Handbook of Print Media, 2001, Springer Verlag, Berlin/Heidelberg/New York.
'Units of Viscosity' published by Hydramotion Ltd. 1 York Road Park, Malton, York Y017 6YA, England, downloaded from www.hydramotion.com website on Jun. 19, 2017.
Poly(vinyl acetate) data sheet. PolymerProcessing.com. Copyright 2010. http://polymerprocessing.com/polymers/PVAC.html.
CN 102925002 Machine Translation (EPO and Google)—published Feb. 13, 2013 University Jiangnan.
JPH 08112970 Machine Translation (by EPO and Google)—published May 7, 1996 Fuji Photo Film Co Ltd.
JP 2006-143778 Machine Translation (by EPO and Google)—published Jun. 8, 2006 Sun Bijutsu Insatsu KK et al.
JP 2006-152133 Machine Translation (by EPO and Google)—published Jun. 15, 2006 Seiko Epson Corp.
JP 2006-263984 Machine Translation (by EPO and Google)—published Oct. 5, 2006 Fuji Photo Film Co Ltd.
JP 2006-347085 Machine Translation (by EPO and Google)—published Dec. 28, 2006 Fuji Xerox Co Ltd.
JP 2009-083314 Machine Translation (by EPO and Google)—published Apr. 23, 2009 Fujifilm Corp.
JP 2009-083317 Machine Translation (by EPO and Google)—published Apr. 23, 2009 Fujifilm Corp.
JP 2010-184376 Machine Translation (by EPO and Google)—published Aug. 26, 2010 Fujifilm Corp.
JP 2010-247528 Machine Translation (by EPO and Google)—published Nov. 4, 2010 Konica Minolta Holdings.
JP 2011-144271 Machine Translation (by EPO and Google)—published Jun. 28, 2011 Toyo Ink.
"Amino Functional Silicone Polymers", in Xiameter.COPYRGT. 2009 Dow Corning Corporation.
BASF , "JONCRYL 537", Datasheet , Retrieved from the internet : Mar. 23, 2007 p. 1.
Clariant, "Ultrafine Pigment Dispersion for Design and Creative Materials : Hostafine Pigment Preparation" Retrieved from the Internet : URL: http://www.clariant.com/C125720D002B963C/4352D0BC052E90CEC1257479002707D9/$FILE/DP6208E_0608_FL_Hostafinefordesignandcreativematerials.pdf Jun. 19, 2008.
CN1200085A Machine Translation (by EPO and Google)—published Nov. 25, 1998; Avery Dennison Corp.
CN1809460A Machine Translation (by EPO and Google)—published Jul. 26, 2006; Canon KK.
Epomin Polymyr, product information from Nippon Shokubai, dated Feb. 28, 2014.
JP2000169772 Machine Translation (by EPO and Google)—published Jun. 20, 2000; Tokyo Ink MFG Co Ltd.
JP2000206801 Machine Translation (by PlatPat English machine translation); published on Jul. 28, 2000, Canon KK, Kobayashi et al.
JP2002234243 Machine Translation (by EPO and Google)—published Aug. 20, 2002; Hitachi Koki Co Ltd.
JP2002371208 Machine Translation (by EPO and Google)—published Dec. 26, 2002; Canon Inc.
JP2003246135 Machine Translation (by PlatPat English machine translation)—published Sep. 2, 2003 Ricoh KK, Morohoshi et al.
JP2003292855(A) Machine Translation (by EPO and Google)—published Oct. 15, 2003; Konishiroku Photo Ind.
JP2004009632(A) Machine Translation (by EPO and Google)—published Jan. 15, 2004; Konica Minolta Holdings Inc.
JP2004019022 Machine Translation (by EPO and Google)—published Jan. 22, 2004; Yamano et al.
JP2004025708(A) Machine Translation (by EPO and Google)—published Jan. 29, 2004; Konica Minolta Holdings Inc.
JP2004034441(A) Machine Translation (by EPO and Google)—published Feb. 5, 2004; Konica Minolta Holdings Inc.
JP2004-114377 Machine Translation (by EPO and Google)—published Apr. 15, 2004; Konica Minolta Holdings Inc, et al.
JP2004-114675 Machine Translation (by EPO and Google)—published Apr. 15, 2004; Canon Inc.
JP2004-231711 Machine Translation (by EPO and Google)—published Aug. 19, 2004; Seiko Epson Corp.
JP2004261975 Machine Translation (by EPO, PlatPat and Google); published on Sep. 24, 2004, Seiko Epson Corp, Kataoka et al.
JP2005-014255 Machine Translation (by EPO and Google)—published Jan. 20, 2005; Canon Inc.
JP2005-014256 Machine Translation (by EPO and Google)—published Jan. 20, 2005; Canon Inc.
JP2006095870(A) Machine Translation (by EPO and Google)—published Apr. 13, 2006; Fuji Photo Film Co Ltd.
JP2006-102975 Machine Translation (by EPO and Google)—published Apr. 20, 2006; Fuji Photo Film Co Ltd.
JP2006-347081 Machine Translation (by EPO and Google)—published Dec. 28, 2006; Fuji Xerox Co Ltd.
JP2008-006816 Machine Translation (by EPO and Google)—published Jan. 17, 2008; Fujifilm Corp.
JP2008-018716 Machine Translation (by EPO and Google)—published Jan. 31, 2008; Canon Inc.
JP2008-142962 Machine Translation (by EPO and Google)—published Jun. 26, 2008; Fuji Xerox Co Ltd.
JP2008-255135 Machine Translation (by EPO and Google)—published Oct. 23, 2008; Fujifilm Corp.
JP2009-045794 Machine Translation (by EPO and Google)—published Mar. 5, 2009; Fujifilm Corp.
JP2009096175 Machine Translation (EPO, PlatPat and Google) published on May. 7, 2009 Fujifilm Corp.
JP2009-154330 Machine Translation (by EPO and Google)—published Jul. 16, 2009; Seiko Epson Corp.

(56) References Cited

OTHER PUBLICATIONS

JP2009-190375 Machine Translation (by EPO and Google)—published Aug. 27, 2009; Fuji Xerox Co Ltd.
JP2009-202355 Machine Translation (by EPO and Google)—published Sep. 10, 2009; Fuji Xerox Co Ltd.
JP2009-214318 Machine Translation (by EPO and Google)—published Sep. 24, 2009 Fuji Xerox Co Ltd.
JP2009-226852 Machine Translation (by EPO and Google)—published Oct. 8, 2009; Hirato Katsuyuki, Fujifilm Corp.
JP2009-233977 Machine Translation (by EPO and Google)—published Oct. 15, 2009; Fuji Xerox Co Ltd.
JP2009-234219 Machine Translation (by EPO and Google)—published Oct. 15, 2009; Fujifilm Corp.
JP2010-105365 Machine Translation (by EPO and Google)—published May 13, 2010; Fuji Xerox Co Ltd.
JP2010-173201 Abstract; Machine Translation (by EPO and Google)—published Aug. 12, 2010; Richo Co Ltd.
JP2010-241073 Machine Translation (by EPO and Google)—published Oct. 28, 2010; Canon Inc.
JP2011-025431 Machine Translation (by EPO and Google)—published Feb. 10, 2011; Fuji Xerox Co Ltd.
JP2011-173325 Abstract; Machine Translation (by EPO and Google)—published Sep. 8, 2011; Canon Inc.
JP2011189627 Machine Translation (by Google Patents)—published Sep. 29, 2011; Canon KK.
JP2011-201951 Machine Translation (by PlatPat English machine translation); published on Oct. 13, 2011, Shin-Etsu Chemical Co Ltd, Todoroki et al.
JP2012-086499 Machine Translation (by EPO and Google)—published May 10, 2012; Canon Inc.
JP2529651(B2) Machine Translation (by EPO and Google)—issued Aug. 28, 1996; Osaka Sealing Insatsu KK.
JPH07238243(A) Machine Translation (by EPO and Google)—published Sep. 12, 1995; Seiko Instr Inc.
JPH08-62999 Machine Translation (by EPO & Google)—published Mar. 8, 1996 Toray Industries, Yoshida, Tomoyuki.
Thomas E. F., "CRC Handbook of Food Additives, Second Edition, vol. 1" CRC Press LLC, 1972, p. 434.
CN101177057 Machine Translation (by EPO and Google)—published May 14, 2008—Hangzhou Yuanyang Industry Co.
CN101873982A Machine Translation (by EPO and Google)—published Oct. 27, 2010; Habasit AG, Delair et al.
CN102555450A Machine Translation (by EPO and Google)—published Jul. 11, 2012; Fuji Xerox Co., LTD, Motoharu et al.
CN103991293A Machine Translation (by EPO and Google)—published Aug. 20, 2014; Miyakoshi Printing Machinery Co., LTD, Junichi et al.
CN1493514A Machine Translation (by EPO and Google)—published May 5, 2004; GD SPA, Boderi et al.
Co-pending U.S. Appl. No. US16/118,494, filed Aug. 31, 2018.
Co-pending U.S. Appl. No. US16/203,146, filed Nov. 28, 2018.
Co-pending U.S. Appl. No. US16/203,472, filed Nov. 28, 2018.
Co-pending U.S. Appl. No. US16/219,582, filed Dec. 13, 2018.
Co-pending U.S. Appl. No. US16/226,726, filed Dec. 20, 2018.
Co-pending U.S. Appl. No. US16/303,613, filed Nov. 20, 2018.
Co-pending U.S. Appl. No. US16/303,615, filed Nov. 20, 2018.
Co-pending U.S. Appl. No. US16/303,631, filed Nov. 20, 2018.
DE102010060999 Machine Translation (by EPO and Google)—published Jun. 6, 2012; Wolf, Roland, Dr.-Ing.
English Translation of CN1200085 as published in WO9707991 dated Mar. 6, 1997.
IP.com Search, 2018, 2 pages.
JP2001/206522 Machine Translation (by EPO, PlatPat and Google)—published Jul. 31, 2001; Nitto Denko Corp, Kato et al.
JP2002-169383 Machine Translation (by EPO, PlatPat and Google)—published Jun. 14, 2002 Richo KK.
JP2002-278365 Machine Translation (by PlatPat English machine translation)—published Sep. 27, 2002 Katsuaki, Ricoh KK.
JP2002-326733 Machine Translation (by EPO, PlatPat and Google)—published Nov. 12, 2002; Kyocera Mita Corp.
JP2003-114558 Machine Translation (by EPO, PlatPat and Google)—published Apr. 18, 2003 Mitsubishi Chem Corp, Yuka Denshi Co Ltd, et al.
JP2003-211770 Machine Translation (by EPO and Google)—published Jul. 29, 2003 Hitachi Printing Solutions.
JP2003-246484 Machine Translation (English machine translation)—published Sep. 2, 2003 Kyocera Corp.
JP2004148687A Machine Translation (by EPO and Google)—published May 27, 2014; Mitsubishi Heavy Ind Ltd.
JP2005215247A Machine Translation (by EPO and Google)—published Aug. 11, 2005; Toshiba Corp.
JP2006-137127 Machine Translation (by EPO and Google)—published Jun. 1, 2006; Konica Minolta Med & Graphic.
JP2007-069584 Machine Translation (by EPO and Google)—published Mar. 22, 2007 Fujifilm.
JP2007-216673 Machine Translation (by EPO and Google)—published Aug. 30, 2007 Brother Ind.
JP2008-201564 Machine Translation (English machine translation)—published Sep. 4, 2008 Fuji Xerox Co Ltd.
JP2009045885(A) Machine Translation (by EPO and Google)—published Mar. 5, 2009; Fuji Xerox Co Ltd.
JP2009-083325 Abstract; Machine Translation (by EPO and Google)—published Apr. 23, 2009 Fujifilm.
JP2009148908A Machine Translation (by EPO and Google)—published Jul. 9, 2009; Fuji Xerox Co Ltd.
JP2009214439 Machine Translation (by PlatPat English machine translation)—published Sep. 24, 2009 Fujifilm Corp.
JP2010-054855 Machine Translation (by PlatPat English machine translation)—published Mar. 11, 2010 Itatsu, Fuji Xerox Co.
JP2010214885A Machine Translation (by EPO and Google)—published Sep. 30, 2010; Mitsubishi Heavy Ind Ltd.
JP2010228192 Machine Translation (by PlatPat English machine translation)—published Oct. 14, 2010 Fuji Xerox.
JP2010-258193 Machine Translation (by EPO and Google)—published Nov. 11, 2010; Seiko Epson Corp.
JP2010260204(A) Machine Translation (by EPO and Google)—published Nov. 18, 2010; Canon KK.
JP2011-173326 Machine Translation (by EPO and Google)—published Sep. 8, 2011; Canon Inc.
JP2011186346 Machine Translation (by PlatPat English machine translation)—published Sep. 22, 2011 Seiko Epson Corp, Nishimura et al.
JP2011224032 Machine Translation (by EPO & Google)—published Jul. 5, 2012 Canon KK.
JP2012-111194 Machine Translation (by EPO and Google)—published Jun. 14, 2012; Konica Minolta.
JP2013-001081 Machine Translation (by EPO and Google)—published Jan. 7, 2013; Kao Corp.
JP2013-060299 Machine Translation (by EPO and Google)—published Apr. 4, 2013; Ricoh Co Ltd.
JP2013-103474 Machine Translation (by EPO and Google)—published May 30, 2013; Ricoh Co Ltd.
JP2013-121671 Machine Translation (by EPO and Google)—published Jun. 20, 2013; Fuji Xerox Co Ltd.
JP2013-129158 Machine Translation (by EPO and Google)—published Jul. 4, 2013; Fuji Xerox Co Ltd.
JPH05147208 Machine Translation (by EPO and Google)—published Jun. 15, 1993—Mita Industrial Co Ltd.
JPH09281851A Machine Translation (by EPO and Google)—published Oct. 31, 1997; Seiko Epson Corp.
JPH11106081A Machine Translation (by EPO and Google)—published Apr. 20, 1999; Ricoh KK.
JPS56-7968 Machine Translation (by PlatPat English machine translation); published on Jun. 28, 1979, Shigeyoshi et al.
Machine Translation (by EPO and Google) of JPH07112841 published on May 2, 1995 Canon KK.
JPS60199692A Machine Translation (by EPO and Google)—published Oct. 9, 1985; Suwa Seikosha KK.
JP2007253347A Machine Translation (by EPO and Google)—published Oct. 4, 2007; Ricoh KK, Matsuo et al.

(56) References Cited

OTHER PUBLICATIONS

WO2013/087249 Machine Translation (by EPO and Google)—published Jun. 20, 2013; Koenig & Bauer AG.

* cited by examiner

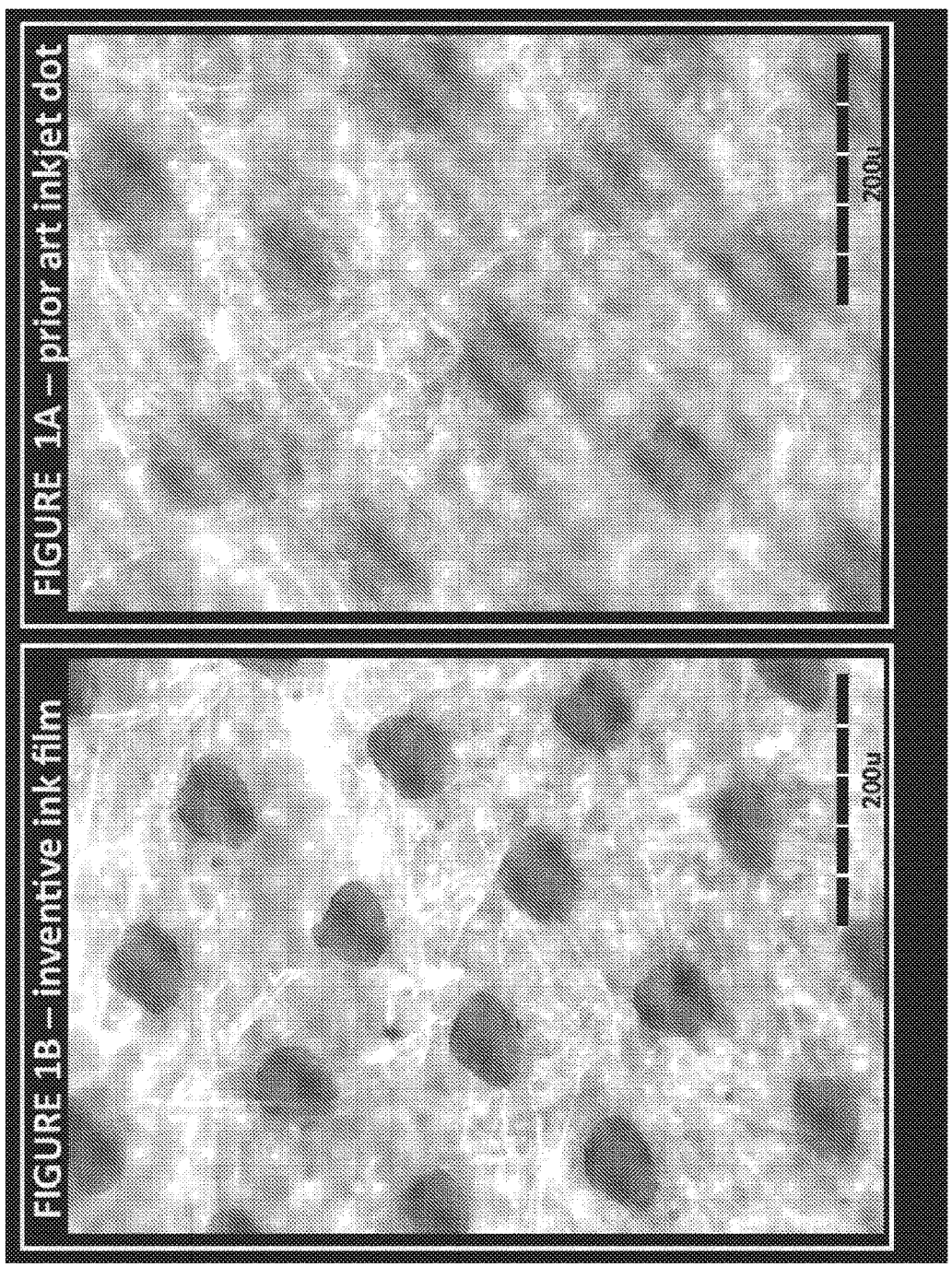

Figure 3C
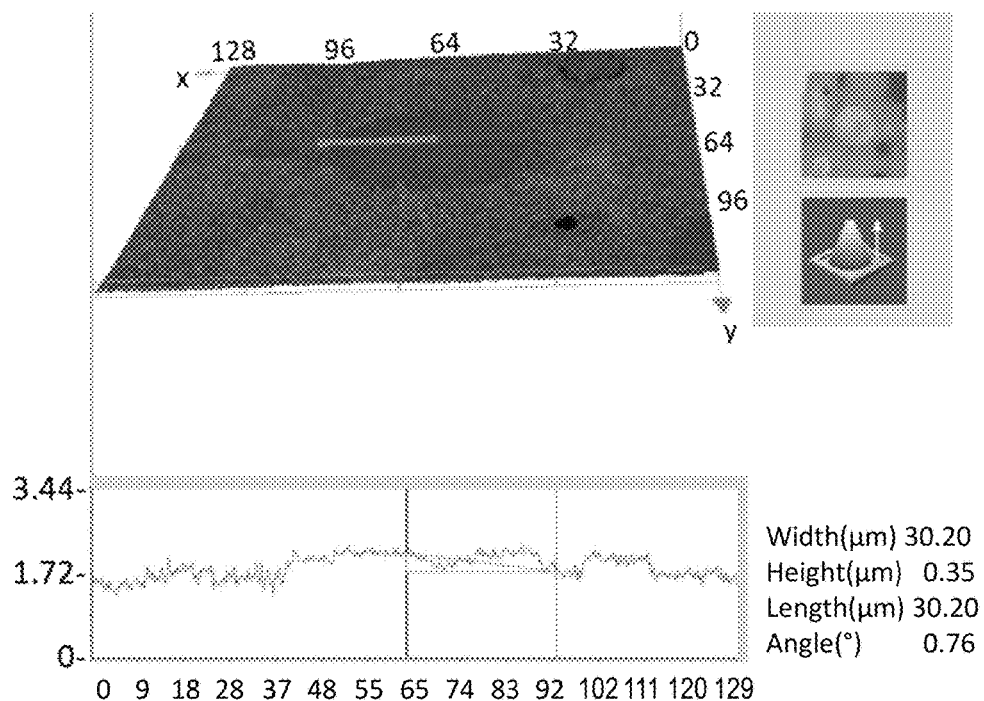
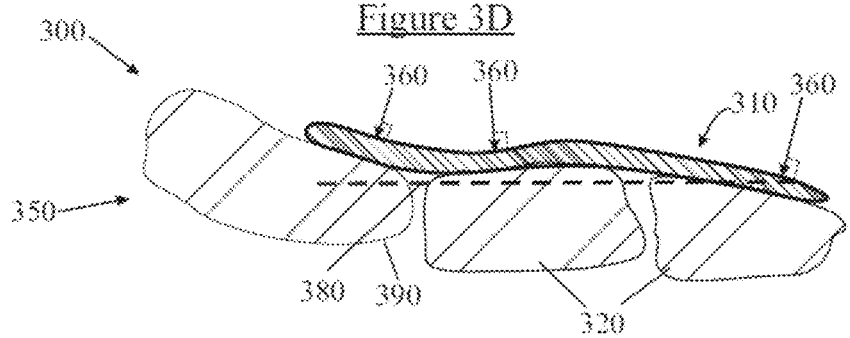
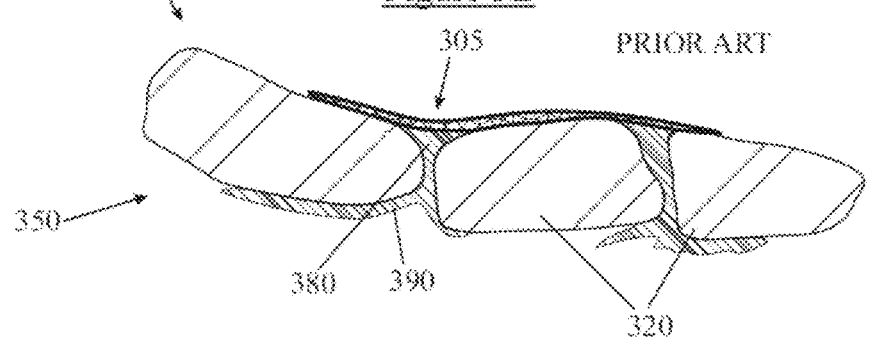

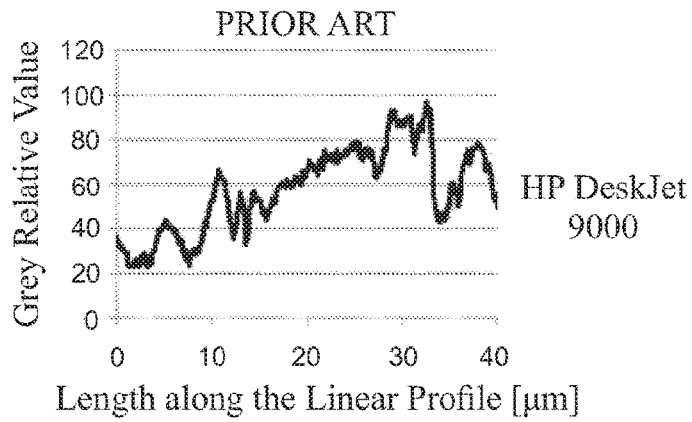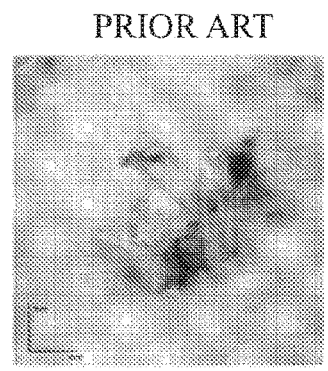
Figure 6A-1      Figure 6A-2
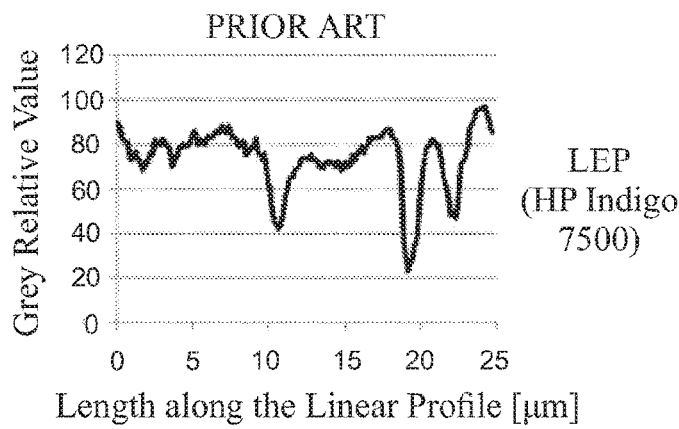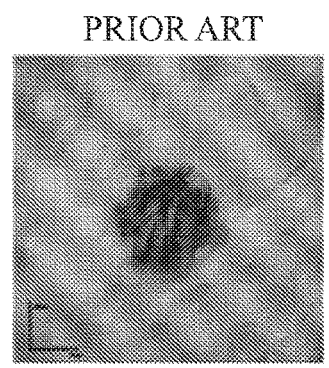
Figure 6B-1      Figure 6B-2
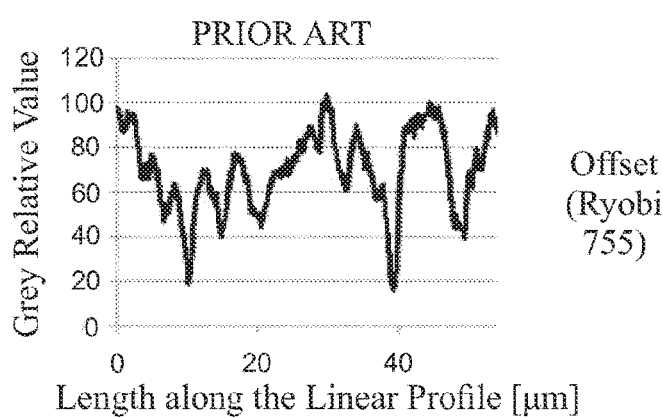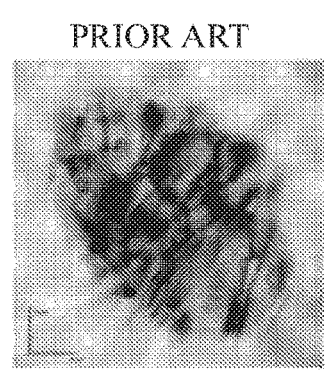
Figure 6C-1      Figure 6C-2

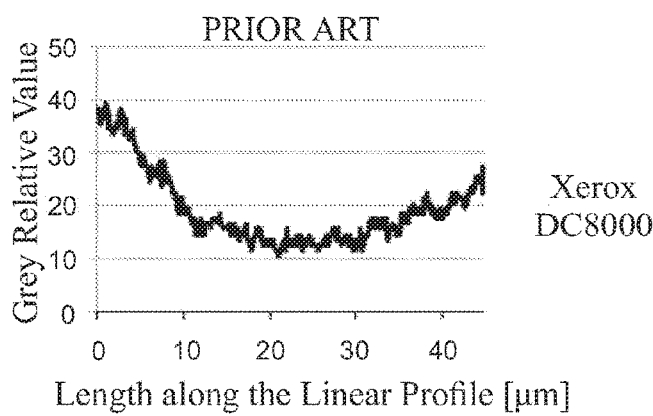 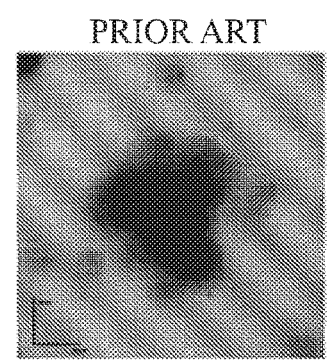
Figure 6I-1     Figure 6I-2
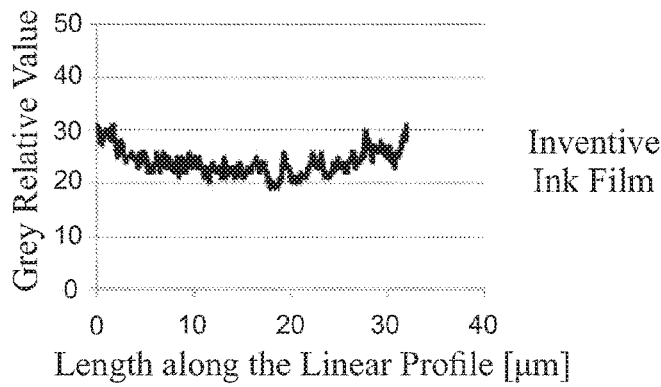 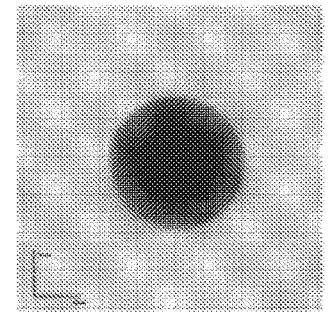
Figure 6J-1     Figure 6J-2

INK FILM CONSTRUCTIONS

This application is a continuation of U.S. Ser. No. 14/382,875, filed Sep. 4, 2014 as the national phase of PCT/IB2013/000822 which was filed Mar. 5, 2013. Said PCT application claims the benefit of the following U.S. provisional applications 61/606,913, filed Mar. 5, 2012; 61/606,985, filed Mar. 5, 2012; 61/607,537, filed Mar. 6, 2012; 61/611,557, filed Mar. 15, 2012; 61/611,567, filed Mar. 15, 2012; 61/619,372, filed Apr. 2, 2012; 61/619,349, filed Apr. 2, 2012; 61/640,493, filed Apr. 30, 2012; 61/641,258, filed May 1, 2012; 61/641,133, filed May 1, 2012; 61/640,881, filed May 1, 2012; 61/641,223, filed May 1, 2012; 61/641,653, filed May 2, 2012; 61/645,086, filed May 10, 2012; 61/645,085, filed May 10, 2012; 61/645,077, filed May 10, 2012; 61/645,076, filed May 10, 2012; 61/645,075, filed May 10, 2012. The benefit of all of these applications is claimed.

FIELD AND BACKGROUND OF THE DISCLOSURE

The present invention relates to ink film constructions and, more particularly, to ink dots adhered to printing substrates. In particular, the ink film constructions comprise continuous ink dots, which may by way of example be obtained by ink jetting technology.

Currently, lithographic printing is the process in most common use for producing newspapers and magazines. Lithographic printing involves the preparation of plates bearing the image to be printed, which plates are mounted on a plate cylinder. An ink image produced on the plate cylinder is transferred to an offset cylinder that carries a rubber blanket. From the blanket, the image is applied to paper, card or another printing medium, termed the substrate, which is fed between the offset cylinder and an impression cylinder. For a wide variety of well-known reasons, offset litho printing is suitable, and economically viable, only for long print runs.

More recently, digital printing techniques have been developed that allow a printing device to receive instructions directly from a computer without the need to prepare printing plates. Amongst these are color laser printers that use the xerographic process. Color laser printers using dry toners are suitable for certain applications, but they do not produce images of a quality acceptable for publications such as magazines.

A process that is better suited for short run high quality digital printing is used in the HP-Indigo digital printing press. In this process, an electrostatic image is produced on an electrically charged image-bearing cylinder by exposure to laser light. The electrostatic charge attracts oil-based inks to form a color ink image on the image-bearing cylinder. The ink image is then transferred by way of a blanket cylinder onto the substrate.

Various printing devices have also previously been proposed that use an indirect inkjet printing process, this being a process in which an inkjet print head is used to print an image onto the surface an intermediate transfer member, which is then used to transfer the image onto a substrate. The intermediate transfer member may be a rigid drum or a flexible belt, also herein termed a blanket, guided over rollers.

Using an indirect printing technique overcomes many problems associated with inkjet printing directly onto the substrate. For example, inkjet printing directly onto porous paper, or other fibrous material, results in poor image quality because of variation of the distance between the print head and the surface of the substrate, and because of the substrate acting as a wick. Fibrous substrates, such as paper, generally require specific coatings engineered to absorb the liquid ink in a controlled fashion or to prevent its penetration below the surface of the substrate. Using specially coated substrates is, however, a costly option that is unsuitable for certain printing applications. Furthermore, the use of coated substrates creates its own problems in that the surface of the substrate remains wet and additional costly steps are needed to dry the ink so that it is not later smeared as the substrate is being handled, for example stacked or wound into a roll. Furthermore, excessive wetting of the substrate causes cockling and makes printing on both sides of the substrate (also termed perfecting or duplex printing) difficult, if not impossible.

The use of an indirect technique, on the other hand, allows the distance between the image transfer surface and the inkjet print head to be maintained constant, reduces wetting of the substrate as the ink can be dried on the image transfer surface before being applied to the substrate. Consequently, the final image quality of the ink film on the substrate is less affected by the physical properties of the substrate.

Various quality ink film constructions notwithstanding, it is believed that there is a need for further improvements in ink film constructions, such as ink-jet printing constructions.

SUMMARY OF THE INVENTION

According to some teachings of the present invention there is provided an ink film construction including: (a) a printing substrate; and (b) a plurality of continuous ink films, fixedly adhered to a surface of the printing substrate, the ink films containing at least one colorant dispersed in an organic polymeric resin; the ink films having a first dynamic viscosity within a range of $10^6$ cP to $3 \cdot 10^8$ cP for at least a first temperature within a first range of 90° C. to 195° C., the ink films having a second dynamic viscosity of at least $8 \cdot 10^7$ cP, for at least a second temperature within a second range of 50° C. to 85° C.

According to another aspect of the present invention there is provided an ink dot construction including: (a) a first fibrous printing substrate selected from the group consisting of an uncoated fibrous printing substrate and a commodity coated fibrous printing substrate; and (b) at least one continuous ink dot, fixedly adhered to a surface of the first printing substrate, the ink dot containing at least one colorant dispersed in an organic polymeric resin, the ink dot covering an area of the top surface; the ink dot fulfilling a structural condition wherein, with respect to a direction normal to the surface over all of the area, the ink dot is disposed entirely above the area, an average or characteristic thickness of the single ink dot being at most 1,800 nm.

According to yet another aspect of the present invention there is provided an ink film construction including: (a) a first fibrous printing substrate selected from the group consisting of an uncoated fibrous printing substrate and a commodity coated fibrous printing substrate; and (b) at least a first continuous ink dot, fixedly adhered to a first surface of the first printing substrate, the ink dot containing at least one colorant dispersed in an organic, polymeric resin, the dot having an average thickness of less than 2,000 nm; the dot being generally disposed above a particular surface of the surface; a penetration of the dot beneath the particular surface, with respect to a direction normal to the first surface being less than 100 nm; the ink dot having a generally convex shape in which a deviation from convexity, ($DC_{dot}$), is defined by:

$$DC_{dot}=1-AA/CSA,$$

AA being a calculated projected area of the dot, the area disposed generally parallel to the first fibrous printing substrate; and CSA being a surface area of a convex shape that minimally bounds a contour of the projected area; the deviation from convexity ($DC_{dot}$) being at most 0.03.

According to yet another aspect of the present invention there is provided an ink film construction including: (a) a printing substrate; and (b) at least one ink film, fixedly adhered to a top surface of the printing substrate, the ink film having an upper film surface distal to the top surface of the substrate, wherein a surface concentration of nitrogen at the upper film surface exceeds a bulk concentration of nitrogen within the film, the bulk concentration being measured at a depth of at least 30 nanometers, at least 50 nanometers, at least 100 nanometers, at least 200 nanometers, or at least 300 nanometers below the upper film surface, and the ratio of the surface concentration to the bulk concentration is at least 1.1 to 1.

According to yet another aspect of the present invention there is provided an ink film construction including: (a) a printing substrate; and (b) at least one ink film, fixedly adhered to a top surface of the printing substrate, the ink film containing at least one colorant dispersed in an organic polymeric resin, the ink film having an upper film surface distal to the top surface of the substrate, wherein a surface concentration of nitrogen at the upper film surface exceeds a bulk concentration of nitrogen within the film, the bulk concentration being measured at a depth of at least 30 nanometers below the upper film surface, and wherein a ratio of the surface concentration to the bulk concentration is at least 1.1 to 1.

According to yet another aspect of the present invention there is provided an ink film construction including: (a) a first printing substrate selected from the group consisting of an uncoated fibrous printing substrate, a commodity coated fibrous printing substrate, and a plastic printing substrate; and (b) an ink dot set contained within a square geometric projection projecting on the first printing substrate, the ink dot set containing at least 10 distinct ink dots, fixedly adhered to a surface of the first printing substrate, all the ink dots within the square geometric projection being counted as individual members of the set, each of the ink dots containing at least one colorant dispersed in an organic polymeric resin, each of the dots having an average thickness of less than 2,000 nm, and a diameter of 5 to 300 micrometers; each of the ink dots having a generally convex shape in which a deviation from convexity, ($DC_{dot}$), is defined by:

$$DC_{dot}=1-AA/CSA,$$

AA being a calculated projected area of the dot, the area disposed generally parallel to the first fibrous printing substrate; and CSA being a surface area of a convex shape that minimally bounds a contour of the projected area; a mean deviation from convexity ($DC_{dot\ mean}$) of the ink dot set being at most 0.05.

According to yet another aspect of the present invention there is provided an ink film construction including: (a) a first printing substrate selected from the group consisting of an uncoated fibrous printing substrate, a commodity coated fibrous printing substrate, and a plastic printing substrate; and (b) an ink dot set contained within a square geometric projection projecting on the first printing substrate, the ink dot set containing at least 10 distinct ink dots, fixedly adhered to a surface of the first printing substrate, all the ink dots within the square geometric projection being counted as individual members of the set, each of the ink dots containing at least one colorant dispersed in an organic polymeric resin, each of the dots having an average thickness of less than 2,000 nm, and a diameter of 5 to 300 micrometers; each of the ink dots having a deviation from a smooth circular shape, ($DR_{dot}$), represented by:

$$DR_{dot}=[P^2/(4\pi\cdot A)]-1,$$

P being a measured or calculated perimeter of the ink dot; A being a maximal measured or calculated area contained by the perimeter; a mean deviation ($DR_{dot\ mean}$) of the ink dot set being at most 0.60.

According to yet another aspect of the present invention there is provided an ink film construction including: (a) a first fibrous printing substrate selected from the group consisting of an uncoated fibrous printing substrate and a commodity coated fibrous printing substrate; and (b) at least a first ink dot, fixedly adhered to a surface of the first printing substrate, the ink dot containing at least one colorant dispersed in an organic, polymeric resin, the dot having an average thickness of less than 2,000 nm, and a diameter of 5 to 300 micrometers; the ink dot having a generally convex shape in which a deviation front convexity, ($DC_{dot}$), is defined by:

$$DC_{dot}=1-AA/CSA,$$

AA being a calculated projected area of the dot, the area disposed generally parallel to the first fibrous printing substrate; and CSA being a surface area of a convex shape that minimally bounds a contour of the projected area; the deviation from convexity ($DC_{dot}$) being at most 0.05, for the uncoated substrate; the deviation from convexity ($DC_{dot}$) being at most 0.025, for the commodity coated substrate.

According to yet another aspect of the present invention there is provided an ink film construction including: (a) a first fibrous printing substrate selected from the group consisting of an uncoated fibrous printing substrate and a commodity coated fibrous printing substrate; and (b) at least a first ink dot, fixedly adhered to a surface of the first printing substrate, the ink dot containing at least one colorant dispersed in an organic, polymeric resin, the dot having an average thickness of less than 2,000 nm; the ink dot having a generally convex shape in which a deviation from convexity ($DC_{dot}$) is defined by:

$$DC_{dot}=1-AA/CSA,$$

AA being a calculated projected area of the dot, the area disposed generally parallel to the first fibrous printing substrate; and CSA being a surface area of a convex shape that minimally bounds a contour of the projected area; the deviation from convexity ($DC_{dot}$) being at most 0.04; the ink film construction being further defined by:

$$DC_{dot}<K\cdot RDC,$$

K being a coefficient; RDC being a reference deviation from convexity of a reference ink dot in a reference ink film construction including the reference ink film disposed on a fibrous reference substrate substantially identical to the first fibrous printing substrate, the reference deviation defined by:

$$RDC=1-AA_{ref}/CSA_{ref},$$

$AA_{ref}$ being a calculated projected area of the reference dot, the area disposed generally parallel to the reference substrate; and $CSA_{ref}$ being a surface area of a convex shape that minimally bounds a contour of the projected area of the reference dot, the coefficient (K) being at most 0.25.

According to yet another aspect of the present invention there is provided an ink film construction including: (a) a first printing substrate selected from the group consisting of an uncoated fibrous printing substrate, a commodity coated fibrous printing substrate, and a plastic printing substrate; and (b) an ink dot set contained within a square geometric projection projecting on the first printing substrate, the ink dot set containing at least 10 distinct ink dots, fixedly adhered to a surface of the first printing substrate, all the ink dots within the square geometric projection being counted as individual members of the set, each of the ink dots containing at least one colorant dispersed in an organic polymeric resin, each of the dots having an average thickness of less than 2,000 nm, and a diameter of 5 to 300 micrometers; each ink dot of the ink dots having a deviation from a smooth circular shape ($DR_{dot}$) represented by:

$$DR_{dot}=[P^2/(4\pi \cdot A)]-1,$$

P being a measured or calculated perimeter of the ink dot; A being a maximal measured or calculated area contained by the perimeter; wherein a mean deviation ($DR_{dot\ mean}$) of the ink dot set is at most 0.60.

According to yet another aspect of the present invention there is provided an ink film construction including: (a) a first fibrous printing substrate selected from the group consisting of an uncoated fibrous printing substrate and a commodity coated fibrous printing substrate; and (b) at least a first ink dot, fixedly adhered to a surface of the first printing substrate, the ink dot containing at least one colorant dispersed in an organic, polymeric resin, the dot having an average thickness of less than 2,000 nm; the ink dot having a deviation from a smooth circular shape ($DR_{dot}$), represented by:

$$DR_{dot}=[P^2/(4\pi \cdot A)]-1,$$

P being a measured or calculated perimeter of the ink dot; A being a maximal measured or calculated area contained by the perimeter; the deviation ($DR_{dot}$) for the uncoated fibrous printing substrate, being at most 1.5, at most 1.25, at most 1.1, at most 1.0, at most 0.9, at most 0.8, at most 0.7, at most 0.6, at most 0.5, at most 0.4, at most 0.3, or at most 0.25; the deviation ($DR_{dot}$) for the commodity coated fibrous printing substrate, being at most 0.5, at most 0.4, at most 0.3, at most 0.25, at most 0.2, at most 0.15, at most 0.10, at most 0.08, at most 0.06, or at most 0.05.

According to yet another aspect of the present invention there is provided an ink film construction including: (a) a first fibrous printing substrate selected from the group consisting of an uncoated fibrous printing substrate and a commodity coated fibrous printing substrate; and (b) at least a first ink dot, fixedly adhered to a surface of the first printing substrate, the ink dot containing at least one colorant dispersed in an organic, polymeric resin, the dot having an average thickness of less than 2,000 nm, the average thickness being at least 50 nm, at least 100 nm, at least 150 nm, at least 175 nm, at least 200 nm, at least 225 nm, or at least 250 nm; the ink dot having a deviation from a smooth circular shape ($DR_{dot}$) represented by:

$$DR_{dot}=[P^2/(4\pi \cdot A)]-1,$$

P being a measured or calculated perimeter of the ink dot; A being a maximal measured or calculated area contained by the perimeter; the deviation ($DR_{dot}$) being at most 0.5, at most 0.4, at most 0.35, at most 0.3, or at most 0.25; the ink dot construction being further defined by:

$$DR_{dot}<K1 \cdot RDR,$$

K1 being a coefficient; RDR being a reference deviation from roundness of a reference ink dot in a reference ink film construction including the reference ink film disposed on a fibrous reference substrate substantially identical to the first fibrous printing substrate, the reference deviation defined by:

$$RDR=[P_{ref}^2/(4\pi \cdot A_{ref})]-1$$

$P_{ref}$ being a measured or calculated perimeter of the reference ink dot; $A_{ref}$ being a maximal measured or calculated area contained by $P_{ref}$; the coefficient (K1) being at most 0.25.

According to yet another aspect of the present invention there is provided an ink film construction including: (a) a printing substrate; and (b) a plurality of continuous ink films, fixedly adhered to a surface of the printing substrate, the plurality of the films containing a plurality of colorants dispersed in at least one organic polymeric resin, the ink films covering an area of the surface, the plurality of films having an average thickness of at most 2,200 nm, at most 2,100 nm, at most 2,000 nm, at most 1,900 nm, at most 1,800 nm, at most 1,700 nm, at most 1600 nm, at most 1500 nm, or at most 1400 nm; wherein, within the area, the ink film construction exhibits a color gamut volume of at least 425 kilo$(\Delta E)^3$, at least 440 kilo$(\Delta E)^3$, at least 460 kilo$(\Delta E)^3$, at least 480 kilo$(\Delta E)^3$, or at least 500 kilo$(\Delta E)^3$.

According to still further features in the described preferred embodiments, the first dynamic viscosity is at most $25 \cdot 10^7$ cP, at most $20 \cdot 10^7$ cP, at most $15 \cdot 10^7$ cP, at most $12 \cdot 10^7$ cP, at most $10 \cdot 10^7$ cP, at most $9 \cdot 10^7$ cP, at most $8 \cdot 10^7$ cP, or at most $7 \cdot 10^7$ cP.

According to still further features in the described preferred embodiments, the first dynamic viscosity is within a range of $10^6$ cP to $2.5 \cdot 10^8$ cP, $10^6$ cP to $2.0 \cdot 10^8$ cP, $10^6$ cP to $10^8$ cP, $3 \cdot 10^6$ cP to $10^8$ cP, $5 \cdot 10^6$ cP to $3 \cdot 10^8$ cP, $5 \cdot 10^6$ cP to $3 \cdot 10^8$ cP, $8 \cdot 10^6$ cP to $3 \cdot 10^8$ cP, $8 \cdot 10^6$ cP to $10^8$ cP, $10^7$ cP to $3 \cdot 10^8$ cP, $10^7$ cP to $2 \cdot 10^8$ cP, $10^7$ cP to $10^8$ cP, $2 \cdot 10^7$ cP to $3 \cdot 10^8$ cP, $2 \cdot 10^7$ cP to $2 \cdot 10^8$ cP, or $2 \cdot 10^7$ cP to $10^8$ cP.

According to still further features in the described preferred embodiments, the first dynamic viscosity is at least $2 \cdot 10^6$ cP, at least $4 \cdot 10^6$ cP, at least $7 \cdot 10^6$ cP, at least $10^7$ cP, at least $2.5 \cdot 10^7$ cP, or at least $4 \cdot 10^7$ cP.

According to still further features in the described preferred embodiments, the second dynamic viscosity being at least $9 \cdot 10^7$ cP, at least $10^8$ cP, at least $1.2 \cdot 10^8$ cP, at least $1.5 \cdot 10^8$ cP, at least $2.0 \cdot 10^8$ cP, at least $2.5 \cdot 10^8$ cP, at least $3.0 \cdot 10^8$ cP, at least $3.5 \cdot 10^8$ cP, at least $4.0 \cdot 10^8$ cP, at least $5.0 \cdot 10^8$ cP, at least $7.5 \cdot 10^8$ cP, at least $10^9$ cP, at least $2 \cdot 10^9$ cP, at least $4 \cdot 10^9$ cP, or at least $6 \cdot 10^9$ cP.

According to still further features in the described preferred embodiments, the ratio of the second dynamic viscosity, at 90° C., to the first dynamic viscosity, at 60° C., is at least 1.2, at least 1.3, at least 1.5, at least 1.7, at least 2, at least 2.5, at least 3, at least 4, at least 4.5, at least 5, at least 6, at least 7, or at least 8.

According to still further features in the described preferred embodiments, this viscosity ratio is at most 30, at most 25, at most 20, at most 15, at most 12, or at most 10.

According to still further features in the described preferred embodiments, the ink films have a glass transition temperature ($T_g$) of at most 50° C., at most 44° C., at most 42° C., at most 39° C., at most 37° C., at most 35° C., at most 32° C., at most 30° C., or at most 28° C.

According to still further features in the described preferred embodiments, the plurality of ink films contain at least one water-soluble or water dispersible material.

According to still further features in the described preferred embodiments, the at least one water-soluble material includes an aqueous dispersant.

According to still further features the described preferred embodiments, the ink films contain at least 30%, at least 40%, at least 50%, at least 60%, or at least 70%, by weight, of the water-soluble material or the water dispersible material.

According to still further features in the described preferred embodiments, the ink films contain at most 5%, at most 3%, at most 2%, at most 1%, or at most 0.5% inorganic filler particles (such as silica or titania), by weight.

According to still further features in the described preferred embodiments, the ink films are laminated onto the surface of the printing substrate.

According to still further features in the described preferred embodiments, the ink films contain at least 1.2%, at least 1.5%, at least 2%, at least 3%, at least 4%, at least 6%, at least 8%, or at least 10% of the colorant, by weight.

According to still further features in the described preferred embodiments, the ink films contain at least 5%, at least 7%, at least 10%, at least 15%, at least 20%, at least 30%, at least 40%, at least 50%, at least 60%, or at least 70% of the resin, by weight.

According to still further features in the described preferred embodiments, the colorant includes at least one pigment.

According to still further features in the described preferred embodiments, the weight ratio of the resin to the colorant within the plurality of ink films is at least 1:1, at least 1.25:1, at least 1.5:1, at least 1.75:1, at least 2:1, at least 2.5:1, at least 3:1, at least 3.5:1, at least 4:1, at least 5:1, at least 7:1, or at least 10:1.

According to still further features in the described preferred embodiments, the solubility of the resin in water, at a temperature within a temperature range of 20° C. to 60° C., and at a pH within a pH range of 8.5 to 10, is at least 3%, at least 5%, at least 8%, at least 12%, at least 18%, or at least 25%, by weight of dissolved resin to weight of solution.

According to still further features in the described preferred embodiments, the ink films fixedly adhered to the surface are adhered primarily, or substantially solely, by a physical bond between each of the ink films and the surface.

According to still further features in the described preferred embodiments, the adherence of the ink films to the surface, is substantially devoid of an ionic character.

According to still further features in the described preferred embodiments, the adherence of the ink films to the surface, is substantially devoid of a chemical bonding character.

According to still fluffier features in the described preferred embodiments, the ink dot has a glass transition temperature ($T_g$) of at most 47° C., at most 40° C., at most 35° C., or at most 30° C.

According to still further features in the described preferred embodiments, the ink dot contains less than 2%, less than 1%, less than 0.5%, or less than 0.1% of one or more charge directors, or is substantially devoid of charge directors.

According to still further features in the described preferred embodiments, the ink dot contains less than 5%, less than 3%, less than 2%, or less than 0.5% of one or more hydrocarbons or oils, or is substantially devoid of such hydrocarbons or oils.

According to still further features in the described preferred embodiments, fibers of the fibrous printing substrate directly contact the ink dot.

According to still further features in the described preferred embodiments, the commodity coated fibrous printing substrate contains a coating having less than 10%, less than 5%, less than 3%, or less than 1%, by weight, of a water-absorbent polymer.

According to still further features in the described preferred embodiments, the first fibrous printing substrate is a paper.

According to still further features in the described preferred embodiments, the fibrous printing substrate is a paper selected from the group of papers consisting of bond paper, uncoated offset paper, coated offset paper, copy paper, groundwood paper, coated groundwood paper, freesheet paper, coated freesheet paper, and laser paper.

According to still further features in the described preferred embodiments, an average single ink-dot or ink film thickness is at most 1,600 nm, at most 1,200 nm, at most 900 nm, at most 800 nm, at most 700 nm, at most 650 nm, at most 600 nm, at most 500 nm, at most 450 nm, or at most 400 nm.

According to still further features in the described preferred embodiments, the average single ink-dot thickness is within a range of 100-800 nm, 100-600 nm, 100-500 nm, 100-450 nm, 100-400 nm, 100-350 nm, 100-300 nm, 200-450 nm, 200-400 nm, or 200-350 nm.

According to still further features in the described preferred embodiments, the average single ink-dot thickness is at least 50 nm, at least 100 nm, at least 150 nm, at least 200 nm, at least 250 nm, at least 300 nm, or at least 350 nm.

According to still further features in the described preferred embodiments, the ink dot is laminated onto the surface of the printing substrate.

According to still further features in the described preferred embodiments, the total concentration of the colorant and the resin within the ink dot is at least 7%, at least 10%, at least 15%, at least 20%, at least 30%, at least 40%, at least 50%, at least 60%, at least 70%, or at least 85%.

According to still further features in the described preferred embodiments, the ratio of the surface concentration of nitrogen at the upper surface of the film to the bulk concentration of nitrogen within the film is at least 1.2:1, at least 1.3:1, at least 1.5:1, at least 1.75:1, at least 2:1, at least 3:1, or at least 5:1. ratio being at least 1.2:1, at least 1.3:1, at least 1.5:1, at least 1.75:1, at least 2:1, at least 3:1, or at least 5:1.

According to still further features in the described preferred embodiments, the atomic surface concentration ratio of nitrogen to carbon (N/C) at the upper film surface to the atomic bulk concentration ratio of nitrogen to carbon (N/C) at the depth, is at least 1.1:1, at least 1.2:1, at least 1.3:1, at least 1.5:1, at least 1.75:1, or at least 2:1.

According to still further features in the described preferred embodiments, the ink film contains at least one colorant dispersed in an organic polymeric resin.

According to still further features in the described preferred embodiments, the surface concentration of secondary amines, tertiary amines, and/or an ammonium group at the upper film surface exceeds their respective bulk concentrations at a depth of at least 30 nanometers below the film surface.

According to still further features in the described preferred embodiments, the upper film surface contains at least one polyethylene imine (PEI).

According to still further features in the described preferred embodiments, the upper film surface contains a secondary amine exhibiting an X-Ray Photoelectron Spectroscopy (XPS) peak at 402.0±0.4 eV, 402.0±0.3 eV, or 402.0±0.2 eV.

According to still further features in the described preferred embodiments, the upper film surface exhibits an X-Ray Photoelectron Spectroscopy (XPS) peak at 402.0±0.4 eV, 402.0±0.3 eV, or 402.0±0.2 eV.

According to still further features in the described preferred embodiments, the upper film surface contains a poly quaternium cationic guar.

According to still further features in the described preferred embodiments, the poly quaternium cationic guar includes at least one of a guar hydroxypropyltrimonium chloride and a hydroxypropyl guar hydroxypropyltrimonium chloride.

According to still further features in the described preferred embodiments, the upper film surface contains a polymer having at least one quaternary amine group.

According to still further features in the described preferred embodiments, the ammonium group includes a salt of a primary amine.

According to still further features in the described preferred embodiments, the salt includes, or consists of, an HCl salt.

According to still further features in the described preferred embodiments, the upper film surface contains a polymer or compound selected from the group consisting of poly(diallyldimethylammonium chloride), poly(4-vinylpyridine), polyallylamine, a vinyl pyrrolidone-dimethylaminopropyl methacrylamide co-polymer, a vinyl caprolactam-dimethylaminopropyl methacryamide hydroxyethyl methacrylate copolymer, a quaternized copolymer of vinyl pyrrolidone and dimethylaminoethyl methacrylate with diethyl sulfate.

According to still further features in the described preferred embodiments, the ink film has an average thickness of at most 5,000 nanometers, at most 4,000 nanometers, at most 3,500 nanometers, at most 3,000 nanometers, at most 2,500 nanometers, at most 2,000 nanometers, at most 1,500 nanometers, at most 1,200 nanometers, at most 1,000 nanometers, at most 800 nanometers, or at most 650 nanometers.

According to still further features in the described preferred embodiments, the ink film has an average thickness of at least 100 nanometers, at least 150 nanometers, or at least 175 nanometers.

According to still further features in the described preferred embodiments, the mean deviation from convexity is at most 0.04, at most 0.03, at most 0.025, at most 0.022, at most 0.02, at most 0.018, at most 0.017, at most 0.016, at most 0.015, or at most 0.014.

According to still further features in the described preferred embodiments, the square geometric projection has a side length within a range of 0.5 mm to 15 mm.

According to still further features in the described preferred embodiments, the square geometric projection has a side length of about 10 mm, 5 mm, 2 mm, 1 mm, 0.8 mm, or 0.6 mm.

According to still further features in the described preferred embodiments, the diameter of the inkjet dot is at least 7, at least 10, at least 12, at least 15, at least 18, or at least 20 micrometers.

According to still further features in the described preferred embodiments, the mean deviation from convexity is at most 0.013, at most 0.012, at most 0.010, at most 0.009, or at most 0.008.

According to still further features in the described preferred embodiments, the mean deviation from convexity for plastic substrates is at most 0.013, at most 0.012, at most 0.010, at most 0.009, or at most 0.008.

According to still further features in the described preferred embodiments, the plurality of ink dots exhibits, on the plastic printing substrate, an adhesive failure of at most 1%, or at most 5%, when subjected to a standard tape test.

According to still further features in the described preferred embodiments, the plurality of ink dots is substantially free of adhesive failure when subjected to a standard tape test.

According to still further features in the described preferred embodiments, the ink dot set has at least 20, at least 50, or at least 200 of the distinct ink dots.

According to still further features in the described preferred embodiments, the $DC_{dot\,mean}$ is at least 0.0005, at least 0.001, at least 0.0015, at least 0.002, at least 0.0025, at least 0.003, at least 0.004, at least 0.005, at least 0.006, at least 0.008, at least 0.010, at least 0.012, or at least 0.013.

According to still further features in the described preferred embodiments, the average thickness is within a range of 100-1,200 nm, 200-1,200 nm, 200-1,000 nm, 100-800 nm, 100-600 nm, 100-500 nm, 100-450 nm, 100-400 nm, 100-350 nm, 100-300 nm, 200-450 nm, 200-400 nm, or 200-350 nm.

According to still further features in the described preferred embodiments, the average thickness being at most 1,800 nm, at most 1,500 nm, at most 1,200 nm, at most 1,000 nm, at most 800 nm, at most 500 nm, at most 450 nm, or at most 400 nm.

According to still further features in the described preferred embodiments, the average thickness is at least 100 nm, at least 150 nm, at least 175 nanometers at least 200 nm, at least 250 nm, at least 300 nm, or at least 350 nm.

According to still further features in the described preferred embodiments, the mean deviation from roundness ($DR_{dot\,mean}$) being at most 0.60, at most 0.60, at most 0.50, at most 0.45, at most 0.40, at most 0.35, at most 0.30, at most 0.25, or at most 0.20.

According to still further features in the described preferred embodiments, $DC_{dot}$ is at most 0.04, at most 0.03, at most 0.025, at most 0.022, at most 0.02, at most 0.018, at most 0.017, at most 0.016, at most 0.015, at most 0.014, at most 0.013, at most 0.012, at most 0.011, or at most 0.010, for an uncoated substrate.

According to still further features in the described preferred embodiments, $DC_{dot}$ is at least 0.0005, at least 0.001, at least 0.0015, at least 0.002, at least 0.0025, at least 0.003, at least 0.004, at least 0.005, at least 0.006, or at least 0.008, for an uncoated substrate.

According to still further features in the described preferred embodiments, $DC_{dot}$ is at most 0.022, at most 0.02, at most 0.018, at most 0.016, at most 0.014, at most 0.012, at most 0.010, at most 0.008, at most 0.006, at most 0.005, or at most 0.004, for a commodity coated substrate.

According to still further features in the described preferred embodiments, $DC_{dot}$ is at least 0.0005, at least 0.001, at least 0.0015, at least 0.002, at least 0.0025, at least 0.003, or at least 0.0035, for the commodity coated substrate.

According to still further features in the described preferred embodiments, the uncoated printing substrate is a coated or uncoated offset substrate.

According to still further features in the described preferred embodiments, the fibrous printing substrate is a commodity-coated printing substrate.

According to still further features in the described preferred embodiments, the color gamut volume exhibited by the ink film construction is at least 520 kilo($\Delta E$)$^3$, at least 540 kilo($\Delta E$)$^3$, at least 560 kilo($\Delta E$)$^3$, or at least 580 kilo($\Delta E$)$^3$.

According to still further features in the described preferred embodiments, the plurality of continuous ink films have a plurality of single ink dots, disposed above an area of the substrate, the ink dots having an average thickness of at most 900 nanometers, at most 800 nanometers, at most 700 nanometers, at most 650 nanometers, at most 600 nanometers, at most 550 nanometers, or at most 500 nanometers.

According to still further features in the described preferred embodiments, the plurality of continuous ink films includes a plurality of single ink dots having a first thickness disposed above the area and a second thickness disposed below the area, within the substrate, a total of the first thickness and the second thickness being at most 900 nanometers, at most 800 nanometers, at most 700 nanometers, or at most 600 nanometers.

According to still further features in the described preferred embodiments, the first thickness, or the total thickness, is at most 0.8 micrometers, at most 0.7 micrometers, at most 0.65 micrometers, at most 0.6 micrometers, at most 0.55 micrometers, at most 0.5 micrometers, at most 0.45 micrometers, or at most 0.4 micrometers.

BRIEF DESCRIPTION OF THE DRAWINGS

The invention will now be described further, by way of example, with reference to the accompanying drawings, in which:

FIG. 1A shows a top view of a magnified image of a plurality of inkjet ink drops disposed on a paper substrate, according to an inkjet printing technology of the prior art;

FIG. 1B shows a top view of a magnified image of a plurality of inkjet ink films disposed on a paper substrate, according to the inkjet printing technology of the present invention;

FIGS. 2A-2C display three-dimensional laser-microscope acquired magnified images of ink splotches or films on paper substrates, obtained using various printing technologies, wherein: FIG. 2A is a magnified image of an offset splotch; FIG. 2B is a magnified image of a liquid electro-photography splotch (LEP); and FIG. 2C is a magnified image of an inventive inkjet ink film construction;

FIG. 2D shows a two-dimensional shape having the mathematical property of a convex set;

FIG. 2E shows a two-dimensional shape having the mathematical property of a non-convex set;

FIG. 2F is a schematic top projection of an ink film having a rivulet and an inlet, the schematic projection showing a smoothed projection of the ink image;

FIGS. 3A, 3B, and 3C show surface roughness and surface height measurements for the offset ink splotch construction, the LEP ink splotch construction, and the inventive inkjet ink film construction provided in FIGS. 2A-2C;

FIGS. 3D and 3E provide respective schematic cross-sectional views of an inventive ink film construction and an inkjet ink dot construction of the prior art, wherein the substrate is a fibrous paper substrate;

FIG. 5E-1 provides comparative bar graphs of the deviation from roundness for ink dot constructions produced according to some embodiments of the present invention, vs. ink dots produced using a reference ink formulation and printing method, for each of 10 fibrous substrates;

FIG. 5E-2 provides comparative bar graphs of deviation from convexity of the ink dot constructions of FIG. 5E-1, for each of the 10 fibrous substrates;

FIG. 5F-1 provides a magnified view of a field of ink dots on a commodity-coated fibrous substrate, produced using a commercially available aqueous, direct inkjet printer;

FIG. 5F-2 provides a magnified view of a field having an ink dot construction according to the present invention, in which the commodity-coated substrate is identical to that of FIG. 5F-1;

FIG. 5G-1 provides a magnified view of a field of ink dots on an uncoated fibrous substrate, produced using a commercially available aqueous, direct inkjet printer;

FIG. 5G-2 provides a magnified view of a field of an ink dot construction according to the present invention, in which the uncoated substrate is identical to that of FIG. 5G-1;

FIGS. 5H-1-5H-3 provide magnified views of ink dot constructions according to the present invention, in which an ink dot is printed on each of various plastic substrates;

FIG. 5H-4 provides a magnified top view and a cross-sectional, instrumental view of an inventive ink film construction having an ink dot disposed on a plastic substrate;

FIGS. 5H-5-5H-7 each provide a magnified view of a field having an ink dot construction according to the present invention, each field containing ink dots printed onto a respective plastic substrate;

FIGS. 6A-1 to 6J-2 provide images of ink splotches or films obtained using various printing technologies on uncoated (6A-1 to 6E-1) and coated (6F-1 to 6J-1) paper, and optical uniformity profiles (6A-2 to 6J-2) therefor;

FIG. 7 is a ramped-down temperature sweep plot of dynamic viscosity as a function of temperature, for several ink formulations of the present invention;

DETAILED DESCRIPTION OF THE ILLUSTRATED EMBODIMENTS

Figure 2A:
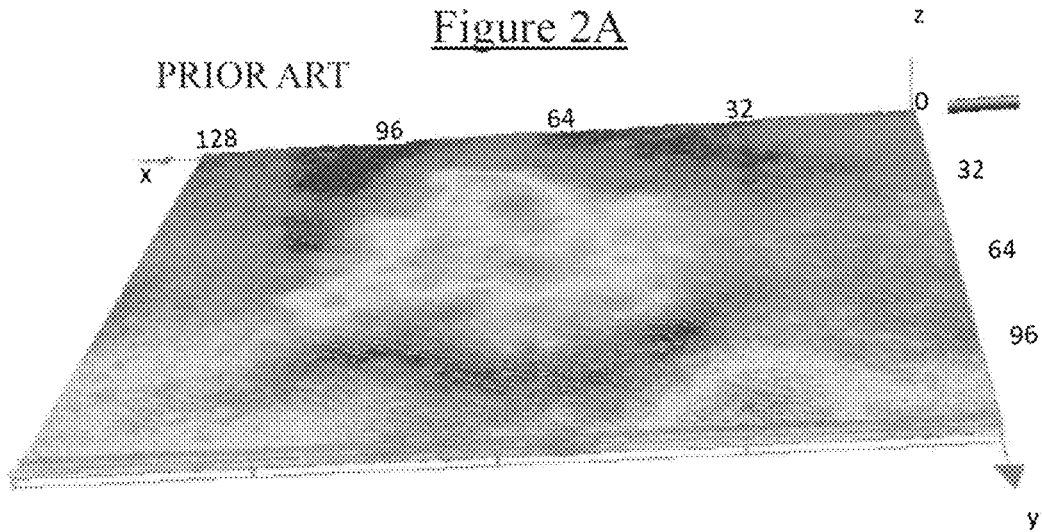

The ink film constructions according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Description of the Printing Process and System

The present invention is concerned with ink film constructions that may be obtained in particular by the following printing process or using any printing system implementing such process. A printing process suitable for the preparation of the ink films according to the invention includes directing droplets of an ink onto an intermediate transfer member to form an ink image, the ink including an organic polymeric resin and a colorant (e.g., a pigment or dye) in an aqueous carrier, and the transfer member having a hydrophobic outer surface, each ink droplet in the ink image spreading on impinging upon the intermediate transfer member to form an ink film (e.g., a thin film preserving a major part of the flattening and horizontal extension of the droplet present on impact or covering an area dependent upon the mass of ink in the droplet). The ink is dried while the ink image is being transported by the intermediate transfer member by evaporating the aqueous carrier from the ink image to leave a residue film of resin and colorant. The residue film is then transferred to a substrate (e.g., by pressing the intermediate transfer member against the substrate to impress the residue film thereupon). The chemical compositions of the ink and of the surface of the intermediate transfer member are selected such that attractive intermolecular forces between molecules in the outer skin of each droplet and on the surface of the intermediate transfer member counteract the tendency of the ink film produced by each droplet to bead under the action of the surface tension of the aqueous carrier, without causing each droplet to spread by wetting the surface of the intermediate transfer member.

The printing process sets out to preserve, or freeze, the thin pancake shape of each aqueous ink droplet, that is caused by the flattening of the ink droplet on impacting the surface of the intermediate transfer member (also termed the release layer), despite the hydrophobicity of such layer. To achieve this objective, this novel process relies on electrostatic interactions between molecules in the ink and in the outer surface of the transfer member, the molecules being either charged in their respective medium or being mutually chargeable, becoming oppositely charged upon interaction between the ink and the release layer. Further details on the printing processes, and related systems, suitable for the preparation of ink constructions according to the present invention are disclosed in co-pending PCT Application Nos. PCT/IB2013/051716 (Agent's reference LIP 5/001 PCT); PCT/IB2013/051717 (Agent's reference LIP 5/003 PCT); and PCT/IB2013/051718 (Agent's reference LIP 5/006 PCT).

For illustration, a conventional hydrophobic surface, such as a silicone coated surface, will yield electrons readily and is regarded as negatively charged. Polymeric resins in an aqueous carrier are likewise generally negatively charged. Therefore, in the absence of additional steps being taken the net intermolecular forces will cause the intermediate transfer member to repel the ink and the droplets will tend to bead into spherical globules.

In the novel printing process suitable for the preparation of ink film constructions according to the invention, the chemical composition of the surface of the intermediate transfer member is modified to provide a positive charge. This may be achieved, for example, by including in the surface of the intermediate transfer member (e.g., embedded in the release layer) molecules having one or more Brønsted base functional groups and in particular nitrogen comprising molecules. Suitable positively charged or chargeable groups include primary amines, secondary amines, and tertiary amines. Such groups can be covalently bound to polymeric backbones and, for example, the outer surface of the intermediate transfer member may include amino silicones. Further details on intermediate transfer members including in their release layer Brønsted base functional groups, suitable for the preparation of ink film constructions according to the present invention are disclosed in co-pending PCT Application No. PCT/IB2013/051751 (Agent's reference LIP 10/005 PCT).

Such positively chargeable functional groups of the molecules of the release layer may interact with Brønsted acid functional groups of molecules of the ink. Suitable negatively charged or chargeable groups include carboxylated acids such as having carboxylic acid groups (—COOH), acrylic acid groups (—CH$_2$=CH—COOH), methacrylic acid groups (—CH$_2$=C(CH$_3$)—COOH) and sulfonates such as having sulfonic acid groups (—SO$_3$H). Such groups can be covalently bound to polymeric backbones and preferably be water soluble or dispersible. Suitable ink molecules may for example comprise acrylic-based resins such as an acrylic polymer and an acrylic-styrene copolymer having carboxylic acid functional groups. Further details on ink compositions that may be used to achieve the ink film constructions according to the present invention are disclosed in co-pending PCT Application No. PCT/IB2013/051755 (Agent's reference LIP 11/001 PCT).

An alternative for negating the repelling of the ink droplets by the negatively charged hydrophobic surface of the intermediate transfer member is to apply a conditioning or pre-treatment solution to the surface of the intermediate transfer member to reverse its polarity to positive. One can look upon such treatment of the transfer member as applying a very thin layer of a positive charge that is itself adsorbed onto the surface of the release layer but presents on its opposite side a net positive charge with which the negatively charged molecules in the ink may interact. Intermediate transfer members amenable to such treatment may, for example, comprise in their release layer silanol-, sylyl- or silanc-modified or terminated polydialkyl-siloxane silicones and further details on suitable ITMs are disclosed in co-pending PCT Application No. PCT/IB2013/051743 (Agent's reference LIP 10/002 PCT).

Chemical agents suitable for the preparation of such conditioning solutions, if required, have relatively high charge density and can be polymers containing amine nitrogen atoms in a plurality of functional groups, which need not be the same and can be combined (e.g., primary, secondary, tertiary amines or quaternary ammonium salts). Though macromolecules having a molecular weight from a few hundred to a few thousand can be suitable conditioning agents, it is believed that polymers having a high molecular weight of 10,000 g/mole or more are preferable. Suitable conditioning agents include guar hydroxylpropyltrimonium chloride, hydroxypropyl guar hydroxypropyl-trimonium chloride, linear or branched polyethylene imine, modified polyethylene imine, vinyl pyrrolidone dimethylaminopropyl methacrylamide copolymer, vinyl caprolactam dimethylaminopropyl methacrylamide hydroxyethyl methacrylate, quaternized vinyl pyrrolidone dimethylaminoethyl methacrylate copolymer, poly(diallyldimethyl-ammonium chloride), poly (4-vinylpyridine) and polyallylamine. Further details on elective conditioning solutions suitable for the preparation of ink film constructions according to the present invention are disclosed in co-pending PCT Application No. PCT/IB2013/000757 (Agent's reference LIP 12/001 PCT).

The disclosure of the afore-mentioned applications of the same Applicant, incorporated by reference in their entirety as if fully set forth herein, may overlap with current disclosure, but it should be made clear that the present invention is not restricted to such a process, using the intermediate transfer members, elective conditioning solutions, and ink compositions exemplified therein. Relevant parts of the disclosure of these applications are included herein for the convenience of the reader.

Description of the Ink

The inventors have found that that the inventive ink film constructions, if for instance obtained by the above-described printing system and process, may require an ink or an inkjet ink having particular chemical and physical properties. These physical properties may include one or more thermo-rheological properties.

According to one embodiment of the invention, there is provided an exemplary inkjet ink formulation (Example 1) containing:

| | |
|---|---|
| Pigment: Jet Magenta DMQ (BASF) | 2% |
| Joncryl HPD 296 (35.5% water solution) (BASF) | 30% |
| Glycerol (Aldrich) | 20% |
| BYK 345 (BYK) polyether modified polydimethylsiloxane | 0.5% |
| Water (distilled) | Balance to 100% |

Nominally, the resin solution may be, or include, an acrylic styrene co-polymer (or co(ethylacrylate metacrylic acid) solution. The average molecular weight may be less than 20,000 g/mole.

Preparation Procedure:

A pigment concentrate, containing pigment (10%), distilled water (70%) and resin, in the present case, Joncryl HPD 296 (20%), was made from the above-described components. The pigment, water and resin were mixed and milled using a homemade milling machine. Alternatively, the milling may be performed using any one of many commercially available milling machines deemed suitable by one of ordinary skill in the art. The progress of milling was controlled by particle size measurement (Malvern, Nanosizer). The milling was stopped when the average particle size ($d_{50}$) reached about 70 nanometers (nm). The rest of the components were then added to the pigment concentrate to produce the above-described exemplary inkjet ink formulation. After mixing, the ink was filtered through a 0.5-micrometer (μm) filter.

The viscosity of the solution was about 9 cP at 25° C. Surface tension at 25° C. was approximately 25 mN/m.

Various other milling procedures and milling apparatus will be apparent to those of ordinary skill in the art. Various commercially available nano-pigments may be used in the inventive ink formulations. These include pigment preparations such as Hostajet Magenta E5B-PT and Hostajet Black O-PT, both by Clariant as well as pigments demanding post-dispersion processes, such as Cromophtal Jet Magenta DMQ and Irgalite Blue GLO, both by BASF.

One of ordinary skill in the art may readily recognize that various known colorants and colorant formulations may be used in the inventive ink or inkjet ink formulations. In one embodiment, such pigments and pigment formulations may include, or consist essentially of, inkjet colorants and inkjet colorant formulations.

Alternatively or additionally, the colorant may be a dye. Examples of dyes suitable for use in the ink formulations of the present invention include: Duasyn Yellow 3GF-SF liquid, Duasyn Acid Yellow XX-SF, Duasyn Red 3B-SF liquid, Duasynjet Cyan FRL-SF liquid (all manufactured by Clariant); Basovit Yellow 133, Fastusol Yellow 30 L, Basacid Red 495, Basacid Red 510 Liquid, Basacid Blue 762 Liquid, Basacid Black X34 Liquid, Basacid Black X38 Liquid, Basacid Black X40 Liquid (all manufactured by BASF).

The following examples illustrate some ink compositions in accordance with embodiments of the invention. Printing tests employing such ink compositions in the method described in co-pending PCT application No. PCT/1112013/051716 (Agent's reference LIP 5/001 PCT) show good transfer to various paper and plastic substrates.

Example 2

An inkjet ink formulation was prepared containing:

| Ingredient | Function | wt. % |
|---|---|---|
| PV Fast Blue BG (Clariant) | Pigment | 2.3 |
| Neocryl BT-9 (40% water dispersion (DSM resins) | Resin | 16.5 |
| Glycerol (Aldrich) | Water-miscible co-solvent | 3.3 |
| Capstone FS-65 (DuPont) | Non-ionic fluorosurfactant | 0.1 |

| Ingredient | Function | wt. % |
| --- | --- | --- |
| Water (distilled) | — | Balance to 100% |
| Joncryl HPD 296 (35.5% water solution) (BASF) | Dispersant | 3.2 (solid resin) |
| Diethyleneglycol (Aldrich) | Water-miscible co-solvent | 20 |
| Diethyl amine (Aldrich) | pH adjustment (basic) | 1 |

Preparation Procedure:

A pigment concentrate, containing pigment (14%), water (79%) and Joncryl HPD 296 (7%) were mixed and milled. The progress of milling was controlled on the basis of particle size measurements (Malvern, Nanosizer). The milling was stopped when the average particle size ($d_{50}$) reached 70 nm. The remaining materials were then added to the pigment concentrate and mixed. After mixing, the ink was filtered through a 0.5 μm filter.

At 25° C., the viscosity of the ink thus obtained was about 13 cP, the surface tension about 27 mN/m, and the pH 9-10.

Example 3

An inkjet ink formulation was prepared containing:

| Ingredient | Function | wt. % |
| --- | --- | --- |
| Jet Magenta DMQ (BASF) | Pigment | 2.3 |
| Neocryl BT-26 (40% water dispersion) (DSM resins) | Resin | 17.5 |
| Monoethanol amine | pH adjustment (basic) | 1.5 |
| Propylene glycol | Water-miscible co-solvent | 20 |
| N-methylpyrrolidone | Water-miscible co-solvent | 10 |
| BYK 349 (RYK) | surfactant (silicone) | 0.5 |
| Water (distilled) | — | Balance to 100% |

Preparation Procedure:

The pigment (10%), water (69%), Neocryl BT-26 (20%) and monoethanol amine (1%) were mixed and milled until the average particle size ($d_{50}$) reached 70 nm as described in Example 2. The rest of the materials were then added to the pigment concentrate and mixed. After mixing, the ink was filtered through a 0.5 μm filter.

At 25° C., the viscosity of the ink thus obtained was about 8 cP, the surface tension was approximately 24 mN/m, and the pH was 9-10.

Example 4

An inkjet ink formulation was prepared containing:

| Ingredient | Function | wt. % |
| --- | --- | --- |
| Jet Magenta DMQ (BASF) | Pigment | 2.2 |
| Joncryl 683 neutralized with KOH (BASF) | Dispersant | 0.6 (solid resin) |
| Neocryl BT-9 (40% water dispersion) (DSM resins) | Resin | 25 |
| Ethylene glycol | Water-miscible co-solvent | 25 |
| Propylene glycol | Water-miscible co-solvent | 10 |
| PEG 400 | Water-miscible co-solvent | 2 |
| Glycerol | Water-miscible co-solvent | 3 |
| BYK 349 (BYK) | surfactant (silicone) | 0.5 |
| Water (distilled) | — | Balance to 100% |

Preparation Procedure:

The pigment (12.3%), Joncryl 683 (3.3%) fully neutralized with a 30% solution of KOH (7.9%) and water (balance) were mixed and milled until the average particle size ($d_{50}$) reached 70 nm as described in Example 2. The rest of the materials were then added to the pigment concentrate and mixed. After mixing, the ink was filtered through a 0.5 μm filter.

At 25° C., the viscosity of the ink thus obtained was about 7 cP, the surface tension was approximately 24 mN/m, and the pH was 7-8.

Example 5

An inkjet ink formulation was prepared containing:

| Ingredient | Function | wt. % |
| --- | --- | --- |
| Carbon Black Mogul L (Cabot) | Pigment | 2.2 |
| Joncryl 671 neutralized with KOH (BASF) | Dispersant | 0.6 (solid resin) |
| NeoRad R-440 (40% water emulsion) (DSM resins) | Resin | 30 |
| Propylene glycol | Water-miscible co-solvent | 40 |
| 2-Amino-2-Methyl-1-Propanol | pH adjustment (basic) | 1 |
| Glycerol | Water-miscible co-solvent | 5 |
| BYK 349 (BYK) | surfactant (silicone) | 0.5 |
| Water (distilled) | — | Balance to 100% |

Preparation Procedure:

The pigment (14.6%), Joncryl 671 (3.9%) fully neutralized with a 30% solution of KOH (9.4%) and water (balance) were mixed and milled as described in Example 2, until the average particle size ($d_{50}$) reached 70 nm. The rest of the materials were then added to the pigment concentrate and mixed. After mixing, the ink was filtered through a 0.5 μm filter.

At 25° C., the viscosity of the ink thus obtained was about 10 cP, the surface tension was approximately 26 mN/m, and the pH was 9-10.

With respect to the foregoing examples, various other milling procedures will be apparent to those of ordinary skill in the art.

Example 6

An inkjet ink formulation was prepared containing:

| Ingredient | wt. % |
| --- | --- |
| Hostajet Black O-PT (Clariant) | 2.4 |
| Neocryl BT-26, 40% water dispersion (DSM resin) | 18.0 |
| Monoethanol amine | 1.5 |
| Propylene glycol | 20 |
| N-methylpyrrolidone | 10 |
| BYK 349 (BYK) | 0.5 |
| Water | Balance to 100% |

The above-provided formulation contains approximately 9.6% ink solids, of which 25% (2.4% of the total formulation) is pigment, and about 75% (40%*18%=7.2% of the total formulation) is resin, by weight.

Example 7

An inkjet ink formulation was prepared containing:

| | |
|---|---|
| Duasyn Red 3B-SF liquid (Clariant) | 4% |
| Joncryl 296 HPD (35.5% solution in water) | 20% |
| Diethylene glycol | 20% |
| N-methylpyrrolidone | 10% |
| BYK 333 | 0.5% |
| Water (distilled) | balance to 100% |

Example 8

An inkjet ink formulation was prepared containing:

| Ingredient | Function | wt. % |
|---|---|---|
| Jet Magenta DMQ | Pigment | 2 |
| Neocryl BT-102 (40% water dispersion) (DSM resins) | Resin | 20 (8 = solid resin) |
| Propylene Glycol (Aldrich) | Water-miscible co-solvent | 20 |
| BYK 348 | Non-ionic fluorosurfactant | 0.2 |
| Disperbyk 198 | Dispersant | 2 |
| Water (distilled) | — | Balance to 100% |

Preparation Procedure:

A pigment concentrate, containing pigment (14%), water (72%) and Disperbyk 198 (14%) were mixed and milled. The progress of milling was controlled on the basis of particle size measurements (Malvern, Nanosizer). The milling was stopped when the average particle size ($d_{50}$) reached 70 nm. The remaining materials were then added to the pigment concentrate and mixed. After mixing, the ink was filtered through a 0.5 µm filter.

At 25° C., the viscosity of the ink thus obtained was about 5.5 cP, the surface tension about 25 mN/m, and the pH 6.5.

Example 9

An inkjet ink formulation was prepared:

| Ingredient | Function | wt. % |
|---|---|---|
| Novoperm Yellow P-HG (Clariant) | Pigment | 1.1 |
| Paliotol YeHow L 1155 (BASF) | Pigment | 1.1 |
| Joncryl 671 neutralized with KOH (BASF) | Dispersant | 0.6 (solid resin) |
| NeoRad R-440 (40% water emulsion) (DSM resins) | Resin | 30 |
| Propylene glycol | Water-miscible co-solvent | 40 |
| 2-Amino-2-Methyl-1-Propanol | pH adjustment (basic) | 1 |
| BYK 349 (BYK) | surfactant (silicone) | 0.5 |
| Water (distilled) | — | Balance to 100% |

Preparation Procedure:

The pigment (14.6%), Joncryl 671 (3.9%), fully neutralized with a 30% solution of KOH (9.4%), and water (balance) were mixed and milled as described in Example 2, until the average particle size ($d_{50}$) reached 70 nm. The rest of the materials were then added to the pigment concentrate and mixed. After mixing, the ink was filtered through a 0.5 µm filter.

At 25° C., the viscosity of the ink thus obtained was about 9 cP, the surface tension was approximately 26 mN/m, and the pH was 9-10.

Ink Film Constructions

Referring now to the drawings, FIG. 1A is a magnified image of a plurality of inkjet ink drops disposed near a top surface of a fibrous (paper) substrate, according to a prior-art technology. In this prior art ink and substrate construction, the inkjet ink drops have penetrated the surface of the paper. Such a construction may be typical of various types of paper, including uncoated paper, in which the paper may draw ink carrier solvent and pigment within the matrix of the paper fibers.

FIG. 1B is a magnified image of a plurality of exemplary ink film constructions, such as inkjet ink film constructions, according to one embodiment of the present invention. In contrast to the prior art ink and substrate construction provided in FIG. 1A, the inventive inkjet ink film construction may be characterized by well-defined individual ink films, disposed generally above, and adhering to, the fibrous substrate. The single-drop inkjet films shown in FIG. 1B exhibit superior optical density. These characteristics are particularly notable when compared with the characteristics of the prior an ink and substrate construction, which exhibits poorly formed inkjet ink drops or splotches having a low optical density.

Figure 2B:
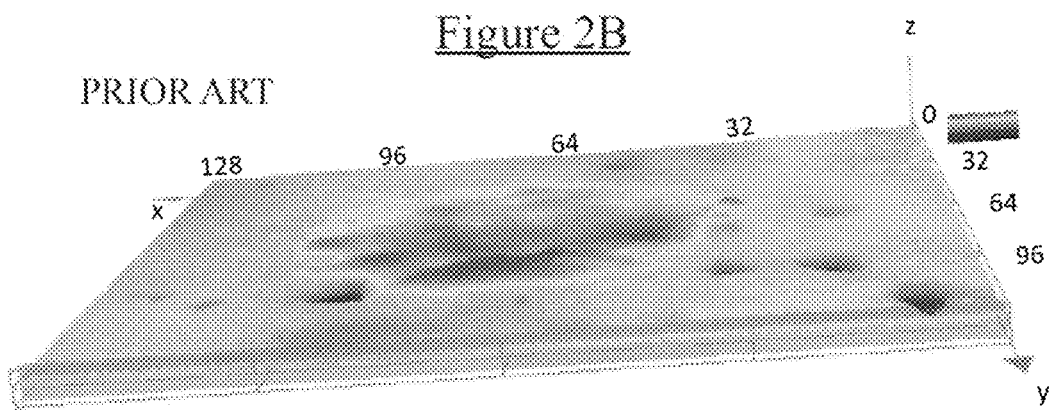
Figure 2C:
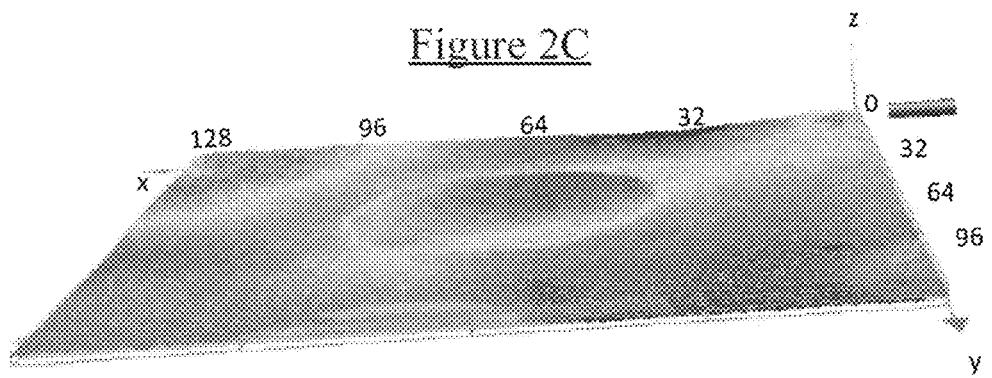

A laser-microscope was used to produce comparative, highly magnified images of prior-art ink splotches disposed under a top surface of a sheet of paper. FIGS. 2A, 2B, and 2C are respective three-dimensional magnified images of a lithographic offset ink splotch (FIG. 2A), a liquid electrophotography (LEP) of HP-Indigo ink splotch (FIG. 2B), and an inkjet single-drop ink film (FIG. 2C) produced according to an embodiment of the present invention.

The inkjet single-drop ink film (or individual ink dot) was produced using the inventive system and apparatus described herein, using the inventive in formulation provided herein.

The above-referenced ink splotches of the prior art are commercially available. The offset sample was produced by a Ryobi 755 press, using BestACK process ink by Roller Tiger (Toka Shikiso Chemical Industry). The LEP sample was produced by a HP Indigo 7500 digital press, using HP Indigo ink. With reference to the substrates, the uncoated substrates were Mondy 170 gsm paper; the coated substrates were APP 170 gsm paper.

Laser microscopy imaging was performed using an Olympus LEXT 3D measuring laser microscope, model OLS4000. The film (dot, drop, or splotch) height above each substrate and the surface roughness of each film or splotch analyzed were calculated by the microscope system in a semi-automatic fashion.

The perimeter of the offset ink splotch and the perimeter of the LEP ink splotch have a plurality of protrusions or rivulets, and a plurality of inlets or recesses. These ink forms may be irregular, and/or discontinuous. By contrast, the inkjet ink dot (FIG. 2C) produced according to the present invention has a manifestly rounded, convex, shape. The perimeter of the ink film is relatively smooth, regular, continuous and well defined.

More particularly, projections of the ink film of the invention against the substrate surface (i.e., projections from a top view) tend to be rounded, convex projections that form a convex set, i.e., for every pair of points within the projection, every point on the straight line segment that joins them is also within the projection. Such a convex set is shown in FIG. 2D. By sharp contrast, the rivulets and inlets in the projections of various prior-art define those projections as a non-convex sets, i.e., for at least one straight line segment within a particular projection, a portion of that straight line segment is disposed outside the projection, as illustrated in FIG. 2E.

It must be emphasized that ink images may contain an extremely large plurality of individual or single ink films. For example, a 5 mm by 5 mm ink image, at 600 dpi, may contain more than 10,000 of such single ink films. Therefore, it may be appropriate to statistically define the ink film constructions of the present invention: at least 10%, at least 20%, or at least 30%, and more typically, at least 50%, at least 70%, or at least 90%, of the single ink dots, or projections thereof, may be convex sets. These ink dots are preferably selected at random.

It must be further emphasized that ink images may not have crisp boundaries, particularly when those boundaries are viewed at high magnification. Therefore, it may be appropriate to relax the definition of the convex set whereby non-convexities (rivulets or inlets) having a radial length $L_r$ (as shown in FIG. 2F) of up to 3,000 nm, up to 1,500 nm, up to 1,000 nm, up to 700 nm, up to 500 nm, up to 300 nm, or up to 200 nm, are ignored, excluded, or are "smoothed", whereby the ink film or ink film projection is considered to be a convex set. The radial length $L_r$ is measured by drawing a radial line L from the center point C of the ink film image, through a particular rivulet or inlet. The radial length $L_r$ is the distance between the actual edge of the rivulet or inlet, and a smoothed projection $P_s$ of the ink image, devoid of that rivulet or inlet, and matching the contour of the ink film image.

In relative terms, it may be appropriate to relax the definition of the convex set whereby non-convexities (rivulets or inlets) having a radial length of up to 15% of the film/drop/splotch diameter or average diameter, up to 10%, and more typically, up to 5%, up to 3%, up to 2%, or up to 1%, are ignored, excluded, or are "smoothed", as above, whereby the ink film or ink film projection is considered to be a convex set.

Figure 3A:
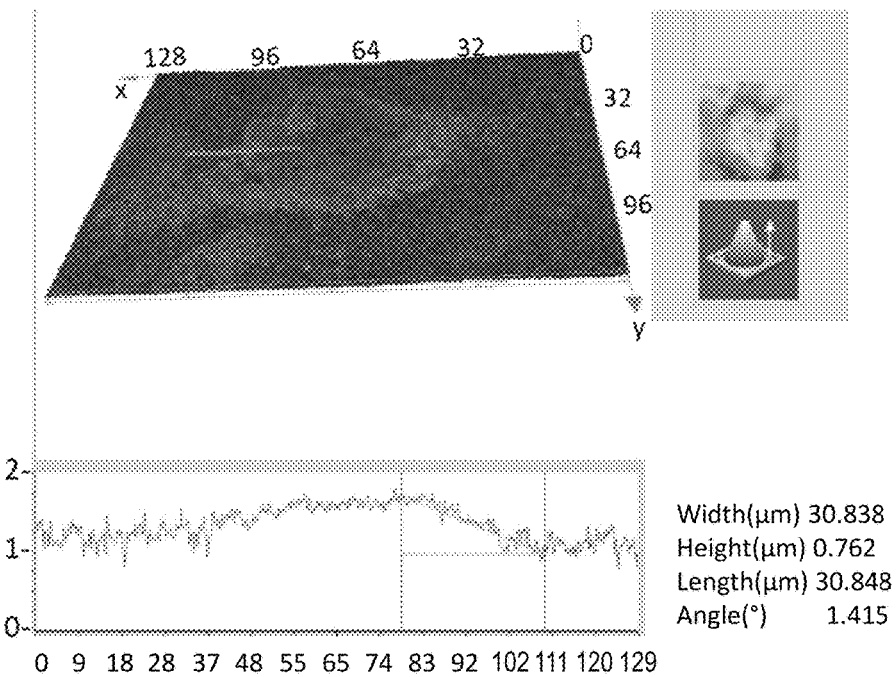
Figure 3B:
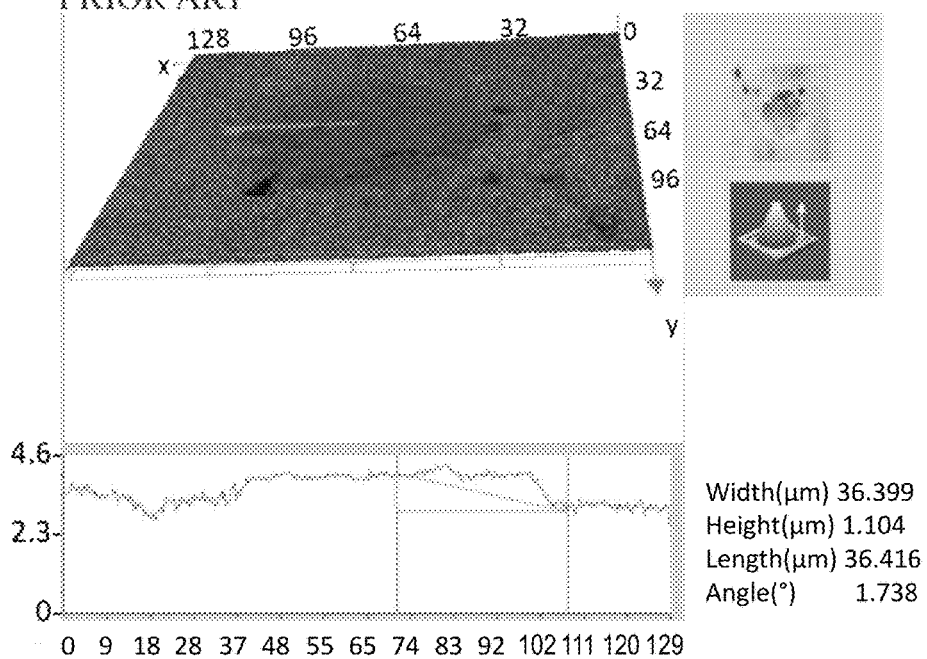

FIGS. 3A, 3B, and 3C show surface roughness and surface height measurements for the offset ink splotch, the LEP ink splotch, and the inkjet ink film provided in FIGS. 2A-2C. The instrumentally measured heights (H) or thicknesses of the three samples were 762 nm for the offset ink drop and 1104 nm for the LEP ink drop. By sharp contrast, the instrumentally measured height of the inventive inkjet ink film ($H_{film}$) is 355 nm.

Repeating the above-described comparative study several times, using additional ink film specimens, appears to confirm these results for the prior art ink films. The LEP specimens typically had a height or thickness within a range of 900-1150 nm, while the lithographic offset specimens typically had a height or thickness within a range of 750-1200 nm.

With regard to ink dots or films produced from jetted ink drops, we have found that the maximum average supra-substrate thickness of the ink dot may be calculated from the following equation:

$$T_{AVG(MAX)} = V_{DROP}/[A_{FILM} * R_{VOL}] \qquad (1)$$

wherein:

$T_{AVG(MAX)}$ is the maximum average supra-substrate thickness;

$V_{DROP}$ is the volume of the jetted drop, or a nominal or characteristic volume of a jetted drop (e.g., a nominal volume provided by the inkjet head manufacturer or supplier);

$A_{FILM}$ is the measured or calculated area of the ink dot; and $R_{VOL}$ is a dimensionless ratio of the volume of the original ink to the volume of the dried ink residue produced from that ink.

By way of example, an ink dot disposed on a plastic printing substrate has an area of 1075 square micrometers. The nominal size of the jetted drop is 10.0±0.3 picoliters. $R_{VOL}$ was determined experimentally: a vessel containing 20.0 ml of the ink was heated at 130° C. until a dry residue was obtained. The residue had a volume of 1.8 ml. Plugging into Equation (1), $T_{AVG(MAX)}$=10 picoliters/[1075 μm$^2$*(20.0/1.8)]=837 nanometers.

For generally round ink dots, the area of the ink dot may be calculated from the ink dot diameter. Moreover, we have found that the dimensionless ratio $R_{VOL}$ is generally about 10 for a wide variety of inkjet inks.

While for inks that penetrate into the substrate, the actual average thickness may be somewhat less than $T_{AVG(MAX)}$, this calculation may reliably serve as an upper bound for the average thickness. Moreover, in the case of various plastic substrates, and in the case of various premium coated substrates, the maximum average supra-substrate thickness may substantially equal the average supra-substrate thickness. In the case of various commodity-coated substrates, the maximum average supra-substrate thickness may approach the average supra-substrate thickness, often within 100 nanometers, 200 nanometers, or 300 nanometers.

With regard to ink dots or films produced from jetted ink drops, we have found that the maximum average supra-substrate thickness of the ink dot may be calculated from the following equation:

$$T_{AVG(MAX)} = [V_{DROP} * \rho_{INK} * F_{nRESIDUE}]/[A_{FILM} * \rho_{FILM}] \qquad (II)$$

wherein:

$\rho_{INK}$ is the specific gravity of the ink;

$F_{nRESIDUE}$ is the weight of the dried ink residue divided by the weight of the original ink; and $\rho_{FILM}$ is the specific gravity of the ink.

Typically, the ratio of $\rho_{INK}$ to $\rho_{FILM}$ is approximately 1, such that Equation (II) may be simplified to:

$$T_{AVG(MAX)} = [V_{DROP} * F_{nRESIDUE}]/A_{FILM} \qquad (III)$$

For a wide variety of aqueous ink jet inks, $F_{nRESIDUE}$ roughly equals the weight fraction of solids in the ink jet ink.

Using the above-described Olympus LEXT 3D measuring laser microscope, the height of above the substrate surface was measured for various ink clot constructions.

Atomic Force Microscopy (AFM) is another, highly accurate measurement technique for measuring height and determining ink dot thickness on a substrate. AFM measurements may be performed using commercially available apparatus, such as a Park Scientific Instruments Model Autoprobe CP, Scanning Probe Microscopy equipped with Proscan version 1.3 software (or later). The use of AFM is described in depth in the literature, for example, by Renmei Xu, et al., "The Effect of Ink Jet Papers Roughness on Print Gloss and Ink Film Thickness" [Department of Paper Engineering, Chemical Engineering, and Imaging Center for Ink and Printability, Western Michigan University (Kalamazoo, Mich.)].

With regard to the ink film constructions of the present invention, the inventors have found that the thickness of the dry ink film on the substrate may be adjusted by modifying the inkjet ink formulation. To obtain a lower dot thickness, such modifying may entail at least one of the following:

reducing the resin to pigment ratio;
selecting a resin or resins enabling adequate film transfer, even with a reduced resin to pigment ratio;
utilizing finer pigment particles;
reducing the absolute quantity of pigment.

To obtain thicker dots, at least one of the opposite modifications (e.g., increasing the resin to pigment ratio) may be made.

Such changes in the formulation may necessitate, or make advantageous, various modifications in the process operating conditions. The inventors have found that lower resin to pigment ratios may require a relatively high transfer temperature.

For a given inkjet ink formulation, an elevated transfer temperature may reduce ink film thickness. Increased pressure of the pressure roller or cylinder toward the impression cylinder during the transfer of the residue film to a substrate at the impression station may also reduce ink film thickness. Also, ink film thickness may be reduced by increasing the time of contact between the substrate and the intermediate transfer member, interchangeably termed herein an "image transfer member" and both abbreviated ITM.

All this notwithstanding, a practical minimum characteristic (i.e., median) thickness or average thickness for ink films produced according to the present invention may be about 100 nm. More typically, such ink films may have a thickness of at least 125 nm, at least 150 nm, at least 175 nm, at least 200 nm, at least 250 nm, at least 300 nm, at least 350 nm, at least 400 nm, at least 450 nm, or at least 500 nm.

Using the above-provided film thickness guidelines, the inventors are able to obtain inventive film constructions having a characteristic thickness or average thickness of at least 600 nm, at least 700 nm, at least 800 nm, at least 1,000 nm, at least 1,200 nm; or at least 1,500 nm. The characteristic thickness or average thickness of a single drop film (or an individual ink dot) may be at most about 2,000 nm, at most 1,800 nm, at most 1,500 nm, at most 1,200 nm, at most 1,000 nm, or at most 900 nm. More typically, the characteristic thickness or average thickness of a single drop film may be at most 800 nm, at most 700 nm, at most 650 nm, at most 600 nm, at most 500 nm, at most 450 nm, at most 400 nm, or at most 350 nm.

Using the film thickness guidelines delineated hereinabove, the inventors are able to obtain inventive film constructions in which a characteristic thickness or average thickness of the ink film may be within a range of 100 nm, 125 nm or 150 nm up to 1,800 nm, 1,500 nm, 1,200 nm, 1,000 nm, 800 nm, 700 nm, 600 nm, 550 nm, 500 nm, 450 nm, 400 nm, or 350 nm. More typically, the characteristic thickness or average thickness of the ink film may be within a range of 175 nm, 200 nm, 225 nm or 250 nm up to 800 nm, 700 nm, 650 mm, 600 nm, 550 nm, 500 nm, 450 nm, or 400 nm. Suitable optical density and optical uniformity may be obtained, using the system, process, and ink formulations of the present invention.

Aspect Ratio

The inventors have found that the diameter of an individual ink dot in the ink film constructions of the present invention may be adjusted, inter alia, by selection of a suitable ink delivery system for applying the ink (e.g., jetting) onto the ITM, and by adjusting the ink formulation properties (e.g., surface tension) to the requirements of the particular ink head.

This ink film diameter, $D_{dot}$, or the average dot diameter on the substrate surface, $D_{dot\ average}$, may be at least 10 micrometers, at least 15 µm, or at least 20 µm, and more typically, at least 30 µm, at least 40 µm, at least 50 µm, at least 60 µm, or at least 75 µm. $D_{dot}$ or $D_{dot\ average}$ may be at most 300 micrometers, at most 250 µm, or at most 200 µm, and more typically, at most 175 µm, at most 150 µm, at most 120 µm, or at most 100 µm.

Generally $D_{dot}$ or $D_{dot\ average}$ may be in the range of 10-300 micrometers, 10-250 µm, 15-250 µm, 15-200 µm, 15-150 µm, 15-120 µm, or 15-100 µm. More typically, with the currently used ink formulations, and a particular ink head, $D_{dot}$ or $D_{dot\ average}$ may be in the range of 20-120 µm, 25-120 µm, 30-120 µm, 30-100 µm, 40-120 µm, 40-100 µm, or 40-80 µm.

Each single-drop ink film or individual ink dot is characterized by a dimensionless aspect ratio defined by:

$$R_{aspect} = D_{dot}/H_{dot}$$

wherein $R_{aspect}$ is the aspect ratio; $D_{dot}$ is a diameter, characteristic diameter, average diameter, or longest diameter of the dot; and $H_{dot}$ is a thickness, characteristic thickness, or average thickness of the dot, or the height of the top surface of dot with respect to the substrate.

The aspect ratio may be at least 15, at least 20, at east 25, or at least 30, and more typically, at least 40, at least 50, at least 60, at least 75. In many cases, the aspect ratio may be at least at least 95, at least 110, or at least 120. The aspect ratio is typically below 200 or below 175.

Penetration

In the ink film constructions of the present invention, the ink dot may essentially be laminated onto atop surface of the priming substrate. As described herein, the form of the dot may be determined or largely determined prior to the transfer operation, and the dot is transferred as an integral unit to the substrate. This integral unit may be substantially devoid of solvent, such that there may be no penetration of any kind of material from the blanket transfer member into, or between, substrate fibers. The continuous dot, which may largely contain organic polymeric resin and colorant, adheres to, or forms a laminated layer on, the top surface of the fibrous printing substrate.

Such continuous dots are typically produced by various inkjetting technologies, such as drop-on-demand and continuous jetting technologies.

The organic polymeric resins used in conjunction with the present invention are typically water soluble or water dispersible.

FIGS. 3D and 3E provide schematic cross-sectional views of an inventive ink film construction 300 and an inkjet ink splotch or film construction 370 of the prior art, respectively. Referring now to FIG. 3E, inkjet ink film construction 370 includes a single-drop ink splotch 305 adhering to, or laminated to, a plurality of substrate fibers 320 in a particular continuous area of a fibrous printing substrate 350. Fibrous printing substrate 350 may be, by way of example, an uncoated paper such as bond, copy, or offset paper. Fibrous printing substrate 350 may also be one of various commodity coated fibrous printing substrates, such as a coated offset paper.

A portion of ink splotch 305 is disposed below the top surface of substrate 350, between fibers 320. Various components of the ink, including a portion of the colorant, may penetrate the top surface along with the ink carrier solvent, to at least partially fill a volume 380 disposed between fibers 320. As shown, a portion of the colorant may diffuse or migrate underneath fibers 320, to a volume 390 disposed beneath fibers 320. In some cases (not shown), some of the colorant may permeate into the fibers.

By sharp contrast, inventive ink film construction 300 (in FIG. 3D) includes an integral continuous ink dot such as individual ink dot 310, disposed on, and fixedly adhering (or laminated) to, a top surface of a plurality of substrate fibers 320, in a particular continuous area of fibrous printing substrate 350. The adhesion or lamination may be, primarily or substantially, a physical bond. The adhesion or lamination may have little, or substantially no, chemical bonding character or more specifically, no ionic bonding character.

Ink dot 310 contains at least one colorant dispersed in an organic polymeric resin. Within the particular continuous area of fibrous substrate 350, there exists at least one direction (as shown by arrows 360—several directions) perpendicular to the top surface of printing substrate 350. With respect to all the directions normal to this top surface over all of the dot area, ink dot 310 is disposed entirely above the area. The volume 380 between fibers 320 and the volume 390 underneath fibers 320 are devoid, or substantially devoid, of colorant, resin, and any and all components of the ink.

The thickness ($H_{dot}$) of single-drop ink film or individual ink dot 310 may be at most 1,800 nm, at most 1,500 nm, at most 1,200 nm, at most 1,000 nm, or at most 800 nm, and more typically, at most 650 nm, at most 600 nm, at most 550 nm, at most 500 nm, at most 450 nm, or at most 400 nm. The thickness ($H_{dot}$) of single-drop ink dot 310 may be at least 50 nm, at least 100 nm, or at least 125 nm, and more typically, at least 150 nm, at least 175 nm, at least 200 nm, or at least 250 nm. The extent of penetration of an ink into a printing substrate may be quantitatively determined using various analytical techniques, many of which will be known to those of ordinary skill in the art. Various commercial analytical laboratories may perform such quantitative determination of the extent of penetration.

These analytical techniques include the use of various staining techniques such as osmium tetroxide staining (see Patrick Echlin, "Handbook of Sample Preparation for Scanning Electron Microscopy and X-Ray Microanalysis" (Springer Science+Business Media, LLC 2009, pp. 140-143).

One alternative to staining techniques may be particularly suitable to inks containing metals such as copper. Time of Flight Secondary Ion Mass Spectrometry (TOF-SIMS) was performed using a TOF-SIMS V Spectrometer [Ion-ToF (Münster, Germany)]. This apparatus provides elemental and molecular information with regard to the uppermost layer of organic and inorganic surfaces, and also provides depth profiling and imaging having depth resolution on the nanometric scale, submicron lateral resolution and chemical sensitivity on the order of 1 ppm.

Translation of the raw data of the TOE-SIMS into concentration may be performed by normalizing the signals obtained to the carbon (C+) concentration measured by X-ray Photoelectron Spectroscopy (XPS), in the sample. The XPS data was obtained using a Thermo VG Scientific Sigma Probe (England). Small area chemical analysis of solid surfaces with chemical bonding information was obtained by using a microfocused (from 15 to 400 μm) monochromated x-ray source. Angle resolved information is obtained with and without tilting the sample. This enables depth profiling with good depth resolution.

As a baseline, the atomic concentration of copper within a fibrous paper substrate was measured, as a function of depth. The atomic concentration of copper was found to be substantially zero at the surface, down to a depth of several micrometers. This procedure was repeated for two cyan-colored inkjet ink film constructions of the prior art, and for a cyan-colored ink film construction of the present invention.

Figure 3F:
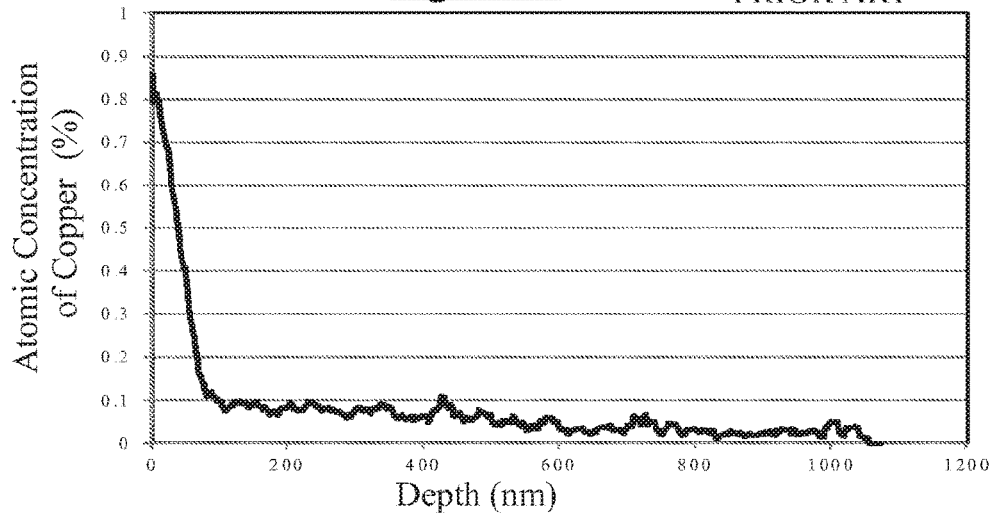
FIG. 3F provides a graph plotting the atomic concentration of copper within the ink dot and within the fibrous paper substrate, as a function of depth, within a first cyan-colored inkjet ink film construction of the prior art.

FIG. 3F provides a graph plotting the atomic concentration of copper [Cu] within the ink dot and within the fibrous paper substrate, as a function of the approximate depth, within a first cyan-colored inkjet ink film construction of the prior art. The initial [Cu], measured near the top snake of the cyan-containing ink film construction, was approximately 0.8 atomic %. Within a depth of about 100 nm, [Cu] dropped steadily to about 0.1 atomic %. Over a depth range of about 100 nm-1,000 nm, [Cu] dropped from about 0.1 atomic % to about zero. Thus, it is evident that the inkjet ink pigment has penetrated into the fibrous paper substrate, possibly attaining a penetration depth of at least 700 nm, at least 800 nm, or at least 900 nm.

Figure 3G:
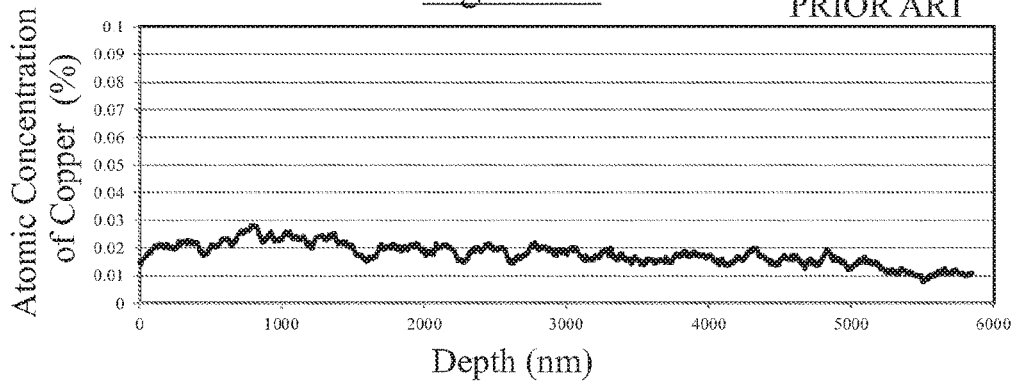
FIG. 3G provides a graph plotting the atomic concentration of copper within the ink dot and within the fibrous paper substrate, as a function of depth, within a second cyan-colored inkjet ink film construction of the prior art.

FIG. 3G provides a graph plotting the atomic concentration of copper within the ink dot construction, as a function of the approximate depth, within a second cyan-colored inkjet ink film construction of the prior art. The initial atomic concentration of copper [Cu] within the ink dot construction, measured near the top surface, was approximately 0.02 atomic %. This concentration was generally maintained over a depth of about 3,000 nm. Over a depth range of about 3,000 nm to almost 6,000 nm, [Cu] dropped very gradually to about 0.01 atomic %. It would appear that this prior-art construction has little or no ink film on the surface of the substrate, and that penetration of the pigment into the substrate was pronounced (at least 5-6 micrometers).

Figure 3H:
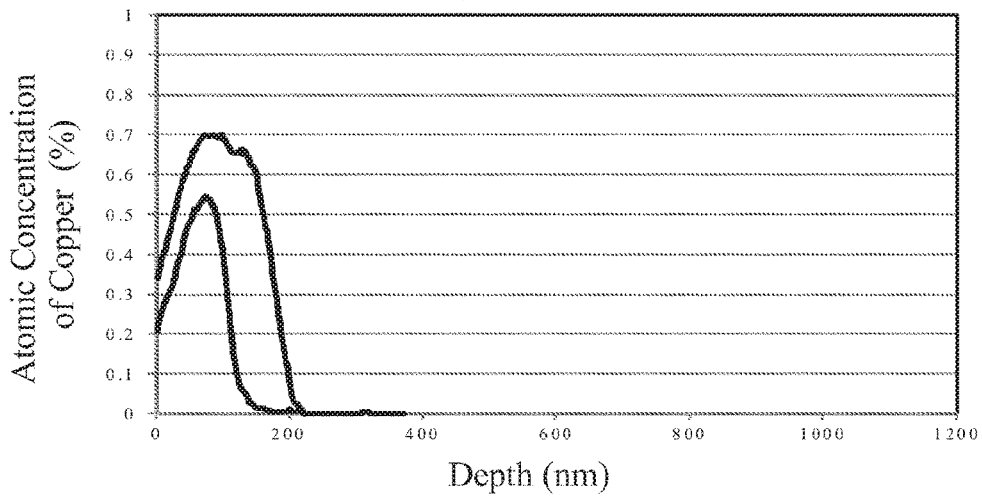
FIG. 3H provides a graph plotting the atomic concentration of copper within the ink dot and within the fibrous paper substrate, as a function of depth, within a cyan-colored ink film construction of the present invention.

FIG. 3H provides graphs plotting the atomic concentration of copper within the ink dot and within the fibrous paper substrate, as a function of the approximate depth, within a cyan-colored ink film construction of the present invention. The two graphs represent measurements made at two different positions ("Sample 1" and "Sample 2") on the inventive ink dot construction. The initial atomic concentration of copper [Cu], measured near the top surface, was approximately 0.2 or 0.4 atomic % for Sample 1 and Sample 2, respectively. Over a depth of about 75 to about 100 nm, [Cu] steadily increased to about 0.5 or 0.7 atomic % for the respective Samples. At a depth of about 100 nm to about 175 nm, [Cu] began to drop sharply, attaining a copper concentration of substantially zero at a depth of 200-250 nm, for both Samples. It would appear that the inventive construction is solely disposed on the surface of the substrate, and that pigment penetration into the substrate was negligible or substantially negligible, both in terms of penetration depth and in terms of the penetration quantity or fraction.

Without wishing to be bound by theory, the inventors believe that the initial rise in [Cu] over the depth of 75-100 nm may be attributed to the orientation of the ink dot due to micro-contours of the substrate, and to surface roughness of the ink dot itself. Similarly, the drop in [Cu] to substantially zero at a depth of 200-250 nm may be attributed to the micro-contours of the substrate: for a given cross-section within, and generally parallel to the face or top surface of the substrate, some of the ink dot may be present (see dashed line in FIG. 3D). This notwithstanding, the ink dot being is entirely disposed above the substrate, with respect to a direction perpendicular to the substrate surface.

Surface Roughness

Using laser microscopy imaging and other techniques, the inventors have observed that the top surface of the ink dots in the ink film constructions of the present invention may be characterized by a low surface roughness, particularly when the substrates of those constructions have a high paper (or substrate) gloss.

Without wishing to be limited by theory, the inventors believe that the relative flatness or smoothness of the ink film constructions of the present invention may largely be attributed to the smoothness of the release layer on the surface of the ITM, and to the inventive system and process in which the emerging ink film surface substantially complements that of that surface layer, and in which the developing ink film image may substantially retain or completely retain that complementary topography through the transfer onto the printing substrate.

Figure 4A:
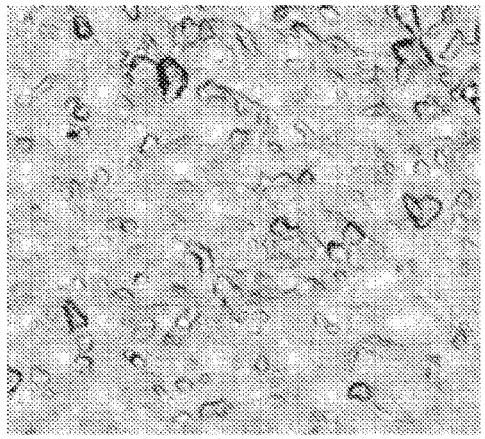
FIGS. 4A and 4C each show an image of the surface of the outer layer of an intermediate transfer member.
Figure 4B:
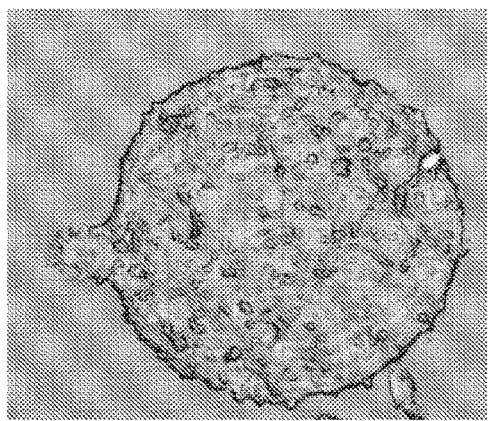
FIGS. 4B and 4D are corresponding images of the surface of the ink films produced using those outer layers, in accordance with the present invention.

Referring now to FIG. 4A, FIG. 4A is an image of the surface of a release layer of an ITM or blanket used in accordance with the present invention. While the surface may be nominally flat, various pockmarks (recesses and protuberances, typically of the order of 1-5 μm, may be observed. Many of these marks have sharp, irregular features. An image of an ink dot surface produced using this blanket, provided in FIG. 4B, displays topographical features that are strikingly similar in nature to those shown in FIG. 4A. The dot surface is peppered with a large plurality of marks having sharp, irregular features, which strongly resemble (and are within the same size range as) the irregular marks in the blanket surface.

Figure 4C:
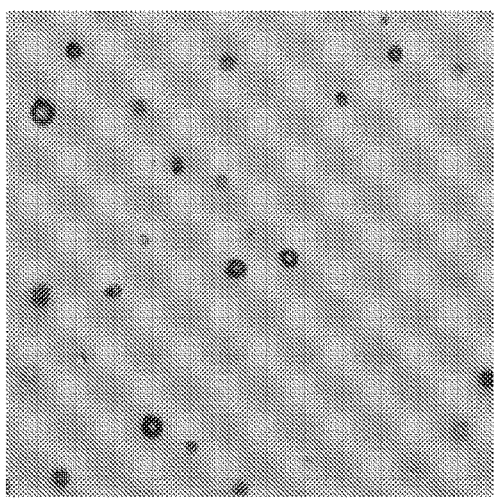
Figure 4D:
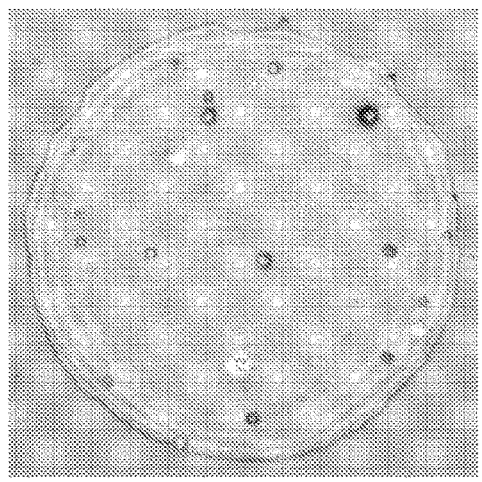

A smoother blanket was installed; FIG. 4C provides an image of the release layer of this blanket. The irregular pockmarks of FIG. 4A are conspicuously absent. Dispersed on the highly smooth surface are highly circular surface blemishes, perhaps made by air bubbles, typically having a diameter of about 1-2 µm. An image of an ink dot surface produced using this blanket, provided in FIG. 4D, displays topographical features that are strikingly similar in nature to those shown in FIG. 4C. This image has virtually no distinctive pockmarks, but has a number of highly circular surface blemishes that are strikingly similar in size and form to those shown of the blanket surface.

Dot Perimeter Characterization

The perimeter of various ink dots or films of the prior art may characteristically have a plurality of protrusions or rivulets, and a plurality of inlets or recesses. These ink forms may be irregular, and/or discontinuous. By sharp contrast, the inkjet ink dot produced according to the present invention characteristically has a manifestly rounded, convex, circular shape. The perimeter of the ink dot of the invention may be relatively smooth, regular, continuous and well defined. Ink dot roundness, convexity, and edge raggedness are structural parameters used to evaluate or characterize shapes, or optical representations thereof.

It can readily be observed, by comparing the magnified images of the prior-art ink forms of FIG. 1A with the inventive ink dots of FIG. 1B, or by comparing the magnified images of the prior-art ink forms of FIGS. 2A and 2B with the inventive ink dots of FIG. 2C, that the appearance of the ink dots of the present invention is manifestly distinct from these prior-art ink forms. That which is readily observed by the human eye may be quantified using image-processing techniques. Various characterizations of the ink forms are described hereinbelow, after a description of the image acquisition method.

Acquisition Method (1) For each of the known printing technologies to be compared in the study, single dots, splotches, or film images printed on coated paper and on uncoated paper were used. In the initial tests, the coated paper used was Condat Gloss® 135 gsm, or similar; the uncoated paper used was Multi Fine Uncoated, 130 gsm, or similar. Subsequently, a wide variety of substrates were used, including numerous coated and uncoated fibrous substrates, and various plastic printing substrates.

(2) Regarding the inventive printing technology of the Applicant, single drop dot images were printed on coated paper and on uncoated paper. Care was taken to select substrates having similar characteristics to the substrates of the known ink-dot constructions used in (1).

(3) The acquisition of the dot images was performed using an OLS4000 (Olympus) microscope. Those of ordinary skill in the art know how to adjust the microscope to achieve the requisite focus, brightness and contrast, so that the image details will be highly visible. These image details include the dot contour, the color variance within the dot area, and the fibrous structure of the substrate surface.

(4) The images were taken with an X100 optical zoom lens having a resolution of 1.29 micrometers×129 micrometers. This high resolution may be essential in obtaining fine details of the dot and of the fibrous structure of the substrate surface.

(5) The images were saved in uncompressed format (Tiff) having a resolution of 1024×1024 pixels. Compression formats may lose image data.

(6) Generally, a single dot or splotch was evaluated for each printing technology. From a statistical point of view, however, it may be advantageous to obtain 15 dot images (at least) for each type of hard-copy print being analyzed, and to manually select the 10 (at least) most representative dot images for image processing. The selected dot images should be representative in terms of dot shape, contour and color variation within the dot area. Another approach to print dot sampling, termed "field of view", is described hereinbelow.

Dot Contour Computation

The dot images were loaded to the image-processing software (ImageXpert). Each image was loaded in each of the Red, Green and Blue channels. The processing channel was selected based on a highest visibility criterion. For example, for cyan dots, the Red channel typically yielded the best dot feature visibility, and was thus selected for the image processing step; the Green channel was typically most suitable for a magenta dot. The dot edge contour was detected (automatically computed), based on a single threshold. Using a "full screen view" mode on a 21.5" display, this threshold was chosen manually for each image, such that the computed edge contour would best match the real and visible dot edge. Since a single image-channel was processed, the threshold was a gray value (from 0 to 255, the gray value being a non color value).

A computed perimeter value was obtained from the image-processing software (e.g., ImageXpert), the perimeter value being the sum of all distances between the adjacent, connected pixels at the edge of the dot or splotch. If, for example, the XY coordinates for adjacent pixels are (x1, y1) and (x2, y2), the distance is $\sqrt{[(x2-x1)^2+(y2-y1)^2]}$, while the perimeter equals $\Sigma\{\sqrt{[(x_{i+1}-x_i)^2+(y_{i+1}-y_i)^2]}\}$.

In various embodiments of the invention, it is desired to measure the length of the perimeter of an ink dot. An alternative method for measuring the perimeter length will now be described. As a first step, an image comprising an ink dot is used as input for an algorithm that outputs perimeter length. The pixel dimension M×N of the image may be stored in a two-element array or an ordered pair imnage_pixel_size. An example of the value of the image_pixel_size is 1280,760—in this example M=1280 and N=760. This corresponds to an image 1280 pixels in the horizontal axis and 760 pixels in the vertical axis. Subsequently, the image magnification ratio or scale is obtained and stored in variable image_magnification. One example of variable image_magnification is 500. When comparing perimeters between ink dots in first and second images it is mandatory that the variables image_pixel_size and image_magnification of the two images are equal. It is now possible to calculate the corresponding length of one square pixel—i.e., the side length in a real-world length units (e.g., microns) or a pixel. This value is stored in a variable pixel_pitch. One example of the variable pixel_pitch is 0.05 µm. The image is now converted to grayscale by methods known to the skilled artisan. One proposed method is converting the input image, the image typically in an sRGB color space, to the L*a*b* color space. Once the image is in the Lab color space, the values for the variables a and b are changed to zero. It is now possible to apply an edge detection operator to the image. The preferred operator is a Canny edge detection operator. However, any operator known in the art may be applied. The operators are not limited to first order derivatives, such as the canny operator, but rather open to second derivatives as well. Furthermore, a combination of operators may be used in order to obtain results that may be compared between operators and subsequently remove "unwanted" edges. It may be favorable to apply a smoothing operator such as a Gaussian blur prior to applying the edge detection operator. The threshold level applied when applying the edge detection operator is such that an edge that forms an endless loop is first obtaining in the area between the formerly described minimal circumference Ink dot engulfing circle and the maximal circumference ink dot enclosed circle. A thinning operator is now implemented to render the endless loop edge substantially one pixel wide. Any pixel that is not a part of the endless loop edge has its L* value change to zero, while any pixel that is part of the endless loop edge has its L* value change to 100. The endless loop edge is defined as the perimeter of the ink dot. A pixel link is defined as a straight line connecting to pixels. Each pixel along the perimeter incorporates two pixel links, a first pixel link and a second pixel link. These two pixel links define a pixel link path within a single pixel. In this method of computing perimeter length, each pixel is a square pixel. Therefore, each pixel link may form a line from the center of the pixel to one of eight possible nodes. The possible nodes being the corners of the pixel or a midpoint between two neighboring corners of the pixel. Nodes at the corners of the pixels are of the type node_1 one nodes at the midpoint between two corners are of type node_2. As such, there are six possibilities of pixel link paths within a pixel. These can be categorized into three groups. Group A, B, and C. Each group has its own corresponding coefficient, namely, coefficient_A, coefficient_B, and coefficient_C. The value of coefficient_A is 1, the value of coefficient_B is the sqrt(2), and the value of coefficient_C is (1+sqrt(2))/2. Group A contains pixels whose pixel link path coincides with nodes of type node_2. Group B contains pixels whose pixel link path coincides with nodes of type node_1. Group C contains pixels whose pixel link path coincides with nodes of type node_1 and type node_2. It is now possible to calculate the pixel length of the perimeter. The pixel length of the perimeter is calculated by summing all of the pixels in the perimeter multiplied by their corresponding coefficient. This value is stored in variable perimeter_pixel_length. It is now possible to calculate the actual length of the ink dot perimeter. This is done by multiplying perimeter_pixel_length by pixel_pitch.

Roundness

A dimensionless roundness factor (ER), may be defined by:

$$ER = P^2/(4\pi \cdot A)$$

wherein P is the measured or calculated perimeter, and A is the measured or computed area within the ink film, dot or splotch. For a perfectly smooth and circular ink dot, ER equals 1.

The deviation from a round, smooth shape may be represented by the expression (ER-1). For a perfectly circular, idealized ink dot, this expression equals zero.

The R-square of the roundness factor may be computed for each of the 10 most representative dot images selected for each type of printing technology, and averaged into a single value.

For ink film constructions in which the fibrous substrate (e.g., paper) is uncoated, or for ink film constructions in which the fibrous substrate is coated with a coating such as the commodity coating in coated offset paper (or such as coatings which enable the carrier from traditional water-based inkjet ink to reach the paper fibers), the deviation from around, smooth round shape [(ER-1), henceforth, "deviation"] for the ink dots of the present invention is not ideal, and will exceed 0.

Exemplary ink film images disposed on coated (FIG. 5A) and uncoated (FIG. 5B) substrates are provided for the following printers: HP DeskJet 9000 (1); Digital press: HP Indigo 7500 (2); Lithographic Offset: Ryobi 755 (3); and Xerox DC8000 (4), and for the inventive digital printing technology (5). These ink film images were obtained generally according to the image acquisition method detailed hereinabove. Next to each original image is provided a corresponding processed, black and white image in which the image-processor computed contour of the ink dot, film, or splotch is highlighted, and in which the computed contours are manifestly similar to the contours of the original images.

For all tested coated fibrous (paper) substrates, the typical, individual inventive ink dots exhibited a deviation from a round, smooth shape (ER-1) of 0.16 to 0.27. By sharp contrast, the deviation from roundness of the coated prints of the various prior-art technologies ranged from 1.65 to 7.13.

For all tested uncoated fibrous (paper) substrates, the typical, individual inventive ink dots exhibited a deviation (ER-1) of 0.28 to 0.89. On each of these substrates, some of the inventive ink dots exhibited a deviation (ER-1) of at most 0.7, at most 0.6, at most 0.5, at most 0.4, at most 0.35, at most 0.3, at most 0.25, or at most 0.20.

By sharp contrast, the deviation from roundness of ink films in the uncoated prints of the various prior-art technologies ranged from 2.93 to 14.87.

An additional study was performed on 19 fibrous substrates of varying physical and chemical properties. The substrates included coated and uncoated substrates, and wood-free and mechanical substrates. The substrates are characterized by differences in thickness, density, roughness (e.g., Bendtsen number) or smoothness (gloss), etc. These substrates are identified and partially characterized in Table 1.

Figure 5A:
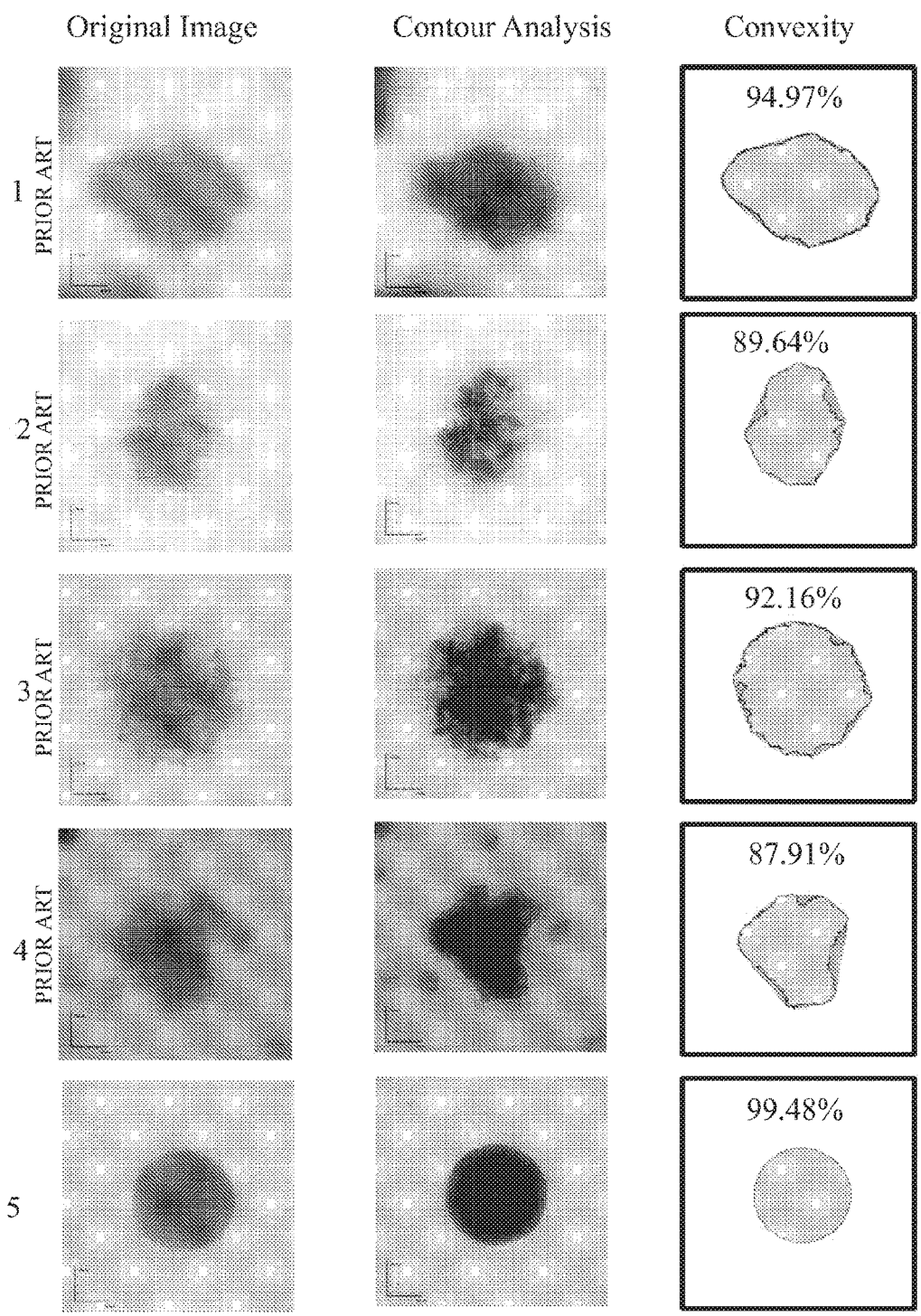
FIG. 5A provides images of ink splotches or films obtained using various printing technologies on coated paper, along with corresponding image-processor computed contours and convexity projections thereof.
Figure 5B:
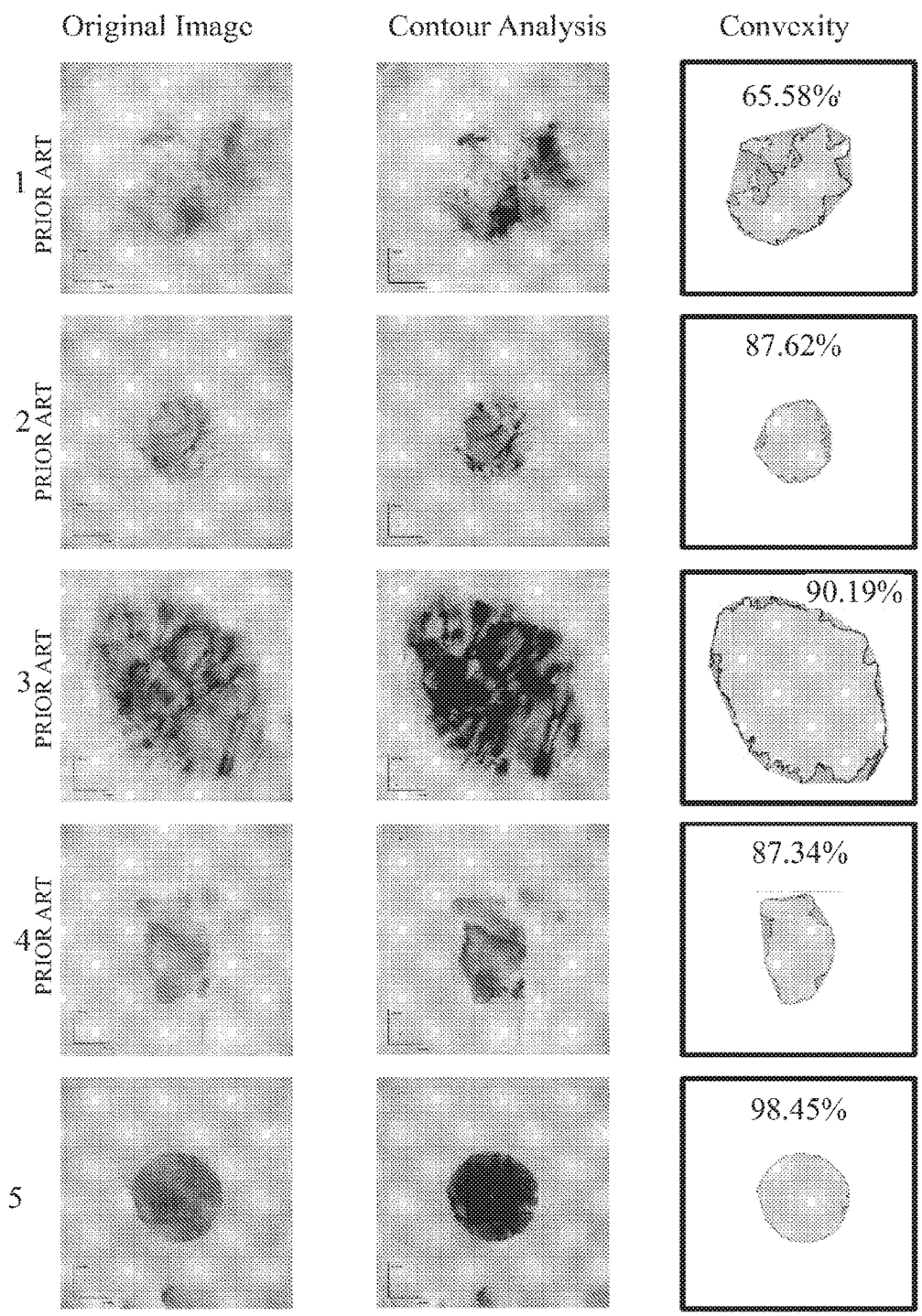
FIG. 5B provides images of ink splotches or films obtained using various printing technologies on uncoated paper, along with corresponding image-processor computed contours and convexity projections thereof.
Figure 5C:
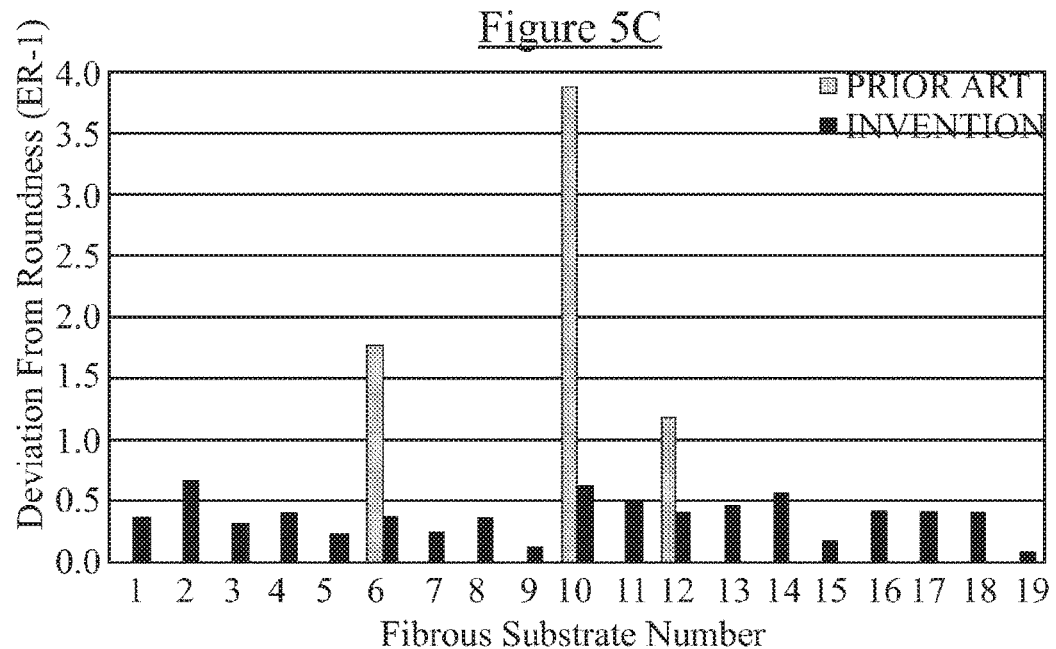
FIG. 5C provides bar graphs of the deviation from roundness for ink dots on each of 19 fibrous substrates, according to some embodiments of the present invention, and for ink dots produced by a prior art inkjet printing technology.

In the case of several substrates, the deviation from roundness of the inventive ink dot constructions is compared with ink images produced by a commercial inkjet printer (using compatible ink cartridges provided by the manufacturer) in the bar graphs provided in FIG. 5C.

It must be emphasized that in this additional study, the ink-film constructions of the present invention were produced on an inventive pilot, semi-automatic digital printing press, in which the transfer of the ink dots from the ITM to the printing substrate is performed manually, and consequently, with an impression pressure that may be somewhat lower, and more variable, than the previously described commercial prototype of a fully-automatic digital printing press of the present invention.

For example, substrate number 6, Condat Gloss 135, is the same substrate used above for the inventive ink dot shown in FIG. 5A. However, the deviation from roundness achieved by a typical ink dot was 0.362, which represents a larger deviation than the deviations (0.16 to 0.27) of all of the inventive ink dots printed by the commercial prototype of the inventive digital press printer. However, a portion (albeit lower) of the inventive ink dots produced on the pilot, semi-automatic digital printing press attained deviations as low or lower than the lowest typical deviation (0.16) achieved on the commercial prototype digital press printer.

TABLE 1

| | | | | Inventive Dots | |
| --- | --- | --- | --- | --- | --- |
| # | Substrate name | GSM (g/m$^2$) | Type | Deviation From Roundness (ER-1) | Non-Con-vexity (1-CX) |
| 1 | Chromo Matte 300 | 300 | Coated | 0.361 | 0.006 |
| 2 | Chromo Matte Garda 130 | 130 | Coated Wood Free | 0.656 | 0.009 |
| 3 | Chromo Matte Graphic 130 | 130 | Coated | 0.305 | 0.008 |
| 4 | Chromo Matte Graphic 170 | 170 | Coated | 0.395 | 0.011 |
| 5 | Condat Gloss 90 | 90 | Coated | 0.218 | 0.005 |
| 6 | Condat Gloss 135 | 135 | Coated | 0.362 | 0.006 |
| 7 | Condat Gloss 225 | 225 | Coated | 0.229 | 0.004 |
| 8 | Dalum Glossy recycled | 250 | Coated Recycled | 0.357 | 0.008 |
| 9 | Gruppo Cordenons-Ivolaser Digital | 120 | Uncoated | 0.120 | 0.007 |
| 10 | Holmen Plus | 49 | Uncoated Mechanical | 0.621 | 0.021 |
| 11 | Holmen XLNT | 55 | Uncoated Mechanical | 0.515 | 0.020 |
| 12 | Invercote G | 300 | SBS board, C1S | 0.393 | 0.008 |

TABLE 1-continued

|   |   |   |   | Inventive Dots | |
|---|---|---|---|---|---|
| # | Substrate name | GSM (g/m²) | Type | Deviation From Roundness (ER-1) | Non-Convexity (1-CX) |
| 13 | Leipa UltraLUX Semi Gloss | 90 | Low Weight Coated | 0.449 | 0.009 |
| 14 | Norske Skog NorCote Bruck H | 70 | LWC Coated | 0.548 | 0.011 |
| 15 | Sappi Magno Satin | 170 | Coated Wood Free | 0.174 | 0.007 |
| 16 | Sappi Magno Star | 250 | Coated Wood Free | 0.406 | 0.006 |
| 17 | Torras Matte 90 | 90 | Coated | 0.410 | 0.014 |
| 18 | Torras Matte 130 | 130 | Coated | 0.404 | 0.015 |
| 19 | Torras Matte 170 | 170 | Coated | 0.078 | 0.004 |

Considering coated and uncoated fibrous (paper) substrates together, the deviation from roundness of the inventive ink dots is greater than zero, and may be at least 0.01, at least 0.02, or at least 0.03. For each of the 19 tested fibrous substrates provided in Table 1, at least some of the inventive ink dots exhibited a deviation from roundness (on both uncoated and coated fibrous substrates) of at most 0.30, at most 0.25, at most 0.20, at most 0.15, or at most 0.12.

The inventive ink dots, when adhering to coated (or commodity-coated) fibrous substrates, may typically exhibit a deviation of at most 0.20, at most 0.18, at most 0.16, at most 0.14, at most 0.12, or at most 0.10. For each of the coated substrates provided in Table 1, at least some of the inventive ink dots exhibited a deviation from roundness of at most 0.25, at most 0.20, at most 0.15, at most 0.12, at most 0.10, at most 0.09, at most 0.08, at most 0.07, or at most 0.06.

Because, as noted above, ink images may contain an extremely large plurality of individual ink dots or single drop ink films, it may be meaningful to statistically define the inventive ink film constructions wherein at least 20% or at least 30%, and in some cases, at least 50%, at least 70%, or at least 90%, of the inventive ink dots (or inventive single-drop ink dots), disposed on any uncoated or coated (or commodity-coated) fibrous substrate, and randomly selected, may exhibit a deviation from roundness that is at least 0.01 or at least 0.02, and may be at most 0.8, at most 0.65, at most 0.5, at most 0.35, at most 0.3, at most 0.25, at most 0.2, at most 0.15, at most 0.12, or at most 0.10.

As with a single ink dot or an individual single-drop ink dot, at least 20% or at least 30%, and more typically, at least 50%, at least 70%, or at least 90%, of the inventive ink dots (or the inventive single-drop ink dots), disposed on any coated (or commodity-coated) fibrous substrate, and randomly selected, may exhibit a deviation from roundness that is at least 0.01 or at least 0.02, and may be at most 0.8, at most 0.65, at most 0.5, at most 0.35, or at most 0.3, and more typically, at most 0.25, at most 0.2, at most 0.15, at most 0.12, at most 0.10, at most 0.08, at most 0.07, or at most 0.06.

Additional characterizations pertaining to deviation from roundness are provided hereinbelow.

Convexity

As described hereinabove, the ink dots or films of the prior art may characteristically have a plurality of protrusions or rivulets, and a plurality of inlets or recesses. These ink forms may be irregular, and/or discontinuous. By sharp contrast, the inkjet ink film produced according to the present invention characteristically has a manifestly rounded, convex, circular shape. Dot convexity, or deviation therefrom, is a structural parameter that may be used to evaluate or characterize shapes, or optical representations thereof.

The image acquisition method may be substantially identical to that described hereinabove.

Convexity Measurement

The dot images were loaded to the image-processing software (ImageXpert). Each image was loaded in each of the Red, Green and Blue channels. The processing channel was selected based on a highest visibility criterion. For example, for cyan dots, the Red channel typically yielded the best dot feature visibility, and was thus selected for the image processing step; the Green channel was typically most suitable for a magenta dot. The dot edge contour was detected (automatically computed), based on a single threshold. Using a "full screen view" mode on a 21.5" display, this threshold was chosen manually for each image, such that the computed edge contour would best match the real and visible dot edge. Since a single image-channel was processed, the threshold was a gray value (from 0 to 255, the gray value being a non color value).

A MATLAB script was created to compute the ratio between the area of the minimal convex shape that bounds the dot contour and the actual area of the dot. For each ink dot image, the (X,Y) set of points of the dot edge contour, created by ImageXpert, was loaded to MATLAB.

In order to reduce the sensitivity of measurement to noise, the dot edge was passed through a Savitzky-Golay filter (image-processing low-pass filter) to slightly smooth the edge contour, but without appreciably modifying the raggedness characteristic thereof. A window frame size of 5 pixels was found to be generally suitable.

Subsequently, a minimal-area convex shape was produced to bound the smoothed edge contour. The convexity ratio between the convex shape area (CSA) and the actual (calculated) dot or film area (AA) was then computed as follows:

$$CX = AA/CSA$$

The deviation from this convexity ratio, or "non-convexity", is represented by 1-CX, or $DC_{dot}$.

For the above-described exemplary ink dot images disposed on coated (FIG. 5A) and uncoated (FIG. 5B) substrates, the convex shape area (CSA) is shown surrounding the actual dot area (AA), and the convexity ratio is provided in percentage form.

In the ink film images of FIG. 5A, disposed on coated substrates, the convexity of the print images of the various prior-art technologies ranged from 87.91% to 94.97% (~0.879 to 0.950 in fractional form), corresponding to a deviation from convexity of 0.050 to 0.121. By sharp contrast, the inventive ink dot exhibited a convexity of 99.48% (~0.995), corresponding to a deviation from convexity of about 0.005. This deviation is about ⅒ to 1/25 of the deviation exhibited by the various prior-art technologies. In absolute terms, the deviation is at least 0.04 less than the deviation exhibited by the various prior-art technologies.

The difference between the inventive dot images and those of the various prior-art technologies may be more striking on uncoated substrates. In the ink film images of FIG. 5B, disposed on uncoated substrates, the convexity of the print images of the various prior-art technologies ranged from 65.58% to 90.19% (~0.656 to 0.902 in fractional form), corresponding to a deviation from convexity of 0.344 to 0.098. By sharp contrast, the inventive ink dot exhibited a convexity of 98.45% (~0.985), corresponding to a deviation from convexity of about 0.015. This deviation is at least ⅙ to 1/20 of the deviation exhibited by the various prior-art technologies. In absolute terms, the deviation is at least 0.08 less than the deviation exhibited by the various prior-art technologies.

Figure 5D:
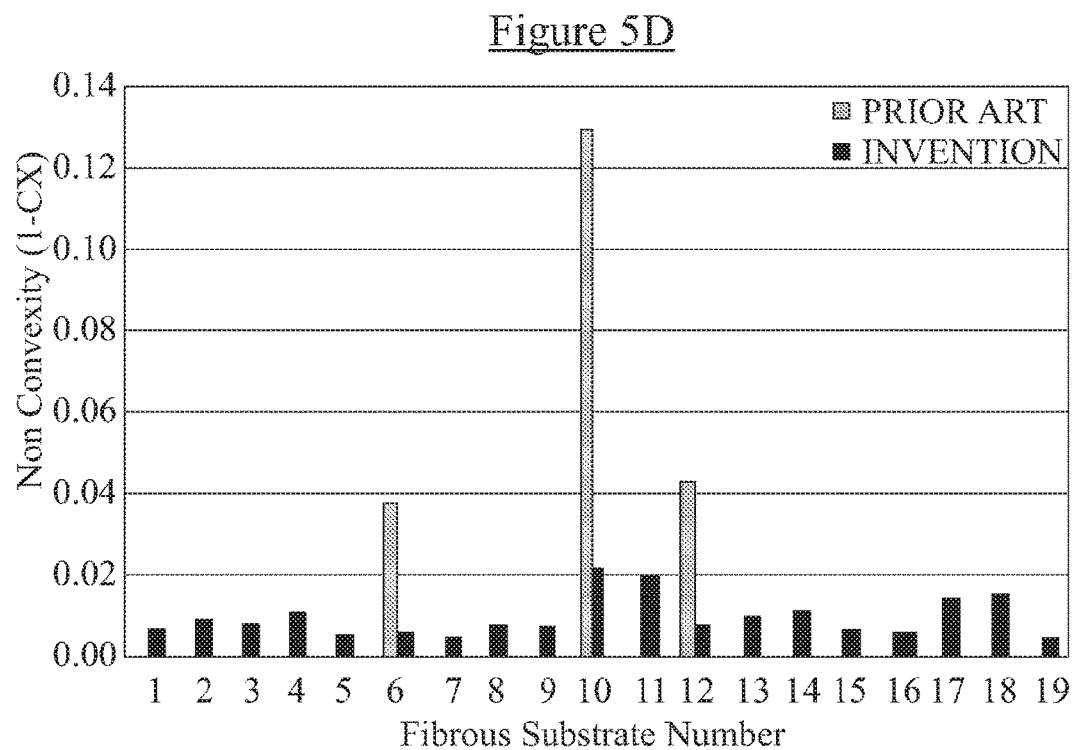
FIG. 5D provides bar graphs of deviation from convexity for ink dots on each of the 19 fibrous substrates, according to some embodiments of the present invention, and for ink dots produced by a prior art inkjet printing technology.
Figure 5C:
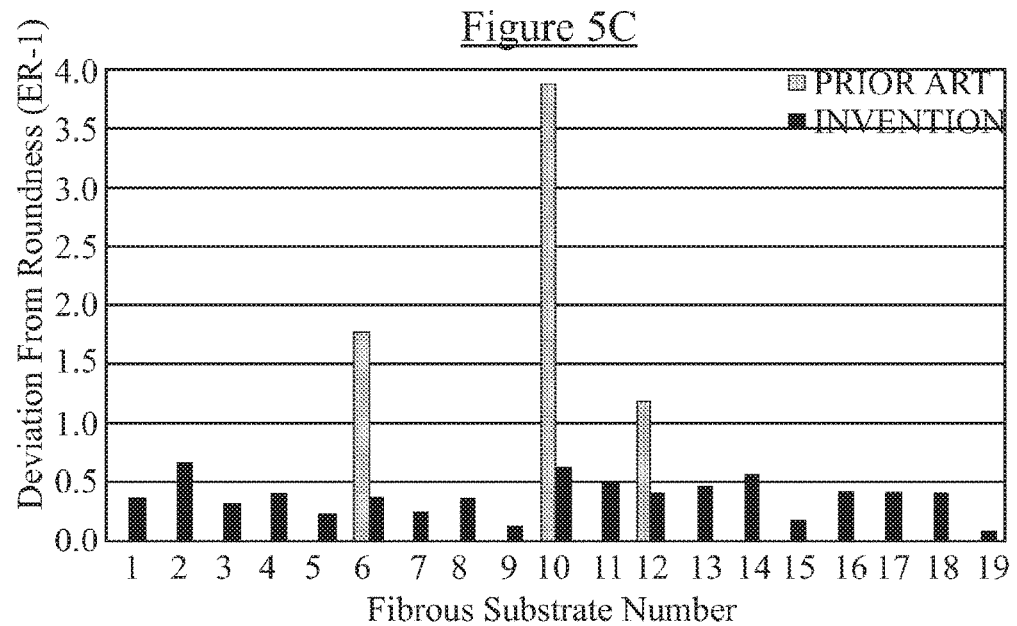
Figure 5D:
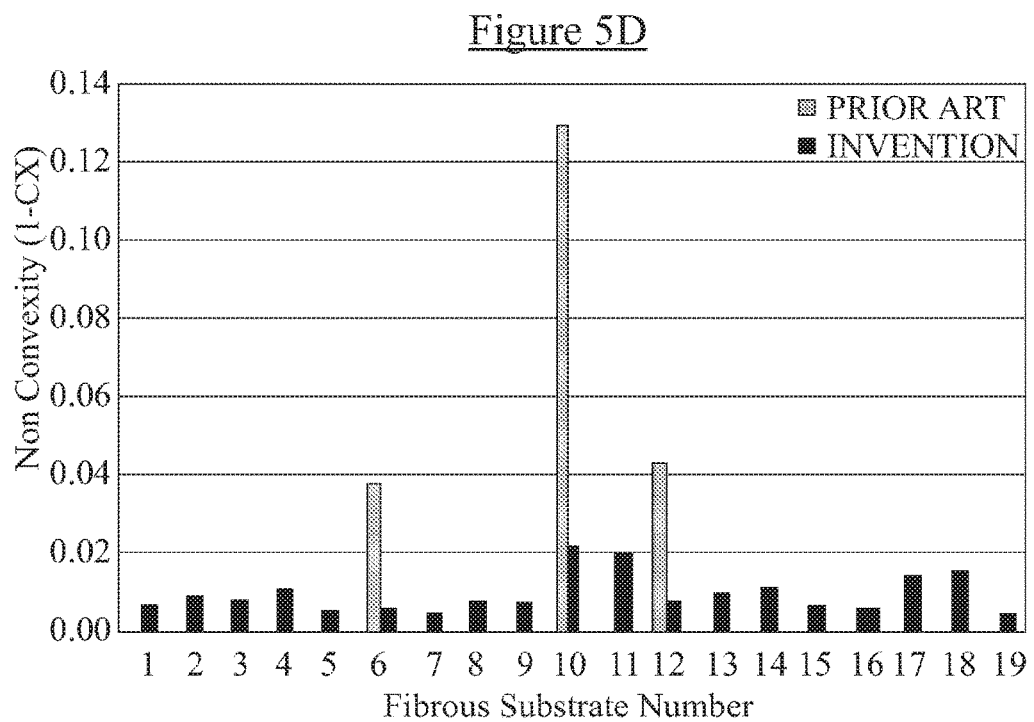

Another study, described hereinabove, was performed, in which the ink-film constructions of the present invention were produced on 19 different fibrous substrates. In Table 1, the non-convexity of typical inventive dots is provided. The non-convexity of the ink dots in the ink-film constructions is graphically presented in the bar graphs provided in FIG. 5D.

As in the deviation from roundness study, the printed dots of the present invention exhibit superior convexity with respect to the prior art images, for any given substrate, coated or uncoated.

For all 19 tested fibrous substrates, typical inventive ink dots exhibited a non-convexity of 0.004 to 0.021. For each of the 19 tested fibrous substrates, at least some of the inventive ink dots exhibited a non-convexity of at most 0.018, at most 0.016, at most 0.015, at most 0.014, or at most 0.013.

For all tested commodity coated fibrous substrates, typical inventive ink dots exhibited a non-convexity of 0.004 to 0.015. For each of these coated fibrous substrates, at least some of the inventive ink dots exhibited a non-convexity of at most 0.014, at most 0.012, at most 0.010, at most 0.009, at most 0.008, or at most 0.007.

For each of the uncoated substrates, at least some of the inventive ink dots exhibited a non-convexity of at most 0.03, at most 0.025, at most 0.022, at most 0.020, at most 0.018, at most 0.016, at most 0.015, at most 0.014, or at most 0.013.

Because, as noted above, ink images may contain an extremely large plurality of individual dots or single drop ink films (at least 20, at least 100, or at least 1,000), it may be meaningful to statistically define the inventive ink film constructions wherein at least 10%, at least 20%, or at least 30%, and in some cases, at least 50%, at least 70%, or at least 90%, of the inventive ink dots (or inventive single-drop ink dots), disposed on any uncoated or coated (or commodity-coated) fibrous substrate, and randomly selected, may exhibit a non-convexity of at most 0.04, at most 0.035, at most 0.03, at most 0.025, at most 0.020, at most 0.017, at most 0.014, at most 0.012, at most 0.010, at most 0.009, at most 0.008, or at most 0.007.

At least 10%, at least 20%, or at least 30%, and in some cases, at least 50%, at least 70%, or at least 90%, of these inventive ink dots (or inventive single-drop ink dots) may exhibit a non-convexity of at least 0.001, at least 0.002, or at least 0.0025.

As with a single ink dot or an individual single-drop ink dot, at least 10%, at least 20%, or at least 30%, and more typically, at least 50%, at least 70%, or at least 90%, of the inventive ink dots (or the inventive single-drop ink dots), disposed on any uncoated or coated (or "commodity-coated") fibrous substrate, and randomly selected, may exhibit a non-convexity within a range of 0.001-0.002 to 0.05, 0.001-0.002 to 0.04, 0.001-0.002 to 0.035, 0.001-0.002 to 0.030, 0.001-0.002 to 0.025, 0.001-0.002 to 0.020, 0.001-0.002 to 0.015, 0.001-0.002 to 0.012, or 0.001 to 0.010.

For any coated or "commodity-coated" fibrous printing substrate, these same dots may exhibit a lower non-convexity, within a range of 0.001-0.002 to 0.020, 0.001-0.002 to 0.015, 0.001-0.002 to 0.012, 0.001-0.002 to 0.010, 0.001 to 0.008, 0.001 to 0.007, 0.001 to 0.006, 0.001 to 0.005, or 0.001 to 0.004.

For any uncoated fibrous printing substrate, these same dots may exhibit a non-convexity within a range of 0.001-0.002 to 0.05, 0.001-0.002 to 0.04, 0.001-0.002 to 0.035, 0.001-0.002 to 0.030, 0.001-0.002 to 0.025, 0.001-0.002 to 0.020, 0.001-0.002 to 0.015, 0.001-0.002 to 0.012, or 0.001 to 0.010.

Additional characterizations pertaining to ink dot convexity are provided hereinbelow.

Reference Ink

The ink dots in the ink dot constructions of the present invention may exhibit consistently good shape properties (e.g., convexity, roundness, edge raggedness, and the like), irrespective, to a large degree, of the particular, local topographical features of the substrate, and irrespective, to some degree, of the type of printing substrate (e.g., commodity-coated or uncoated printing substrates). However, the shape properties of the ink dots in the ink dot constructions of the present invention are not completely independent of the type of printing substrate, as evidenced by the bottom frames of FIG. 5A (coated fibrous substrate) vs. the bottom frames of FIG. 5B (uncoated fibrous substrate). The quality of ink dots in various known printing technologies, and in direct aqueous inkjetting technologies in particular, may vary more substantially with the type of printing substrate.

A reference inkjet ink, along with a reference printing method therefor, may be used to structurally define the various optical properties of ink dot constructions on a substrate to substrate basis, by normalizing those properties to the printing substrate.

The reference ink contained 15% Basacid Black X34 liquid (BASF), 60% propylene glycol, and 25% distilled water. The dye was added to a mixture of water and propylene glycol. After 5 minutes of stirring, the ink was passed through a 0.2 micrometer filter. The reference ink composition is simple, and the components are generic, or at least commercially available. In the event that Basacid Black X34 liquid (BASF) is not available, a similar black inkjet colorant may be substituted therefor. In any event, a supply of the reference ink may be obtained from Landa Corporation, POB 2418, Rehovot 7612301, Israel.

The reference ink was printed using a FUJIFILM Dimatix Materials Printer, DMP-2800, equipped with a 10 pL print head, DMC-11610. The printing parameters were set as follows:
Ink Temperature: 25° C.
Substrate Temperature: 25° C.
Firing Voltage: 25 V
Meniscus Setpoint: 2.0 (inches of water)
Distance from the print head to the substrate: 1 mm.

The printing apparatus is commercially available. If unavailable, a functionally equivalent (or substantially functionally equivalent) printer may be used. Alternatively, such printing apparatus may be available courtesy of Landa Corporation, POB 2418, Rehovot 7612301, Israel.

The reference inkjet ink was prepared and printed onto various printing substrates, as described hereinabove. The printed dots were subjected to image processing for characterization of roundness and convexity.

Figures 1, 5F:
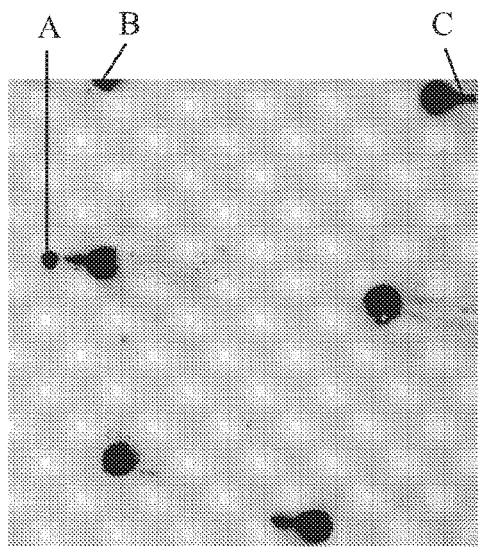

FIG. 5E-1 provides comparative bar graphs of the deviation from roundness for ink dots produced according to some embodiments of the present invention, vs. ink dots produced using the above-described reference ink formulation and printing method. The comparative study was conducted using 10 fibrous substrates of varying physical and chemical properties; these included both coated and uncoated substrates. The substrates are identified and partially characterized in Table 2, which further provides the deviation from roundness results of the comparative study, for each of the 10 fibrous substrates.

It is manifest that for all fibrous substrates, (commodity) coated and uncoated, the inventive dot constructions exhibit lower deviations from roundness (ER-1 or $DR_{dot}$). The highest value of $DR_{dot}$, 0.19, obtained for an uncoated substrate (Hadar Top), is still less than ⅕ of the lowest roundness deviation value of the reference ink dots (RDR), 1.16, obtained for a coated "silk" substrate (Sappi Magno Satin).

TABLE 2

| # | Substrate name | GSM (g/m²) | Type | Deviation From Roundness | | | |
|---|---|---|---|---|---|---|---|
| | | | | Reference Dots (RDR) | Inventive Dots ($DR_{dot}$) | Inv./Ref. Ratio ($DR_{dot}$/RDR or "K1") | DELTA (RDR − $DR_{dot}$) |
| 1 | Iggesund Silk 300 | 300 | Coated | 2.85 | 0.063 | 0.022 | 2.78 |
| 2 | Arjowiggins (Dalum) Cyclus | 170 | Uncoated | 3.05 | 0.124 | 0.041 | 2.92 |
| 3 | Invercote Creato 300 | 300 | Coated (SBS, C2S) | 2.57 | 0.052 | 0.020 | 2.52 |
| 4 | Arjowiggins Gloss | 170 | Coated Gloss, Recycled | 1.49 | 0.035 | 0.024 | 1.45 |
| 5 | Dalum Gloss recycled | 170 | Coated Gloss, Recycled | 1.42 | 0.073 | 0.051 | 1.35 |
| 6 | Sappi Magno Satin | 170 | Coated Silk | 1.16 | 0.049 | 0.043 | 1.11 |
| 7 | Sappi Magno Star | 250 | Coated Gloss | 1.51 | 0.032 | 0.021 | 1.47 |
| 8 | Invercote G | 300 | Coated (SBS, C1S) | 2.41 | 0.087 | 0.036 | 2.33 |
| 9 | Stora Enso | 275 | Coated (WLC, C1S) | 1.44 | 0.044 | 0.031 | 1.39 |
| 10 | Hadar Top | 170 | Uncoated Offset | 2.64 | 0.187 | 0.071 | 2.45 |

On a per-substrate basis, the difference between $DR_{dot}$ and RDR are even more pronounced. The ratio of $DR_{dot}$/RDR, also referred to as the coefficient "K1", ranges from about 0.02 to about 0.07, corresponding to a factor of 14:1 to 50:1, on a per-substrate basis.

Thus, according to some embodiments of the present invention, coefficient K1 may be at most 0.25, at most 0.22, at most 0.20, at most 0.17, at most 0.15, at most 0.12, at most 0.10, at most 0.09, or at most 0.08, for both coated (commodity-coated) and uncoated substrates, and in some cases, at most 0.070, at most 0.065, at most 0.060, at most 0.055, at most 0.050, at most 0.045, or at most about 0.04.

Coefficient K1 may be at least 0.010, at least 0.015, at least 0.180, or at least about 0.020. In some cases, coefficient K1 may be at least 0.03, at least 0.04, at least 0.05, at least 0.06, at least about 0.07, at least about 0.075, at least about 0.08, at least about 0.09, at least about 0.10.

For coated substrates, coefficient K1 may be at most 0.070, at most 0.065, at most 0.060, or at most 0.055, and in some cases, at most 0.050, at most 0.045, at most 0.040, at most 0.035, at most 0.030, at most 0.025, or at most 0.022.

Figures 2, 5F:
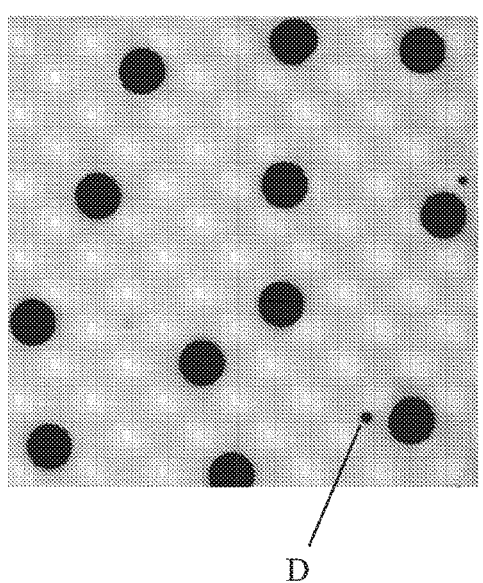

FIG. 5E-2 provides comparative bar graphs of ink dot convexity of the ink dot constructions of FIG. 5E-1, for each of the 10 above-described fibrous substrates. Table 3 provides the non-convexity results of the comparative study, for each of the 10 fibrous substrates.

value of the reference ink dots (RDR), obtained for a coated gloss substrate (Arjowiggins Gloss), 0.026.

On a per-substrate basis, the difference between $DC_{dot}$ and RDC are even more pronounced. The ratio of $DC_{dot}$/RDC, also referred to as the coefficient "K", ranges from about 0.04 to about 0.17, corresponding to a factor of 6:1 to 25:1, on a per-substrate basis.

Thus, according to some embodiments of the present invention, coefficient K may be at most 0.35, at most 0.32, at most 0.30, at most 0.27, at most 0.25, at most 0.22, at most 0.20, at most 0.19, or at most 0.18, for both coated (commodity-coated) and uncoated substrates. Coefficient K may be at least 0.010, at least 0.02, at least 0.03, or at least about 0.04. In some cases, coefficient K may be at least 0.05, at least 0.07, at least 0.10, at least 0.12, at least 0.15, at least 0.16, at least 0.17, at least 0.18, at least 0.19, or at least about 0.20.

For uncoated substrates, coefficient K may be at most 0.15, at most 0.12, at most 0.10, at most 0.09, at most 0.08, or at most 0.075, and in some cases, at most 0.070, at most 0.065, at most 0.060, or at most 0.055, and in some cases, at most 0.050, at most 0.045, or at most 0.040.

Coefficient K may be at least 0.020, at least 0.03, at least 0.04, at least 0.06, at least 0.07, or at least about 0.08. In some cases, particularly for various commodity-coated sub-

TABLE 3

| # | Substrate name | GSM (g/m²) | Type | Non-Convexity (1-CX) | | | |
|---|---|---|---|---|---|---|---|
| | | | | Reference Dots (RDC) | Inventive Dots ($DC_{dot}$) | Inv./Ref. Ratio ($DC_{dot}$/RDC or "K") | DELTA (Ref. − Inv.) |
| 1 | Iggesund Silk 300 | 300 | Coated | 0.053 | 0.0058 | 0.109 | 0.048 |
| 2 | Arjowiggins (Dalum) Cyclus | 170 | Uncoated | 0.107 | 0.0077 | 0.072 | 0.099 |
| 3 | Invercote Creato 300 | 300 | Coated (SBS, C2S) | 0.047 | 0.0050 | 0.107 | 0.042 |
| 4 | Arjowiggins Gloss | 170 | Coated Gloss, Recycled | 0.026 | 0.0043 | 0.167 | 0.022 |
| 5 | Dalum Gloss recycled | 170 | Coated Gloss, Recycled | 0.044 | 0.0047 | 0.106 | 0.040 |
| 6 | Sappi Magno Satin | 170 | Coated Silk | 0.035 | 0.0049 | 0.139 | 0.030 |
| 7 | Sappi Magno Star | 250 | Coated Gloss | 0.044 | 0.0042 | 0.096 | 0.040 |
| 8 | Invercote G | 300 | Coated (SBS, C1S) | 0.047 | 0.0073 | 0.157 | 0.039 |
| 9 | Stora Enso | 275 | Coated (WLC, C1S) | 0.033 | 0.0049 | 0.147 | 0.029 |
| 10 | Hadar Top | 170 | Uncoated Offset | 0.239 | 0.0096 | 0.040 | 0.143 |

It is manifest that for all fibrous substrates, (commodity) coated and uncoated, the inventive dot constructions exhibit lower non-convexities (1-CX or $DC_{dot}$). The highest value of $DC_{dot}$, obtained for an uncoated substrate (Hadar Top), 0.010, is still less than ⅔ of the lowest roundness deviation strates, coefficient K may be at least 0.10, at least about 0.12, at least about 0.14, at least about 0.16, at least about 0.18, or at least about 0.20.

Field of View

The ink dots in the ink dot constructions of the present invention may exhibit consistently good shape properties (e.g., convexity, roundness, edge raggedness, and the like), irrespective, to a large degree, of the particular, local topographical features of the substrate, and irrespective, to some degree, of the type of printing substrate (coated or uncoated printing substrates, plastic printing substrates, etc.). The quality of ink dots in various known printing technologies, and in direct aqueous inkjetting technologies in particular, may vary appreciably with the type of printing substrate, and with the particular, local topographical features of the substrate. It will be readily appreciated that, by way of example, when an ink drop is jetted onto a particularly flat local contour having a relatively homogeneous substrate surface (such as a broad fiber), the ink dot obtained may display significantly better shape properties, with respect to the other, or average ink dots disposed elsewhere on the substrate.

Using a more statistical approach, however, may better distinguish between the inventive ink dot constructions with respect to ink dot constructions of the art. Thus, in some embodiments of the present invention, the ink dot constructions may be characterized as a plurality of ink dots disposed on the substrate, within a representative field of view. Assuming the characterization of the dot is obtained through image processing, a field of view contains a plurality of dot images, of which at least 10 dot images are suitable for image processing. Both the field of view and the dot images selected for analysis are preferably representative of the total population of ink dots on the substrate (e.g., in terms of dot shape).

As used herein in the specification and in the claims section that follows, the term "geometric projection" refers to an imaginary geometric construct that is projected onto a printed face of a printing substrate.

As used herein in the specification and in the claims section that follows, the term "distinct ink dot" refers to any ink dot or ink dot image, at least partially disposed within the "geometric projection", that is neither a "satellite", nor an overlapping dot or dot image.

As used herein in the specification and in the claims section that follows, the term "mean deviation", with respect to the roundness, convexity, and the like, of a plurality of "distinct ink dots", refers to the sum of the individual distinct ink dot deviations divided by the number of individual distinct ink dots.

Procedure

A printed sample, preferably containing a high incidence of single ink dots, is scanned manually on the LEXT microscope, using a X20 magnification to obtain, a field that includes at least 10 single dots in a single frame. Care should be taken to select a field whose ink dot quality is fairly representative of the overall ink dot quality of the printed sample.

Each dot within the selected frame is analyzed separately. Dots that are "cleaved" by the frame margins (which may be considered a square geometric projection) are considered to be part of the frame, and are analyzed. Any satellites and overlapping dots are excluded from the analysis. A "satellite" is defined as an ink dot whose area is less than 25% of the average dot area of the dots within the frame, for frames having a generally homogeneous dot size, or as an ink dot whose area is less than 25% of the nearest adjacent dot, for non-homogeneous frames.

Each distinct ink dot is subsequently magnified with a X100 zoom, and image processing may be effected according to the procedure provided hereinabove with respect to the convexity and roundness procedures.

Results

FIG. 5F-1 provides a magnified view of a small field of ink dots on a commodity-coated fibrous substrate (Arjowiggins coated recycled gloss, 170 gsm), the field produced using a commercially available aqueous, direct inkjet printer. Ink image A is a satellite, and is excluded from the analysis. Dot B is cleaved by the frame margin, and is included in the analysis (i.e., the full ink dot is analyzed). Tail or projection C is considered to be part of the ink dot disposed to its left. Thus, the field contains only 6 ink dots for image processing.

FIG. 5F-2 provides a magnified view of a field of an ink dot construction according to the present invention, in which the commodity-coated substrate is identical to that of FIG. 5F-1. Ink image D, by way of example, is a satellite, and is excluded from the analysis. Thus, the field contains 12 ink dots for image processing.

It is manifest from a comparison of the figures that the field of ink dots displayed in FIG. 5F-1 exhibits superior dot shape and average dot shape, with respect to the field of ink dots displayed in FIG. 5F-2.

Figures 1, 5G:
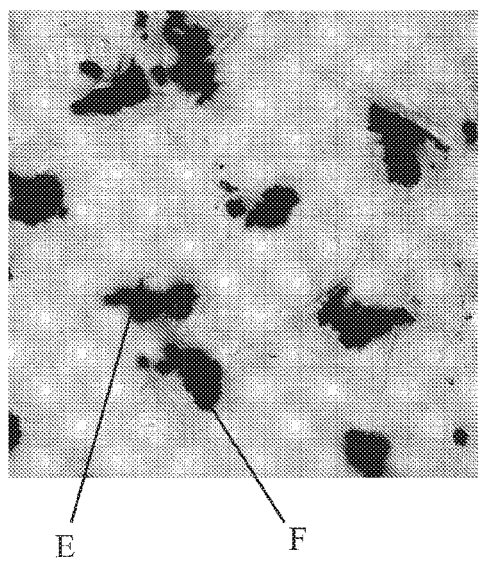
Figures 2, 5G:
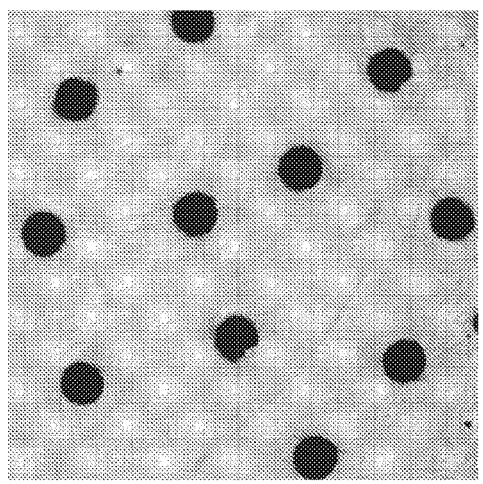

FIG. 5G-1 provides a magnified view of a field of ink dots or splotches on an uncoated fibrous substrate (Hadar Top uncoated-offset 170 gsm), the field produced using a commercially available aqueous, direct inkjet printer. At higher magnification, it became evident that dots E and F are distinct individual dots. While several splotches are reasonably round and well-formed, most of the splotches display poor roundness and convexity, have poorly-defined edges, and appear to contain multiple ink centers that are associated or weakly associated.

By sharp contrast, FIG. 5G-2 provides a magnified view of a field of an ink dot construction according to the present invention, in which the uncoated substrate is identical to that of FIG. 5G-1. Each ink dot exhibits good roundness and convexity, and has well-defined edges. Moreover, each ink dot is disposed on top of the coarse, uncoated fibrous substrate.

Deviation from roundness and non-convexity data for each of the fields is provided in Tables 4A-4D.

The fields of the ink dot construction according to the present invention exhibited (average) non-convexities of 0.003 for the Arjowiggins coated substrate, and 0.013 for the Hadar Top uncoated substrate. These average values are highly similar to the non-convexities exhibited by individual ink dots of the present invention on these substrates (0.004 and 0.010, respectively). Similarly, the fields of the ink dot construction according to the present invention exhibited (average) deviations from roundness of 0.059 for the Arjowiggins coated substrate, and 0.273 for the Hadar Top uncoated substrate. These average values are higher than, but fairly similar to, the deviations from roundness exhibited by individual ink dots of the present invention on these substrates (0.026 and 0.239, respectively). As articulated hereinabove, and as is manifest to the eye from FIGS. 5F-2 and 5G-2, ink dots in the ink dot constructions of the present invention tend to exhibit consistently good shape properties (such as convexity and roundness), largely irrespective of the particular, local topographical features of the substrate.

These exemplary results have been confirmed on several additional fibrous substrates, both commodity-coated and uncoated.

For all tested commodity-coated fibrous substrates, fields of the ink dot construction according to the present invention exhibited a mean non-convexity of at most 0.05, at most 0.04, at most 0.03, at most 0.025, at most 0.020, at most 0.015, at most 0.012, at most 0.010, at most 0.009, or at most 0.008.

For all tested uncoated fibrous substrates, fields of the ink dot construction according to the present invention exhibited a mean non-convexity of at most 0.085, at most 0.07, at most 0.06, at most 0.05, at most 0.04, at most 0.03, at most 0.025, at most 0.020, at most 0.018, or at most 0.015.

Coated Substrate

TABLE 4A

Prior Art Ink Dot Construction
(FIG. 5F-1)

| Dot index | ER-1 | 1-CX |
|---|---|---|
| 1 | 0.567 | 0.038 |
| 2 | 0.946 | 0.134 |
| 3 | 1.933 | 0.132 |
| 4 | 0.675 | 0.048 |
| 5 | 0.565 | 0.030 |
| 6 | 0.972 | 0.130 |
| Average | 0.943 | 0.085 |

TABLE 4B

Inventive Ink Dot Construction
(FIG. 5F-2)

| Dot index | ER-1 | 1-CX |
|---|---|---|
| 1 | 0.049 | 0.003 |
| 2 | 0.070 | 0.004 |
| 3 | 0.049 | 0.003 |
| 4 | 0.060 | 0.003 |
| 5 | 0.050 | 0.003 |
| 6 | 0.054 | 0.003 |
| 7 | 0.066 | 0.003 |
| 8 | 0.079 | 0.004 |
| 9 | 0.054 | 0.004 |
| 10 | 0.057 | 0.005 |
| 11 | 0.050 | 0.002 |
| 12 | 0.068 | 0.004 |
| Average | 0.059 | 0.003 |

Uncoated Substrate

TABLE 4C

Prior Art Ink Dot Construction
(FIG. 5G-1)

| Dot index | ER-1 | 1-CX |
|---|---|---|
| 1 | 5.410 | 0.225 |
| 2 | 3.878 | 0.319 |
| 3 | 4.025 | 0.311 |
| 4 | 1.415 | 0.159 |
| 5 | 2.846 | 0.297 |
| 6 | 3.566 | 0.283 |
| 7 | 1.584 | 0.145 |
| 8 | 4.051 | 0.285 |
| Average | 3.347 | 0.253 |

TABLE 4D

Inventive Ink Dot Construction
(FIG. 5G-2)

| Dot index | ER-1 | 1-CX |
|---|---|---|
| 1 | 0.277 | 0.016 |
| 2 | 0.151 | 0.007 |
| 3 | 0.212 | 0.009 |
| 4 | 0.302 | 0.017 |
| 5 | 0.323 | 0.020 |
| 6 | 0.355 | 0.015 |
| 7 | 0.316 | 0.018 |
| 8 | 0.196 | 0.007 |
| 9 | 0.274 | 0.008 |
| 10 | 0.307 | 0.021 |
| 11 | 0.247 | 0.010 |
| 12 | 0.319 | 0.011 |
| Average | 0.273 | 0.013 |

In some embodiments, the field non-convexity is at least 0.0005, at least 0.001, at least 0.002, at least 0.003, or at least about 0.004. In some cases, and particularly for uncoated fibrous substrates, the field or mean non-convexity may be at least 0.05, at least 0.07, at least 0.10, at least 0.12, at least 0.15, at least 0.16, at least 0.17, or at least 0.18.

For all tested commodity-coated fibrous substrates, fields of the ink dot construction according to the present invention exhibited a mean deviation from roundness of at most 0.60, at most 0.50, at most 0.45, at most 0.40, at most 0.35, at most 0.30, at most 0.25, at most 0.20, at most 0.17, at most 0.15, at most 0.12, or at most 0.10.

For all tested uncoated fibrous substrates, fields of the ink dot construction according to the present invention exhibited a mean deviation from roundness of at most 0.85, at most 0.7, at most 0.6, at most 0.5, at most 0.4, at most 0.35, at most 0.3, at most 0.25, at most 0.22, or at most 0.20.

In some embodiments, the mean deviation from roundness is at least 0.010, at least 0.02, at least 0.03, or at least about 0.04. In some cases, the deviation from roundness may be at least 0.05, at least 0.07, at least 0.10, at least 0.12, at least 0.15 at least 0.16 at least 0.17, or at least 0.18.

While the above-described non-convexity and deviation from roundness values are for fields having at least 10 dots suitable for evaluation, they further apply to fields having at least 20, at least 50, or at least 200 of such suitable dots. Moreover, the inventors have found that the distinction between both the non-convexity values and deviation from roundness values of the inventive ink dot constructions vs. the prior-art ink dot constructions becomes even more statistically significant with increasing field size.

For all tested plastic substrates, described in greater detail hereinbelow, the fields of the ink dot construction according to the present invention exhibited a mean non-convexity of at most 0.075, at most 0.06, at most 0.05, at most 0.04, at most 0.03, at most 0.025, at most 0.020, at most 0.015, at most 0.012, at most 0.010, at most 0.009, or at most 0.008; the fields of the ink dot construction according to the present invention exhibited a mean deviation from roundness of at most 0.8, at most 0.7, at most 0.6, at most 0.5, at most 0.4, at most 0.35, at most 0.3, at most 0.25, at most 0.20, at most 0.18, or at most 0.15. Smooth plastics, such as atactic polypropylene and various polyesters, exhibited a mean deviation from roundness of at most 0.35, at most 0.3, at most 0.25, at most 0.20, at most 0.18, at most 0.15, at most 0.12, at most 0.10, at most 0.08, at most 0.06, at most 0.05, at most 0.04, or at most 0.035.

Plastic Substrates

Figures 1, 5H:
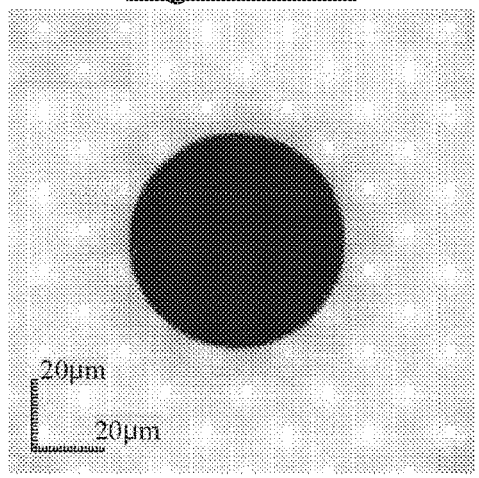
Figures 2, 5H:
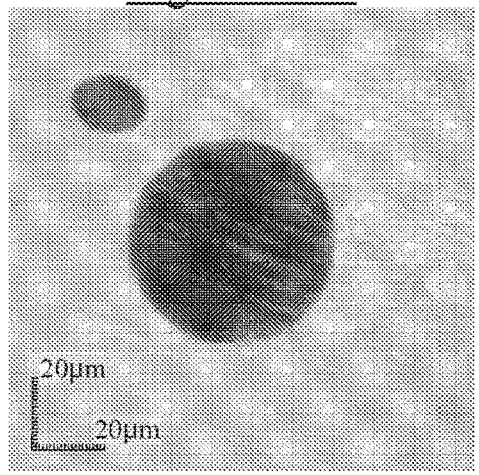
Figures 3, 5H:
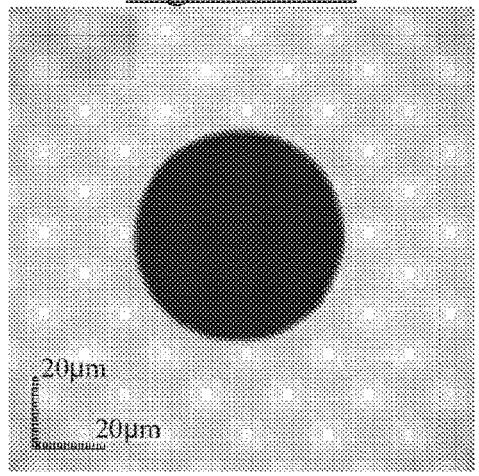

FIGS. 5H-1-5H-3 provide magnified top views of ink dot constructions according to the present invention, in which an ink dot is printed on each of various exemplary plastic printing substrates, including biaxially oriented polypropylene—BOPP (FIG. 5H-1); anti-static polyester (FIG. 5H-2); and atactic polypropylene (FIG. 5H-3).

On all of the various plastic printing substrates used, and as shown in exemplary fashion in FIGS. 5H-1-5H-3, the ink dots of the present invention exhibited superior optical and shape properties, including roundness, convexity, edge raggedness, and surface roughness.

Figures 4, 5H:
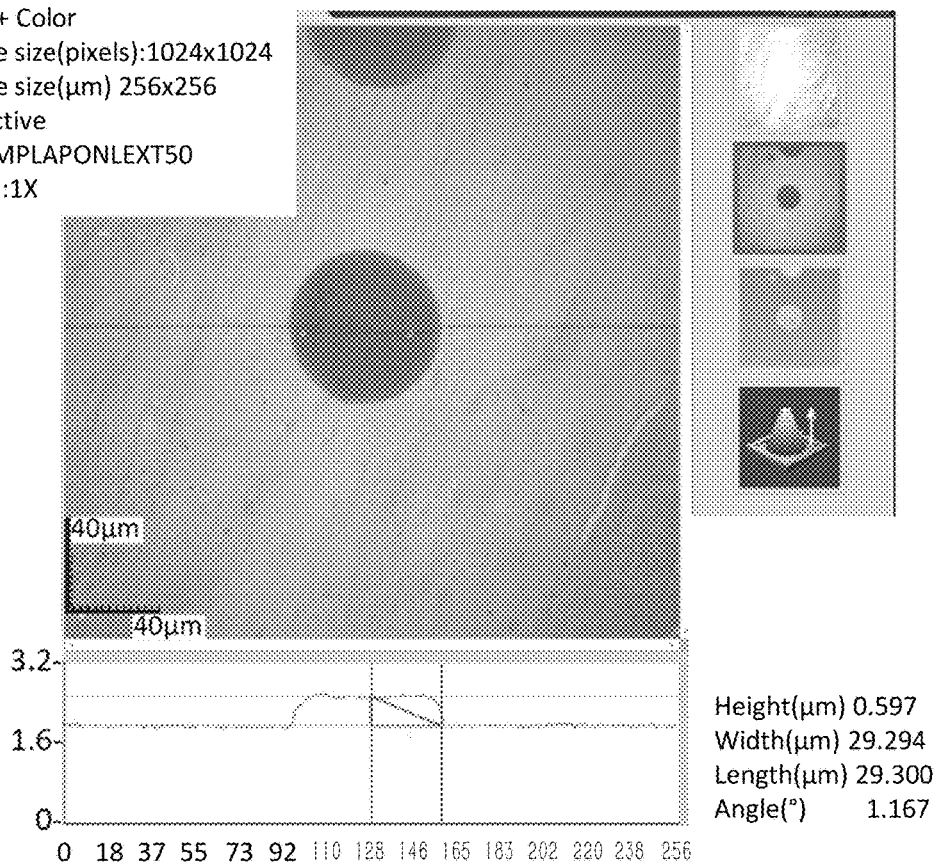

FIG. 5H-4 provides a magnified top view of an ink dot printed on a polyester substrate, in accordance with the present invention. FIG. 5H-4 further provides a cross-sectional representation showing the surface roughness of the ink dot and substrate. The ink dot has a height of about 600 nm. The deviation in height is less than ±50 nm over the middle 80% of the dot diameter, and less than ±25 nm over the middle 60% of the dot diameter.

Exemplary deviations from roundness and non-convexities are provided in Table 5.

TABLE 5

| Substrate Type | ER-1 | 1-CX |
|---|---|---|
| BOPP Anti-Static | 0.1442 | 0.0097 |
| Polyester Atactic | 0.0288 | 0.0016 |
| Polypropylene | 0.0299 | 0.0020 |

The non-convexity, or deviation from convexity for ink dots printed on a wide variety of plastic printing substrates, was at most 0.020, at most 0.018, at most 0.016, at most 0.014, at most 0.012, or at most 0.010. At least some of the ink dots, on all these substrates, including BOPP, exhibited non-convexities of at most 0.008, at most 0.006, at most 0.005, at most 0.004, at most 0.0035, at most 0.0030, at most 0.0025, or at most 0.0020. On the polyester and the atactic polypropylene substrates, typical ink dots exhibited non-convexities of at most 0.006, at most 0.004, at most 0.0035, and even more typically, at most 0.0030, at most 0.0025, or at most 0.0020.

On all plastic substrates tested, individual ink dots in the ink dot constructions according to the present invention exhibited a typical deviation from roundness of at most 0.8, at most 0.7, at most 0.6, at most 0.5, at most 0.4, at most 0.35, at most 0.3, at most 0.25, at most 0.20, at most 0.18, or at most 0.15. On various smooth plastics, such as atactic polypropylene and various polyesters, individual ink dots exhibited a typical deviation from roundness of at most 0.35, at most 0.3, at most 0.25, at most 0.20, at most 0.18, at most 0.15, at most 0.12, at most 0.10, at most 0.08, at most 0.06, at most 0.05, at most 0.04, or at most 0.035.

Figures 5, 5H:
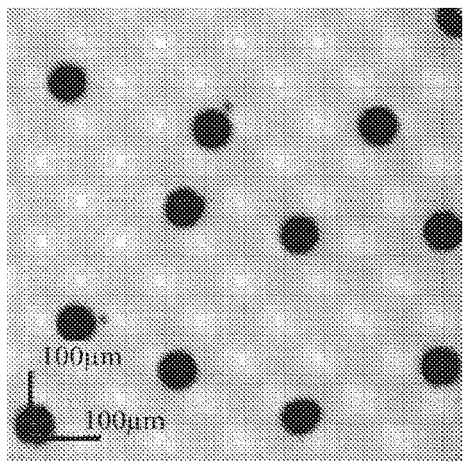
Figures 5, 5H, 6:
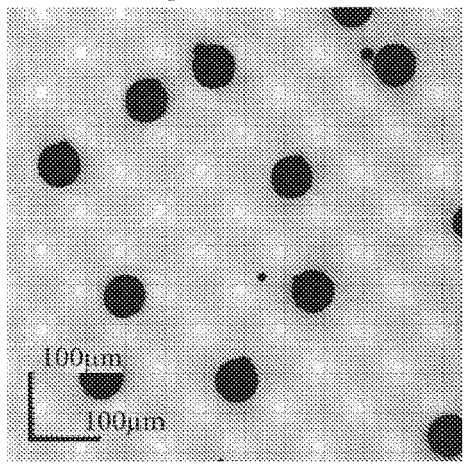

FIGS. 5H-5-5H-7 each provide a magnified view of a field having an ink dot construction according to the present invention, each field containing ink dots printed onto a respective plastic substrate. In FIG. 5H-5, the substrate is anti-static polyester; in FIG. 5H-6, the substrate is polypropylene (BOPP WBI 35 micron (Dor, Israel)); in FIG. 5H-7, the printing substrate is atactic polypropylene. In all of these fields, each ink dot exhibits good roundness and convexity, has well-defined edges, and is disposed on top of the particular plastic substrate. The ink dots of inventive ink dots-on-plastic constructions may closely resemble the ink dots on commodity-coated substrates, particularly with regard to the roundness, convexity, edge raggedness, and other optical shape properties. For a wide variety of plastic substrates, the inventive ink dots-on-plastic constructions display optical shape properties (e.g., deviation from roundness, non-convexity) that equal, or surpass, those of the commodity-coated substrates.

Optical Uniformity

The original ink film images provided in FIGS. 5A and 5B are not optically uniform. Generally, the ink film images disposed on uncoated paper are less optically uniform than the corresponding ink film images disposed on coated paper.

Furthermore, it can be observed that the inventive ink dots exhibit superior optical uniformity in comparison with the various prior-art ink forms. This appears to hold for both uncoated and coated printed substrates. That which is readily observed by the human eye may be quantified using image-processing techniques. The method of measuring ink dot uniformity is provided below.

Optical Uniformity Measurement

The dot images are loaded to the ImageXpert Software, preferably using the statistical rules provided hereinabove. Each image is loaded in each of the Red, Green and Blue channels. The channel selected for the image processing is the channel exhibiting the highest visible details, which include the dot contour and color variance within the dot area, and the substrate surface fibrous structure. For example, the Red channel is typically most suitable for a cyan dot, while the Green channel is typically most suitable for a magenta dot.

For each of the selected dots, a line profile (preferably 3 line profiles for each of the at least 10 most representative dots) is measured across the dot area, crossing through the center of the dot. Since the line profile is measured on a single channel, gray values (0-255, non color values) are measured. The line profiles are taken across the center of the dot and cover only the inner two thirds of the dot diameter, to avoid edge effects. The standard for sampling frequency is about 8 optical measurements along the line profile (8 measured gray values evenly spaced along each micrometer, or 125 nanometers+/−25 nanometers per measurement along the line profile), which was the automatic frequency of the ImageXpert Software, and which was found to be suitable and robust for the task at hand.

The standard deviation (STD) of each of the line profiles is computed, and multiple line-profile STDs for each type of printed image are averaged into a single value.

Figures 1, 6D:
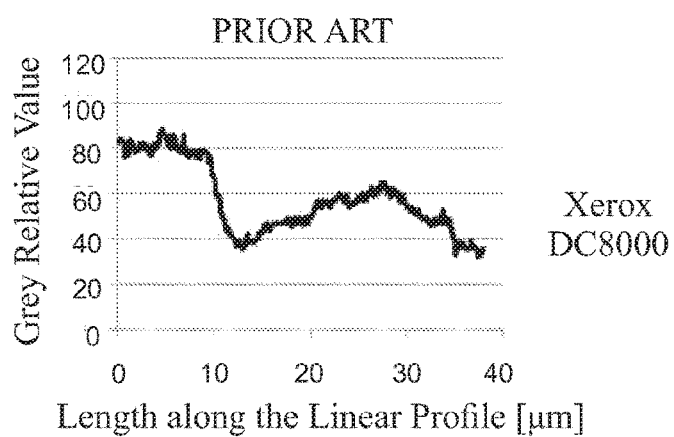
Figures 2, 6D:
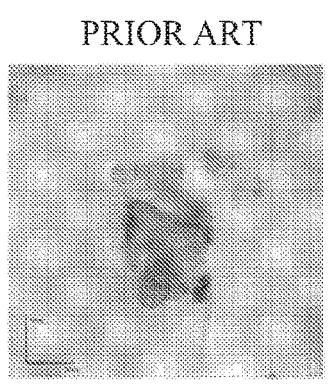
Figures 1, 6E:
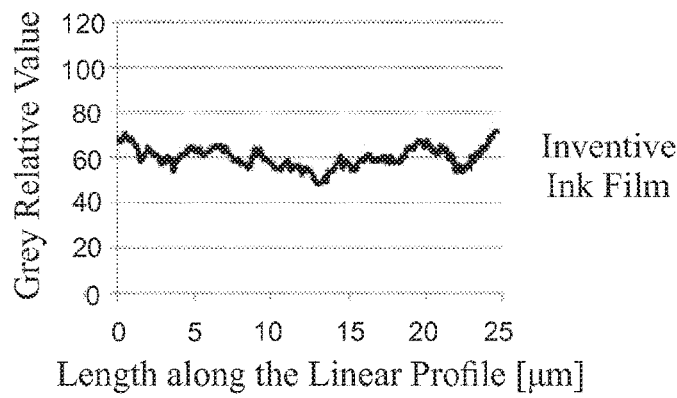
Figures 2, 6E:
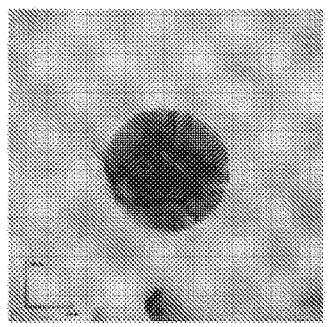

FIGS. 6A-1 to 6J-2 provide images of ink splotches or dots obtained using various printing technologies, and optical uniformity profiles therefor. More specifically, FIGS. 6A-1 to 6E-1 provide ink dot images disposed on uncoated paper, for the following printing technologies: HP DeskJet 9000 (FIG. 6A-1); Digital press: HP Indigo 7500 (FIG. 6A-2); Offset: Ryobi 755 (FIG. 6A-3); Xerox DC8000 (FIG. 6A-4); and for an embodiment of the inventive printing technology (FIG. 6A-5). Similarly, FIGS. 6F-1 to 6J-1 provide ink dot images disposed on commodity coated paper, for those printing technologies.

Figures 1, 6F:
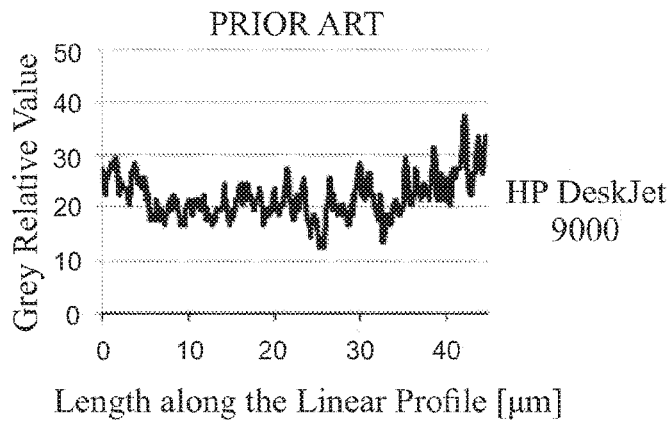
Figures 2, 6F:
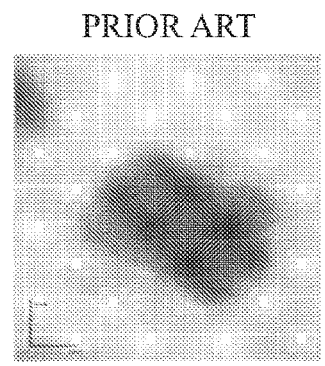
Figures 1, 6G:
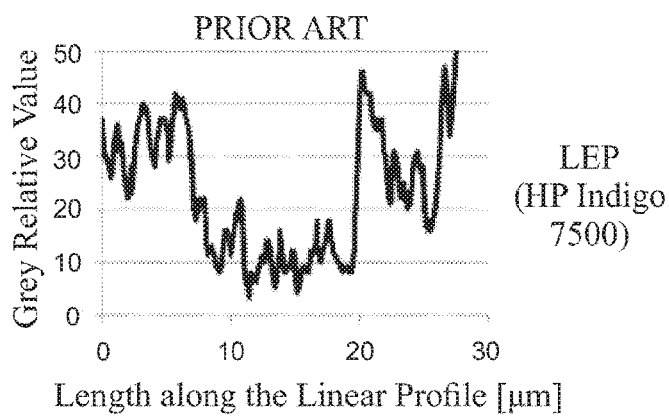
Figures 2, 6G:
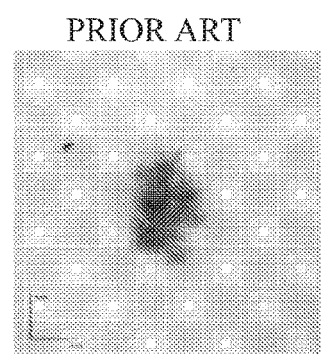
Figures 1, 6H:
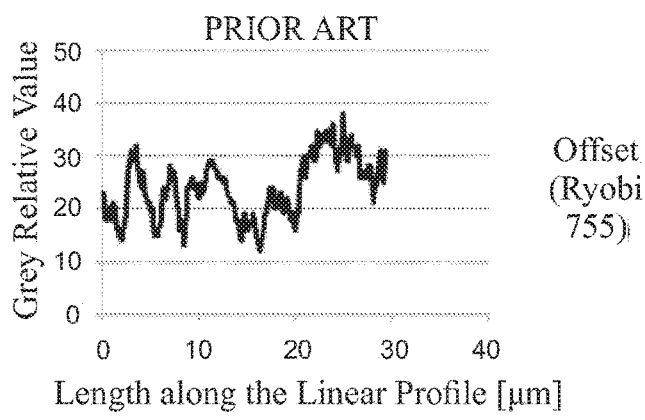
Figures 2, 6H:
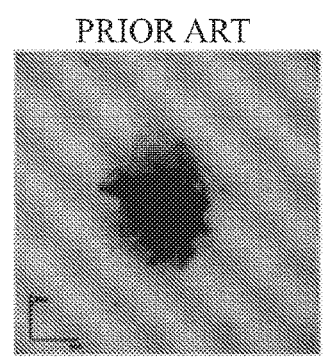
Figure 7:
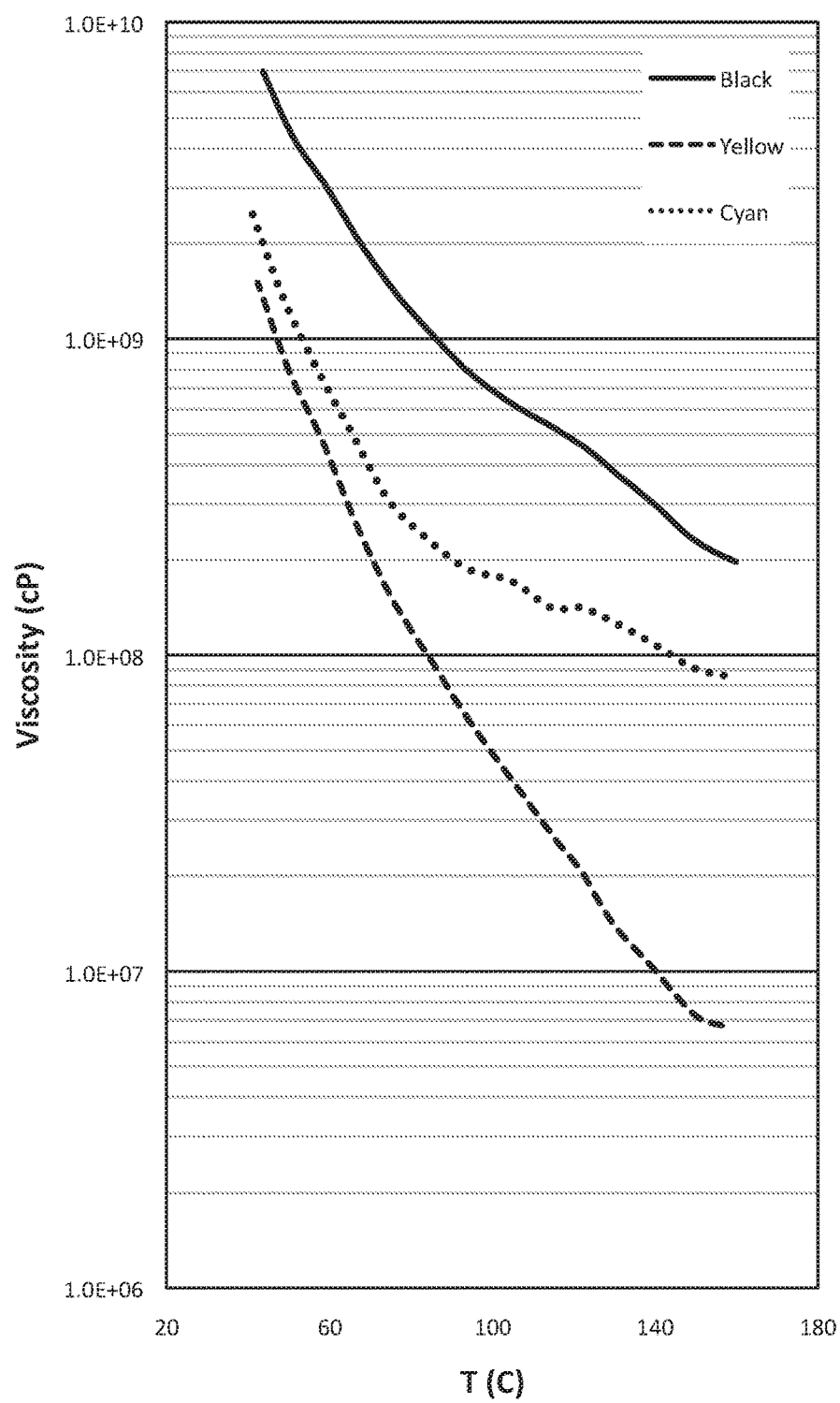

FIGS. 6A-2 to 6J-2 respectively provide a graph plotting the (non-color) gray relative value as a function of the position on the line passing through the center of the ink dot image, for each of the ink dot images provided by FIGS. 6A-1 to 6E-1 (on uncoated paper), and by FIGS. 6F-1 to 6J-1 (on coated paper). A relatively flat linear profile for a particular ink dot image indicates high optical uniformity along the line.

The STD of each of the line profiles of each type of printed image is provided in Table 6, for both uncoated and coated substrates. The results would appear to confirm that the ink dots disposed on the uncoated fibrous printing substrates exhibit poorer uniformity with respect to the corresponding ink dots disposed on the coated fibrous printing substrates.

Moreover, for uncoated substrates, the line profile of the inventive ink film produced by the inventive system and process had an STD of 4.7, which compares favorably to the STDs achieved using the various prior art technologies (13.7 to 19.1). For coated substrates, the line profile of the inventive ink dot produced by the inventive system and process had an STD of 2.5, which compares favorably, though less strikingly so, to the STDs achieved using the various prior art technologies (4 to 11.6).

When comparing between films or dots on coated papers, the average of each of the standard deviations (STD) of the dot profiles of the present invention was always below 3. More generally, the STD of the dot profiles of the present invention is less than 4.5, less than 4, less than 3.5, less than 3, or less than 2.7.

TABLE 6

|  | STANDARD DEVIATION | |
| --- | --- | --- |
|  | Uncoated | Coated |
| HP DeskJet 9000 | 19.1 | 4 |
| HP Indigo 7500 | 13.7 | 11.6 |
| Offset: Ryobi 755 | 18.6 | 5.75 |
| Xerox DC8000 | 15.4 | 7 |
| Inventive System | 4.7 | 2.5 |

By sharp contrast, the STD of the offset Dot Uniformity profile was 5.75, and the STD of the LEP (Indigo) Dot Uniformity profile was 11.6.

Thus, the STD values for the dots of the present invention are manifestly differentiated from the STD values of the exemplary printed dots of the prior art, both on coated and uncoated papers.

In comparing between films or dots on uncoated papers, the standard deviation (STD) of the dot profiles of the present invention was always below 5. More generally, the STD of the dot profiles of the present invention is less than 10, less than 8, less than 7, or less than 6.

Because, as noted above, ink images may contain an extremely large plurality of individual or single ink dots (at least 20, at least 100, at least 1,000, at least 10,000, or at least 100,000), it may be meaningful to statistically define the inventive ink dot constructions wherein at least 10%, at least 20%, or at least 30%, and in some cases, at least 50%, at least 70%, or at least 90%, of the inventive ink dots (or inventive single-drop ink dots), disposed on any uncoated or coated (or commodity-coated) fibrous substrate, exhibit the above-mentioned standard deviations for uncoated papers and for commodity-coated papers.

Optical Density

Ink formulations containing a 1:3 ratio of pigment (Clariant Hostajet Black O-PT nano-dispersion) to resin were prepared, according to Example 6. The formulations were applied to Condat Gloss® coated paper (135 gsm) using various coating rods yielding wet layers having a characteristic thickness of 4-50 micrometers.

The above-provided formulation contains approximately 9.6% ink solids, of which 25% is pigment, and about 75% is resin, by weight. In all of the tests, the ratio of resin to pigment was maintained at 3:1. The ink solids fraction in the ink formulations varied between 0.05 and 0.12, by weight (5% to 12%). Drawdown was performed in standard fashion, directly onto the paper. The thickness of each ink film obtained was calculated.

Figure 12:
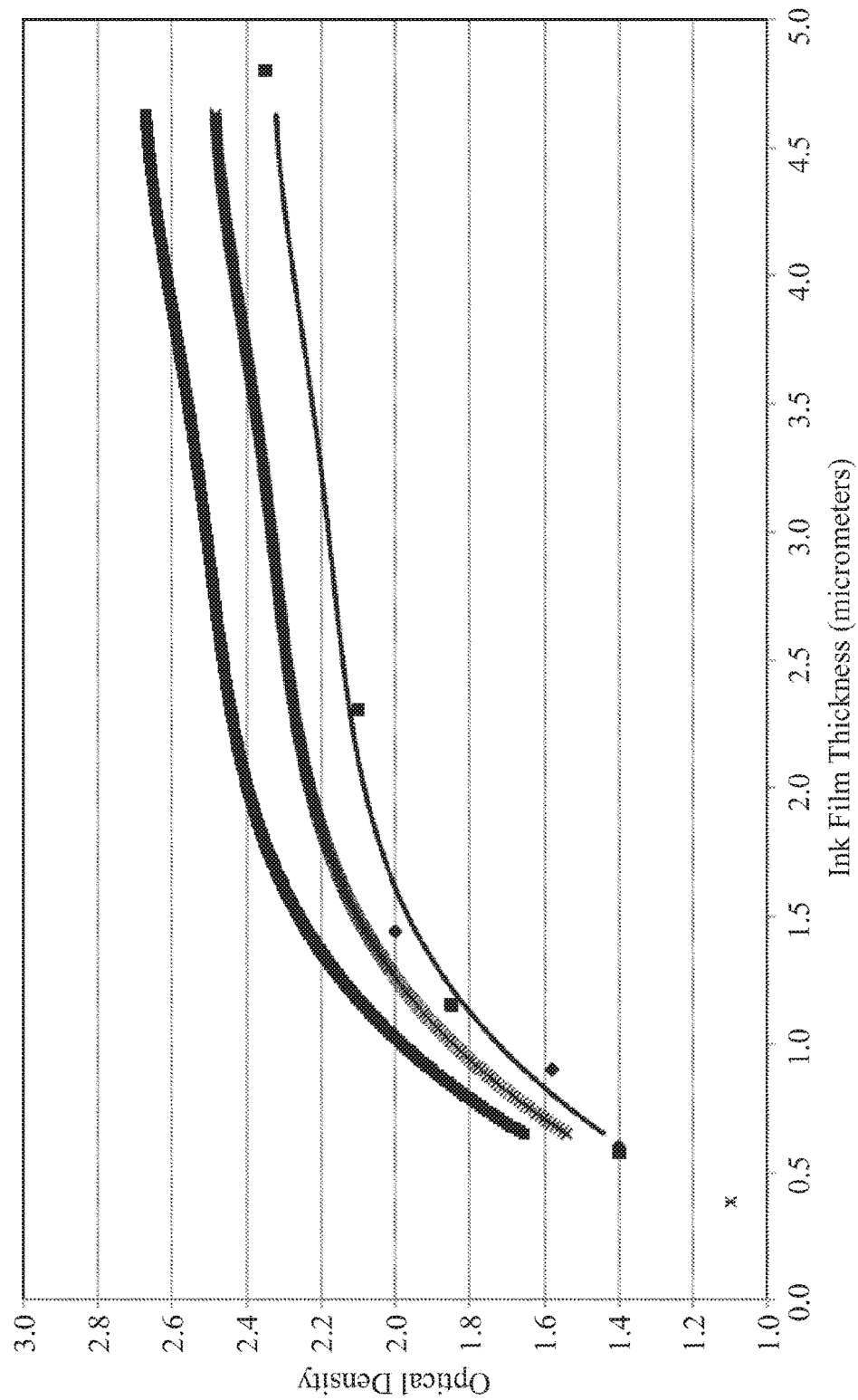
FIG. 12 provides optical density measurements, along with a fitted curve (the lowermost curve) of the optical density achieved as a function of film thickness, for a particular ink formulation.

Optical density was measured with an X-Rite® 528 Spectro-densitometer, using status "T" mode, absolute. The results are provided in Table 7. FIG. 12 provides the optical density points obtained, along with a fitted curve (the lowermost curve) of the optical density achieved as a function of film thickness. Although we do not know the formulation to be a prior-art formulation, the fitted curve may represent the optical density capabilities of the prior art.

TABLE 7

| Mayer Rod Size (μm) | Ink Solids Fraction | Ink Film Thickness (μm) | Optical Density |
| --- | --- | --- | --- |
| 50 | 0.096 | 4.80 | 2.35 |
| 24 | 0.096 | 2.30 | 2.10 |
| 12 | 0.096 | 1.15 | 1.85 |
| 6 | 0.096 | 0.58 | 1.40 |
| 4 | 0.096 | 0.38 | 1.10 |

TABLE 7-continued

| Mayer Rod Size (μm) | Ink Solids Fraction | Ink Film Thickness (μm) | Optical Density |
| --- | --- | --- | --- |
| 12 | 0.050 | 0.60 | 1.40 |
| 12 | 0.075 | 0.90 | 1.58 |
| 12 | 0.120 | 1.44 | 2.00 |

The optical density of the inventive ink film constructions may be at least 5%, at least 7%, at least 10%, at least 12%, at least 15%, at least 18%, at least 20%, at least 22%, at least 25%, at least 28%, at least 30%, at least 35%, or at least 40% higher than any of the optical density points obtained and plotted in FIG. 12, and/or higher than any point on the fitted curve represented by the function:

$$OD_{baseline} = 0.5321425673 + 1.87421537367 * H_{film} - 0.8410126431754 * (H_{film})^2 + 0.1716685941273 * (H_{film})^3 - 0.0128364454332 * (H_{film})^4$$

wherein:

$OD_{baseline}$ is the optical density provided by the fitted curve, and $H_{film}$ is the average thickness or average height of the ink film disposed on a printing substrate such as a fibrous printing substrate.

The exemplary curves disposed above the fitted curve in FIG. 12 are optical density curves of the inventive ink film construction, in which the optical density is 7% higher or 15% higher, respectively, than $OD_{baseline}$.

In absolute terms, the optical density of the inventive ink film constructions ($OD_{invention}$) may be at least 0.08, at least 0.10, at least 0.12, at least 0.15, at least 0.18, at least 0.20, at least 0.25, at least 0.30, at least 0.35, or at least 0.40 higher than any of the optical density points obtained and plotted in FIG. 12, and/or higher than any point on the fitted curve represented by the above-provided function ($OD_{baseline}$). In addition, for a film thickness of at least 1.5 microns, $OD_{invention}$ may be at least 0.45, at least 0.50, at least 0.55, at least 0.60, at least 0.70, at least 0.80, at least 0.90, at least 1.00, at least 1.10, or at least 1.25 higher than any of the optical density points obtained and plotted in FIG. 12, and/or higher than any point on the fitted curve represented by the above-provided function.

Figure 13:
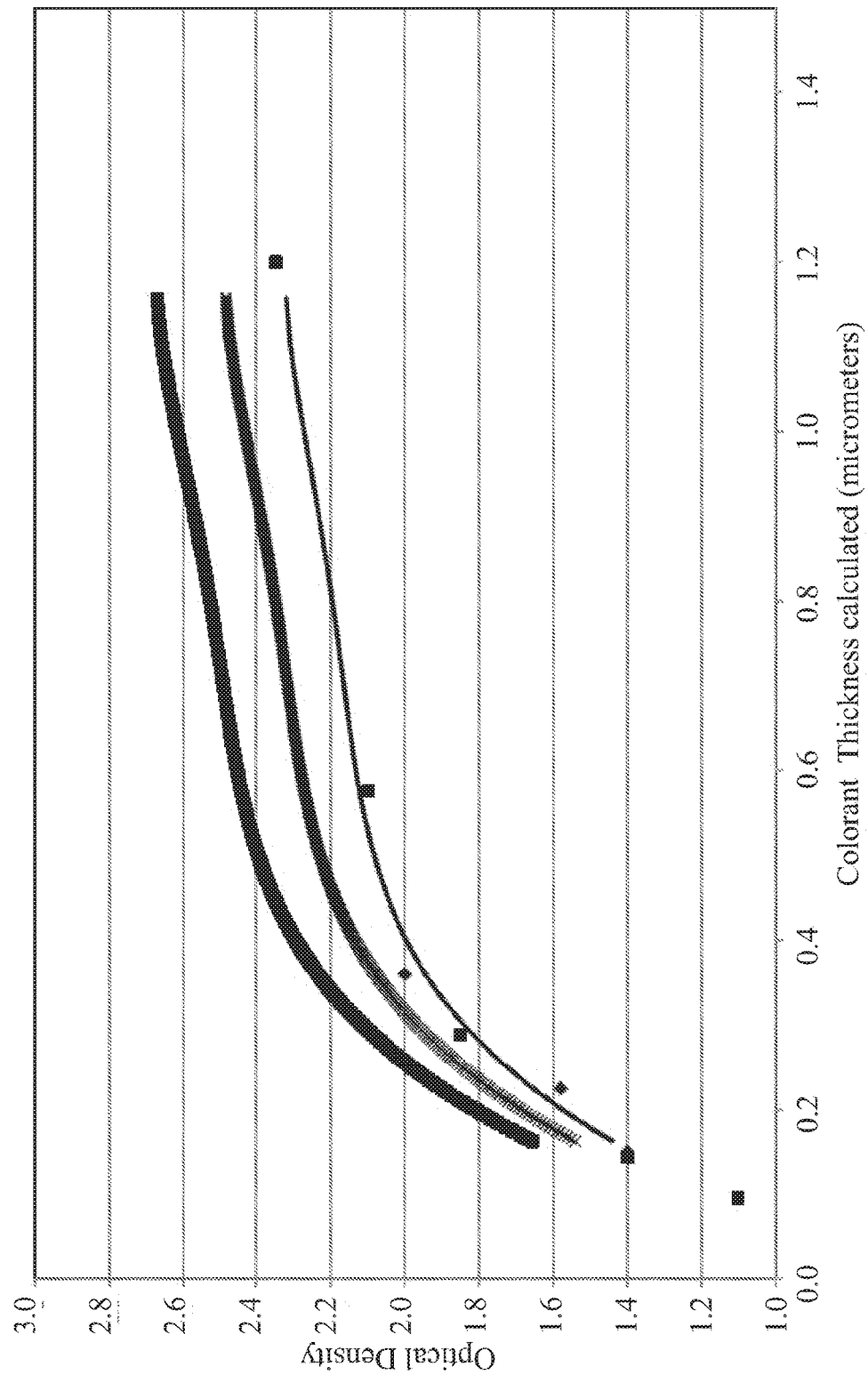
FIG. 13 provides the optical density measurements of FIG. 12, plotted as a function of pigment content or calculated pigment thickness.
Figure 14A:
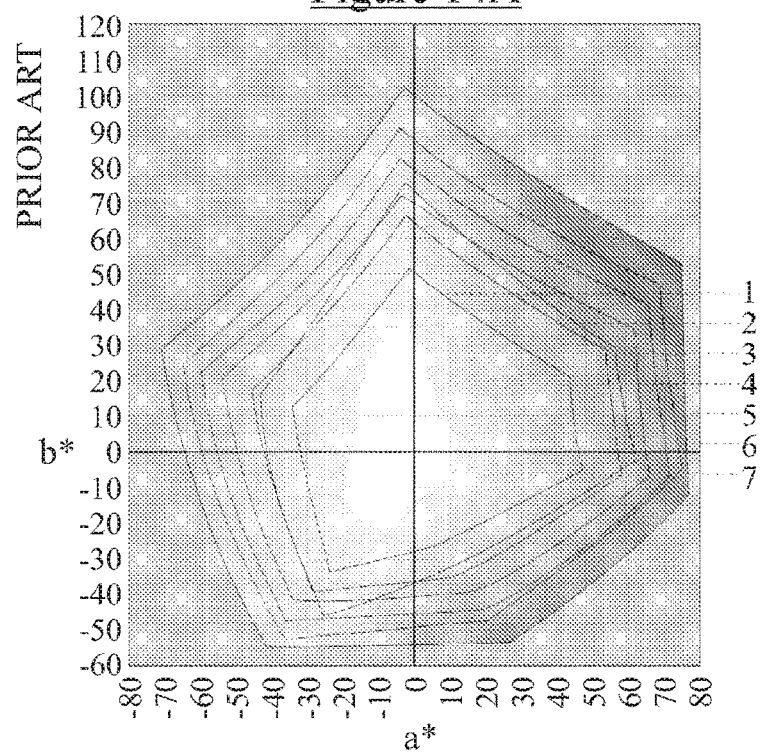
FIG. 14A provides a plot showing seven color gamut representations according to ISO standard 15339.
Figure 14B:
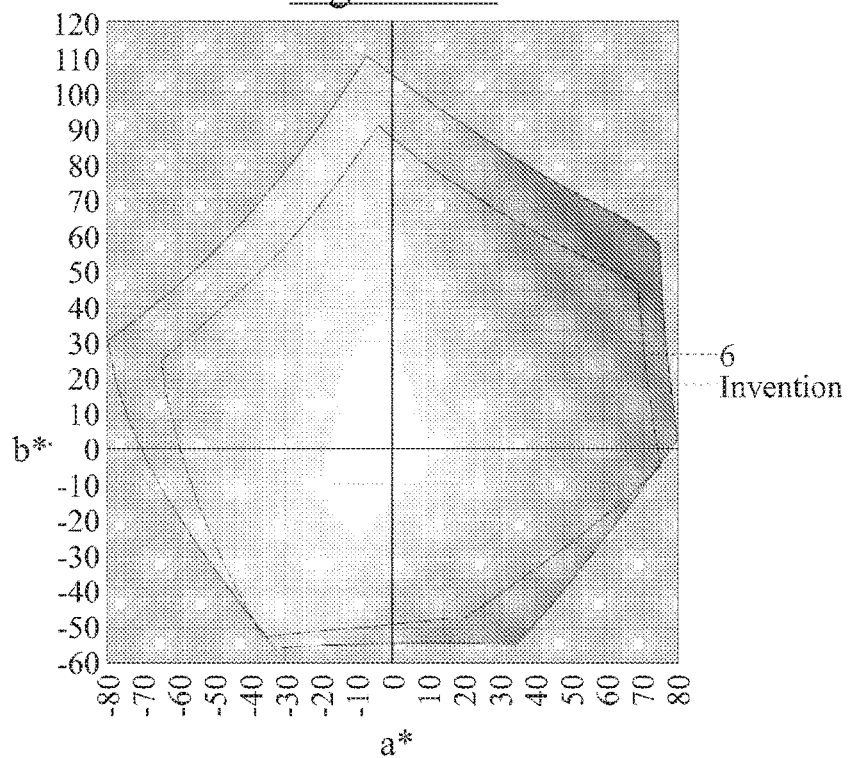
FIG. 14B plots a color gamut representation according to one embodiment of the present invention against color gamut representation #6 according to ISO standard 15339.

FIG. 13 provides the optical density measurements of FIG. 12, plotted as a function of pigment content or calculated average pigment thickness ($T_{pig}$). The optical densities (Y-axis) of FIG. 13 are identical to those shown in FIG. 12, but the variable of the X-axis is pigment content or calculated average pigment thickness, instead of average measured or calculated ink film thickness. Thus, $$OD_{baseline} = 0.5321425673 + 7.49686149468 * T_{pig} - 3.3640505727016 * (T_{pig})^2 + 0.6866743765092 * (T_{pig})^3 - 0.0513457817328 * (T_{pig})^4$$

In the case of black pigments such as black pigments including or substantially consisting of carbon black, the calculated average pigment thickness may roughly equal the ink solids thickness multiplied by the weight fraction of the pigment within the ink solids fraction (by way of example, in the above-referenced formulation, the weight fraction of the pigment is 0.25).

The optical density of the inventive ink film constructions may be at least 5%, at least 7%, at least 10%, at least 12%, at least 15%, at least 18%, at least 20%, at least 22%, at least 25%, at least 28%, at least 30%, at least 35%, or at least 40% higher than any of the optical density points obtained and plotted in FIG. 13, and/or higher than any point on the fitted curve of $OD_{baseline}$ as a function of the calculated average pigment thickness.

In absolute terms, the optical density of the inventive ink film constructions ($OD_{invention}$) may be at least 0.08, at least 0.10, at least 0.12, at least 0.15, at least 0.18, at least 0.20, at least 0.25, at least 0.30, at least 0.35, or at least 0.40 higher than any of the optical density points obtained and plotted in FIG. 13, and/or higher than any point on the fitted curve represented by the above-provided function ($OD_{baseline}$). In addition, for a film thickness of at least 1.5 microns, $OD_{invention}$ may be at least 0.45, at least 0.50, at least 0.55, at least 0.60, at least 0.70, at least 0.80, at least 0.90, at least 1.00, at least 1.10, or at least 1.25 higher than any of the optical density points obtained and plotted in FIG. 13, and/or higher than any point on the fitted curve of $OD_{baseline}$ as a function of the calculated average pigment thickness.

Color Gamut Volume

The color gamut of a particular printing technology may be defined as the sum total of all colors that the printing technology can reproduce. While color gamuts may be represented in various ways, a full color gamut is generally represented in a three-dimensional color space.

ICC (International Color Consortium) profiles are often utilized by commercially available software to evaluate color gamut volume.

ISO Standard 12647-2 ('Amended Standard' version), which is incorporated by reference for all purposes as if fully set forth herein, relates to various printing parameters for offset lithographic processes, including CIELAB coordinates, gloss, and ISO brightness for five typical offset substrates.

ISO Amended Standard 12647-2 defines CIELAB coordinates of colors for the printing sequence black-cyan-magenta-yellow, for each of the five typical offset substrates, and based thereupon, defines, for each of these substrates, a resulting color gamut of offset lithographic printing.

In practice, the color gamut volume capabilities of the prior art may be, at most about 400 kilo$(\Delta E)^3$ for coated wood free paper (e.g., Type 1 and possibly Type 2 of ISO Amended Standard 12647-2) utilized as a substrate in offset lithographic printing.

The color gamut volume capabilities of the prior art may be somewhat lower for Type 3 substrates (at most about 380 kilo$(\Delta E)^3$) and for other types of offset lithographic printing substrates such as uncoated papers, e.g., various uncoated offset papers such as Type 4 and Type 5 of ISO Amended Standard 12647-2. The color gamut volume capabilities of the prior art may be, at most, about 350 kilo$(\Delta E)^3$ for such uncoated offset papers.

It is assumed that the print image thickness (single dot or film) associated with these color gamut volumes is at least 0.9-1.1 micrometers.

By sharp contrast, the color gamut volume of the ink film constructions of the present invention, as determined, for example, by ICC profiles, may exceed or appreciably exceed the above-provided color gamut volumes. For each particular substrate type, the color gamut volume of the inventive ink film constructions may exceed the respective, existing color gamut volume capability by at least 7%, at least 10%, at least 12%, at least 15%, at least 18%, at least 20%, at least 25%, at least 30%, or at least 35%.

The color gamut volume of the inventive ink film constructions may exceed the provided, respective, color gamut volume capabilities by at least 25 kilo$(\Delta E)^3$, at least 40 kilo$(\Delta E)^3$, at least 60 kilo$(\Delta E)^3$, at least 80 kilo$(\Delta E)^3$, at least 100 kilo$(\Delta E)^3$, at least 120 kilo$(\Delta E)^3$, at least 140 kilo$(\Delta E)^3$, or at least 160 kilo$(\Delta E)^3$.

In absolute terms, the color gamut volume of the inventive ink film constructions may be characterized by color gamut volumes of at least 425 kilo$(\Delta E)^3$, at least 440 kilo$(\Delta E)^3$, at least 460 kilo$(\Delta E)^3$, at least 480 kilo$(\Delta E)^3$, or at least 500 kilo$(\Delta E)^3$. For Type 1 and Type 2 substrates and the like, the inventive ink film constructions may be further characterized by color gamut volumes of at least 520 kilo$(\Delta E)^3$, at least 540 kilo$(\Delta E)^3$, at least 560 kilo$(\Delta E)^3$, or at least 580 kilo$(\Delta E)^3$.

Without wishing to be limited by theory, the inventors believe that the enhanced color gamut volume, as well as the enhanced optical density described hereinabove, may be at least partially, or largely, attributable to the lamination of the inventive ink film onto a top surface of the printing substrate. Because the form of the film may be largely determined prior to the transfer to the substrate, the film may be integrally transferred from the ITM to the substrate. This integral continuous unit may be substantially devoid of solvent, such that there may be no penetration of any kind of material from the blanket into, or between, substrate fibers. The integral film may form a laminated layer disposed entirely above the top surface of the fibrous printing substrate.

The inventive ink film constructions may achieve the various stated color gamut volumes, not only within the 0.9-1.1 micrometer film thickness range, but, surprisingly, at average film thicknesses or heights that are lower or appreciably lower than the 0.9-1.1 micrometer range. The inventive ink film constructions may be characterized by these color gamut volumes for ink film thicknesses of less than 0.8 µm, less than 0.7 µm, less than 0.65 µm, less than 0.6 µm, less than 0.55 µm, less than 0.5 µm, less than 0.45 µm, or less than 0.4 µm.

The inventive ink film constructions may also achieve the various stated color gamut volumes at average film thicknesses that are at most 4 micrometers, at most 3.5 µm, at most 3 µm, at most 2.6 µm, at most 2.3 µm, at most 2 µm, at most 1.7 µm, at most 1.5 µm, at most 1.3 µm, or at most 1.2 µm.

Furthermore, the inventive ink film constructions may also achieve full coverage of the color gamuts defined by the above-referenced ISO Standard, within any of the film thickness ranges described hereinabove.

A new standard under development, ISO Standard 15339 is provided in Table 8.

TABLE 8

| Reference printing condition | Name | Typical Use | Volume ISO 15339 dE(CIELAB)$^3$ |
|---|---|---|---|
| 1 | Universal ColdsetNews | Newsprint, small gamut, Printing using coldset offset, flexography, letterpress, etc. | 100812.3 (23% Pantones) |
| 2 | Universal HeatsetNews | Improved newsprint, moderate gamut, Printing using heatset or similar technology | 184483.3 (32% Pantones) |
| 3 | Universal PremUncoated | Utility printing on a matt uncoated paper | 176121.3 (31% Pantones) |
| 4 | Universal SuperCal | General printing on super-calendared paper | 262646.2 (39% Pantones) |
| 5 | Universal PubCoated | Magazine publication | 345892.2 (47% Pantones) |
| 6 | Universal PremCoated | Large gamut, Printing using sheet-fed offset, gravure | 398593.1 (52% Pantones) |
| 7 | Universal Extra Large | Digital printing and potentially other large gamut printing processes | 515753.2 (62% Pantones) |

Color gamut prints were made using Dimatix SAMBA single pass inkjet print heads having a nominal resolution of 1200 dpi and providing an average drop volume of 9 pL.

Ink in the print head was maintained 22° C., the blanket was maintained at 70° C. Manual drying was effected at about 450° C. at a volume flow of 16CFM. The transfer temperature was about 130° C. Ink formulations were prepared substantially as described above with respect to Examples 2, 5, 8 and 9.

For each run, 170 patches of different color combinations were printed and measured using a spectrophotometer, to create the color gamut. Each color separation was printed sequentially on a heated blanket and dried manually for approximately 2 seconds. The order of the separations was yellow, magenta, cyan and black. After all the separations were printed, the image was transferred to the paper by applying pressure using a cylindrical weight.

Each individual color separation had a thickness of up to 600, up to 650, or up to 700 nm. The total thickness was at most 2,000 nm, and on average, about 1,700 nm, 1,800 nm or 1900 nm. In some runs, each individual color separation had a thickness of up to 450, up to 500, or up to 550 nm, and the corresponding average total thickness was about 1,300 nm, 1,400 nm or 1,500 nm.

All comparisons were done with normalized white, as though printed on the same media.

The software used to create a color profile from the prints was an i1Profiler, version 1.4.2 (X-Rite® Inc., Grand Rapids, Mich.). Measurements were done using an i1Pro2 spectrophotometer (X-Rite® Inc.), and standard techniques (similar to those of the i1Profiler) were used to plot the charts and to calculate the color gamut volume.

Abrasion Resistance

One important characteristic of printed ink films is abrasion resistance. Abrasion resistance is a property of printed ink describing the degree to which the printed image can maintain its surface and structural integrity under prolonged rubbing, scratching and scuffing. During shipping and handling, the exposed surface of printed ink films may be appreciably abraded, thereby detracting from print quality. Consequently, a wide variety of printed products (e.g., magazines and brochures) may require ink film constructions having superior abrasion resistance.

Abrasion resistance may typically be enhanced by using suitable formulations comprising resins having good abrasion resistance properties. Alternatively or additionally, special components such as waxes and/or hard-drying oils, may be introduced to the formulation.

The introduction of waxes or oils to the ink formulation may affect the overall attributes of the ink and may also lead to other process-related or print-related problems. Thus, providing the requisite abrasion resistance solely by means of abrasion resistant resins may be advantageous in at least this respect.

The inventors have discovered that in the ink formulations and in the ink film constructions of the present invention, various resins, having relatively poor mechanical or "bulk" abrasion resistance properties, may advantageously contribute to the thermo-rheological behavior of those ink formulations, whereby at least one of the development of the ink film, the transfer from the intermediate transfer member or blanket, and the adhesion to the printing substrate, may be appreciably enhanced. The poor mechanical properties of the resins may include a low hardness value.

The inventors have discovered that the abrasion resistance of print images printed with inventive ink formulations containing such resins is surprisingly high with respect to the "bulk" abrasion resistance properties of those resins.

Abrasion resistance was measured by sweeping an abrasive block on top of each sample a number of times, and measuring the optical density of the samples as compared to baseline values established for those samples prior to the abrasive testing. The samples were placed into a TMI (Testing Machines Incorporated) ink rub tester (model #10-18-01) and a dry ink rub test was performed using a 1.8 kg test block having a piece of Condat Gloss® paper (135 gsm) disposed thereon. Optical densities of the samples were measured before the test and after 100 abrasion cycles. This abrasion resistance measurement procedure is recommended by the TMI Instruction Manual, and is based on ASTM procedure D5264.

By way of example: the high molecular weight polymer in Joncryl® 2178 film-forming emulsion was tested for abrasion resistance, and was found to have excellent abrasion resistance properties. An ink formulation containing the Joncryl® 2178 was prepared, and applied on Condat Gloss® paper (135 gsm) using a 12 micrometer coating rod. With this ink formulation, a 12 µm wet thickness approximately corresponds to a dry film having a film thickness of 1.2 µm. Drawdown was performed in standard fashion. The dry ink film sample was then tested for abrasion resistance. The optical density loss was only 18% after 100 abrasion cycles, which is considered an excellent result for various printing applications.

The Joncryl® 2178 film-forming emulsion was further tested for thermo-rheological compatibility with the inventive process, and was found to have poor transfer properties.

A second, lower molecular weight resin (Neocryl® BT-26) was tested for abrasion resistance, and was found to have relatively poor abrasion resistance properties. As with the first resin, a second ink formulation containing the above-referenced resin was prepared, and applied on Condat Gloss® paper (135 gsm) using the 12 µm coating rod. The dry film obtained, having a film thickness of about 1.2 µm, was subjected to the above-described abrasion resistance test. The optical density loss was 53% after 100 abrasion cycles, nearly three times the loss borne by sample 1.

The inventive ink formulation was further tested for thermo-rheological compatibility with the inventive process, and was found to have adequate transfer properties.

The inventors then tested this second ink formulation containing the resin having relatively poor abrasion resistance properties, in a printing system and processing method of the present invention. Again, Condat Gloss® paper (135 gsm) was used as the printing substrate. Some of the ink film constructions produced were evaluated to assess various print and ink film construction properties, including abrasion resistance.

The printed substrate obtained using the second ink formulation was subjected to an abrasion resistance test identical to that performed for the drawdown samples. Surprisingly, the optical density loss was 16.6%, which is comparable to the abrasion resistance of the first, highly abrasion-resistant dry ink film sample, and which is a sufficiently good result for a wide range of printing applications.

In another exemplary abrasion resistance test, an ink formulation was prepared, according to the composition provided in Example 8. The ink was applied on Condat Gloss® paper (135 gsm) using the 12 µm coating rod. Then the ink was dried by hot air and the abrasion resistance was tested, as described above. The optical density loss was 30% after 100 abrasion cycles.

In another exemplary abrasion resistance test, the above-described ink formulation was used to produce a dry film by means of the inventive process. The dry film, having a thickness of about 1 micrometer, was obtained by applying the wet ink (12 µm, as above) on a hot (130° C.) [silanol-terminated polydimethyl-siloxane] silicone blanket, drying the film, and transferring the dried film to Condat Gloss® paper (135 gsm). The optical density loss was 19% after 100 abrasion cycles.

Adhesive Failure

The adhesive properties of the inventive ink film constructions (inter alia, Example 4) were evaluated and compared against the adhesive properties of ink dot or ink film constructions of the prior art. A standard testing procedure used: quantitative ink adhesion test FTM 21 of FINAT (Federation Internationale des Fabricants et Transformateurs d'Adhesifs et Thermocollants sur Papiers et Autres Supports), provided below.

FINAT FTM 21

Ink Adhesion—Basic

Scope

This method allows rapid assessment of the degree of adhesion of a printing ink or lacquer to a tabelstock.

Definition

The printing ink or lacquer is applied to the substrate and cured on the printing press or using a standard method appropriate for the type of ink. The ink adhesion is then estimated by the amount of ink that can be removed when adhesive tape is applied and peeled off. The resistance of the ink to mechanical removal is also measured by scratching the ink and by deformation under pressure.

Test Equipment

A means of applying and curing the ink. Adhesive tape of high peel adhesion ('aggressive'), for example Tesa 7475 (acrylic based), Tesa 7476 (rubber based), or 3M Scotch 810. FINAT roller to smooth the tape over the test piece. Metal spatula. Gloves.

Test Pieces

If the required ink has not already been applied to the substrate as part of the printing process, prepare samples for testing by coating the ink to a uniform thickness (for example, with a Meyer bar for low-viscosity inks) and curing the coating as recommended by the supplier. A-4 sheets are a conveniently-sized sample for this test. Test condition 23° C.±2° C. and 50% relative humidity (RH)±5% RH. If practical, the test pieces should be conditioned for at least four hours prior to testing.

Tape Test

Lay the specimen on a smooth, flat, hard surface and apply the adhesive tape, leaving a small part of the tape unfixed to the test piece, ensuring that no air bubbles are trapped under the tape. Using the FINAT roller, press down the tape by passing the roller twice in each direction over the specimen, and then bend the unattached part of the tape back on itself at an angle of 180°. Within 20 minutes after rolling down the tape, mount the specimen in a frame or use one hand to hold the specimen firmly, then pull the free piece of tape towards you using the other hand: at first slowly under constant speed, then very rapidly and accelerating. (The faster speed is the more aggressive test). FINAT Technical Handbook 6th edition, 2001 53.

The performance of the specimen is recorded by comparison with control samples which have been previously measured, or by reference to the following grading:

Grade 1 No removal of ink

Grade 2 Slight removal of ink (<10%)

Grade 3 Moderate removal of ink (10-30%)

Grade 4 Severe removal of ink (30-60%)

Grade 5 Almost complete removal of ink 60%)

Exemplary results are provided in Table 9.

The direct (drop-on-demand) inkjet technologies displayed poor ink adhesion to the various plastic substrates. The solid ink technology exemplified by the XEROX Phaser 8560 and the latex printing technology exemplified by the HP Designjet Z6200 also displayed poor ink adhesion to various plastic substrates. Lithographic offset printing, gravure, and some LEP and DEP technologies displayed strong adhesive properties on the plastic substrates tested.

With respect to various plastic substrates, including polypropylene sheets (e.g., biaxially oriented polypropylene—BOPP), polyethylene sheets, and polyethylene terephthalate sheets, the ink-film constructions of the present invention exhibited strong adhesive properties.

In some embodiments of the invention, the ink dots-on-plastic ink constructions exhibited an adhesive failure of at most 10%, and more typically, at most 5%, when subjected to a standard tape test (FINAT FTM 21, basic ink adhesion test). In most cases, the ink dots-on-plastic ink constructions were free or substantially free of adhesive failure when subjected to this tape test.

TABLE 9

| Printing | | | MEAN GRADE | |
| --- | --- | --- | --- | --- |
| Technology | Device | Substrate Type | no cut | with cut |
| Variable Sleeve Offset Printing | | Polyethylene (web) | 1 | 1 |
| | Gravure | Cellulose | 1 | 1 |
| Flexography | COMEXI | Polyethylene | 1.66 | 2 |
| Flexography | | PP | 1 | 1 |
| LEP | INDIGO | Shrink Sleeve Stock | 1 | 1 |
| Inkjet (industrial) | EFI Jetrion | PP | 1 | 1 |
| DEP (LED-based) | XEIKON | PP | 1 | 2 |
| | Gravure | Polyethylene | 1 | 1 |
| LEP | INDIGO WS 6600 | Polyethylene | 1 | 1.66 |
| Solid Ink | XEROX Phaser 8560 | PP | 5 | 5 |
| Solid Ink | XEROX Phaser 8560 | Jolybar Synth. Paper 60 | 5 | 5 |
| Solid Ink | XEROX Phaser 8560 | 100 PP 90M | 5 | 5 |
| Solid Ink | XEROX Phaser 8560 | PPX LABEL 110M | 5 | 5 |
| Latex | HP Designjet Z6200 | PP (HP Everyday Matte) | 4.33 | 4.33 |
| Inkjet | Epson Stylus SX-125 | PP | 5 | 5 |
| Inkjet | Epson Stylus SX-125 | PETF-Thin | 5 | 5 |
| Inkjet | Epson Stylus SX-125 | Polyethylene | 5 | 5 |
| Inkjet | Epson Stylus SX-125 | PETF-Thick | 5 | 5 |
| Inkjet | HP DeskJet 9803 | PP | 5 | 5 |
| Inkjet | HP DeskJet 9803 | PETF-Thin | 5 | 5 |
| Inkjet | HP DeskJet 9803 | Polyethylene | 5 | 5 |
| Inkjet | HP DeskJet 9803 | PETF-Thick | 5 | 5 |
| Present Invention | Landa Press | PP (synthetic paper) | 1 | 1 |
| Present Invention | Landa Press | PP | 1 | 1 |
| Present Invention | Landa Press | PETF-Thin | | |
| Present Invention | Landa Press | Polyethylene | 1 | 1 |
| Present Invention | Landa Press | PETF-Thick | 1 | 1.33 |

Glass Transition Temperature of the Resin

The inventors have found that in selecting resins for use within the formulations supporting the ink film constructions of the present invention, the softening temperature (or glass transition temperature for at least partially amorphous resins) may be a useful indicator of resin suitability. Specifically, the resins used in the ink formulations (and disposed in the ink films of the present invention) may have a $T_g$ below 47° C. or below 45° C., and more typically, below 43° C., below 40° C., below 35° C., below 30° C., below 25° C., or below 20° C.

More generally, from a process standpoint, the ink formulations disposed on the ITM, after becoming devoid or substantially devoid of water, any co-solvent, and any other vaporizable material that would be vaporized under process conditions, e.g., pH adjusting agents, (producing "ink solids" an "ink residue", or the like), and/or the resins thereof, may have a $T_g$ below 47° C. or below 45° C., and more typically, below 43° C., below 40° C., below 35° C., below 30° C., below 25° C., or below 20° C.

Thermo-Rheological Properties

The inventive process may include the heating of the ink film or image, during transport on the surface of the image transfer member, to evaporate the aqueous carrier from the ink image. The heating may also facilitate the reduction of the ink viscosity to enable the transfer conditions from the ITM to the substrate. The ink image may be heated to a temperature at which the residue film of organic polymeric resin and colorant that remains after evaporation of the aqueous carrier is rendered tacky (e.g., by softening of the resin).

The residue film on the surface of the image transfer member may be dry or substantially dry. The film includes the resin and the colorant from the ink formulation. The residue film may further include small amounts of one or more surfactants or dispersants, which are typically water soluble at the PH of the ink (i.e., prior to jetting). The residue film may further include one or more plasticizers.

The ink residue film may be rendered tacky before it reaches the impression cylinder. In this case, the film may cool at the impression station, by its contact with the substrate and exposure to the environment. The already tacky ink film may adhere immediately to the substrate onto which it is impressed under pressure, and the cooling of the film may be sufficient to reduce film adhesion to the image transfer surface to the point that the film peels away neatly from the image transfer member, without compromising adhesion to the substrate.

Tack (or tackiness) may be defined as the property of a material that enables it to bond with a surface on immediate contact under light pressure. Tack performance may be highly related to various viscoelastic properties of the material (polymeric resin, or ink solids). Both the viscous and the elastic properties would appear to be of importance: the viscous properties at least partially characterize the ability of a material to spread over a surface and form intimate contact, while the elastic properties at least partially characterize the bond strength of the material. These and other thermo-rheological properties are rate and temperature dependent.

By suitable selection of the thermo-rheological characteristics of the residue film, the effect of the cooling may be to increase the cohesion of the residue film, whereby its cohesion exceeds its adhesion to the transfer member so that all or substantially all of the residue film is separated from the image transfer member and impressed as a film onto the substrate. In this way, it is possible to ensure that the residue film is impressed on the substrate without significant modification to the area covered by the film nor to its thickness.

Viscosity temperature sweeps—ramp and step—were performed using a Thermo Scientific HAAKE RheoStress® 6000 rheometer having a TM-PE-P Peltier plate temperature module and a P20 Ti L measuring geometry (spindle).

Samples of dried ink residue having a 1 mm depth in a 2 cm diameter module were tested. The samples were dried overnight in an oven at an operating temperature of 100° C. A volume of sample (pellet) was inserted into the 2 cm diameter module and softened by gentle heating. The sample volume was then reduced to the desired size by lowering the spindle to reduce the sample volume to the desired depth of 1 mm.

In temperature ramp mode, the sample temperature was allowed to stabilize at low temperature (typically 25° C. to 40° C.) before being ramped up to a high temperature (typically 160° C. to 190° C.) at a rate of approximately 0.33° C. per second. Viscosity measurements were taken at intervals of approximately 10 seconds. The sample temperature was then allowed to stabilize at high temperature for 120 seconds before being ramped down to low temperature, at a rate of approximately 0.33° C. per second. Again, viscosity measurements were taken at intervals of approximately 10 seconds. Oscillation temperature sweeps were performed at a gamma of 0.001 and at a frequency of 0.1 Hz.

In the specification and in the claims section that follows, values for dynamic viscosity are quantitatively determined solely by the temperature ramp-up and ramp-down method described hereinabove.

Figures 5, 5H, 6, 7:
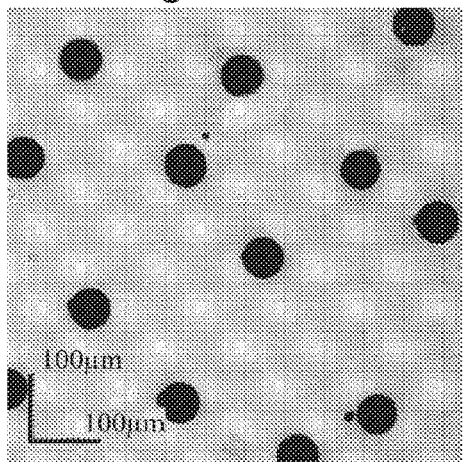

FIG. 7 provides ramped-down temperature sweep plots of dynamic viscosity as a function of temperature, for several dried ink formulations suitable for the ink film construction of the present invention. After reaching a maximum temperature of approximately 160° C., and waiting 120 seconds, the temperature was ramped down as described.

The lowest viscosity curve is that of a dried residue of an inventive yellow ink formulation, containing about 2% pigment solids, and produced according to the procedure described hereinabove. At about 160° C., the rheometer measured a viscosity of about $6.7 \cdot 10^6$ cP. As the temperature was ramped down, the viscosity steadily and monotonically increased to about $6 \cdot 10^7$ cP at 95° C., and to about $48 \cdot 10^7$ cP at 58° C.

The intermediate viscosity curve is that of a dried residue of an inventive cyan ink formulation, containing about 2% pigment solids, and produced according to the procedure described hereinabove. At about 157° C., the rheometer measured a viscosity of about $86 \cdot 10^6$ cP. As the temperature was ramped down, the viscosity increased to about $187 \cdot 10^6$ cP at 94° C., and to about $8 \cdot 10^8$ cP at 57° C.

The highest viscosity curve is that of a dried residue of an inventive black ink formulation, containing about 2% pigment solids, and produced according to the procedure described hereinabove. At about 160° C., the rheometer measured a viscosity of about $196 \cdot 10^6$ cP. As the temperature was ramped down, the viscosity steadily and monotonically increased to about $763 \cdot 10^6$ cP at 95° C., and to about $302 \cdot 10^7$ cP at 59° C.

Figure 8:
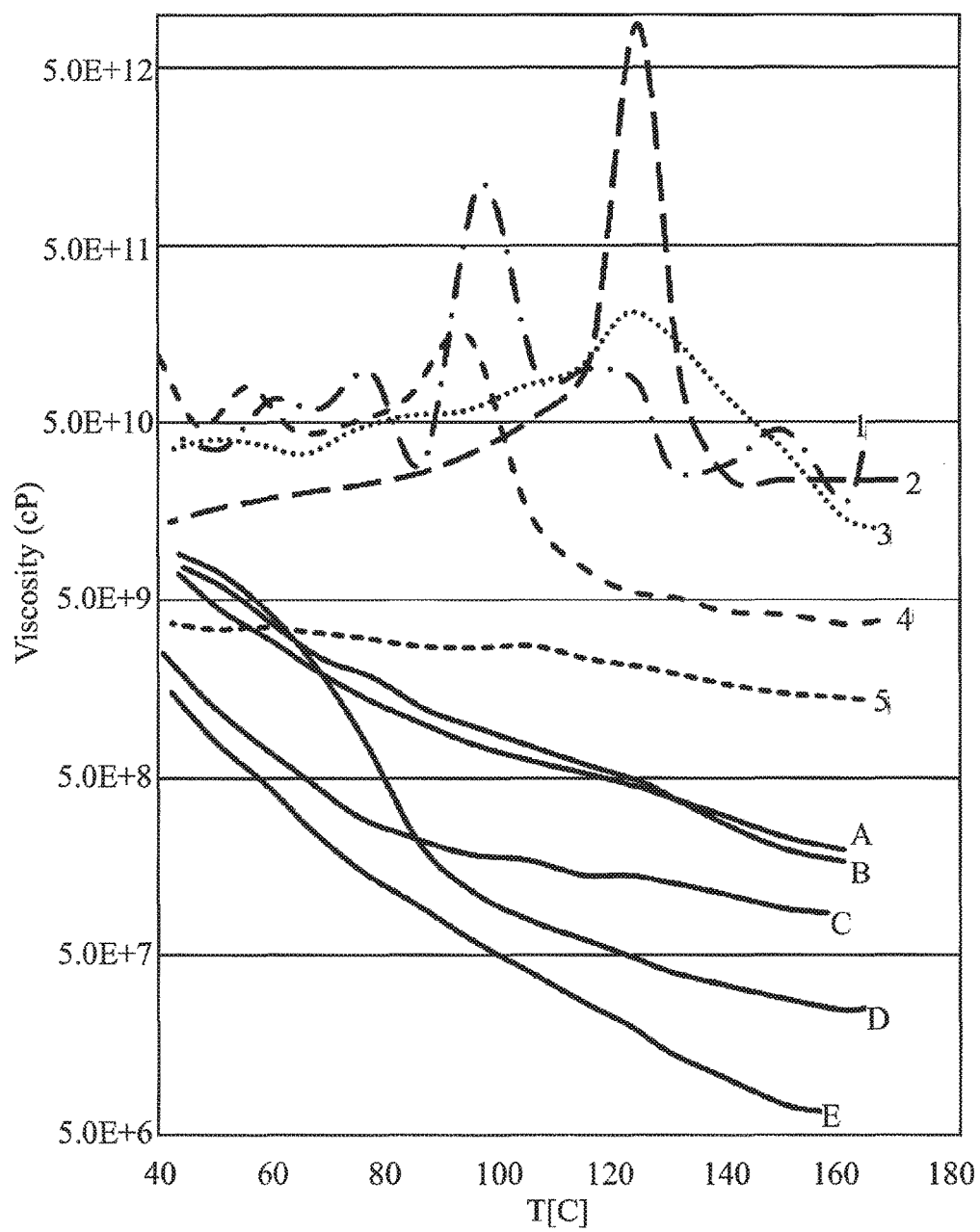
FIG. 8 is a ramped-down temperature sweep plot of dynamic viscosity as a function of temperature, for several ink formulations of the present invention, vs. several commercially available inkjet inks.

FIG. 8 is a ramped-down temperature sweep plot of dynamic viscosity as a function of temperature, for several dried ink formulations of the present invention, vs. several ink residues of prior art ink formulations. The viscosity curves of the prior art formulations are labeled 1 to 5, and are represented by dashed lines; the viscosity curves of the inventive formulations are labeled A to E, and are represented by solid lines. The ink formulations of the present invention include the three previously described in conjunction with FIG. 7 (A=black; C=cyan; and E=yellow), and two ink formulations ("B"; "D") containing about 2%, by weight of solids, of a magenta aqueous pigment preparation [Hostajet Magenta E5B-PT (Clariant)], along with about 6% of various styrene-acrylic emulsions. The residues of the prior art inks were prepared from various commercially available inkjet inks, of different colors.

Figure 9:
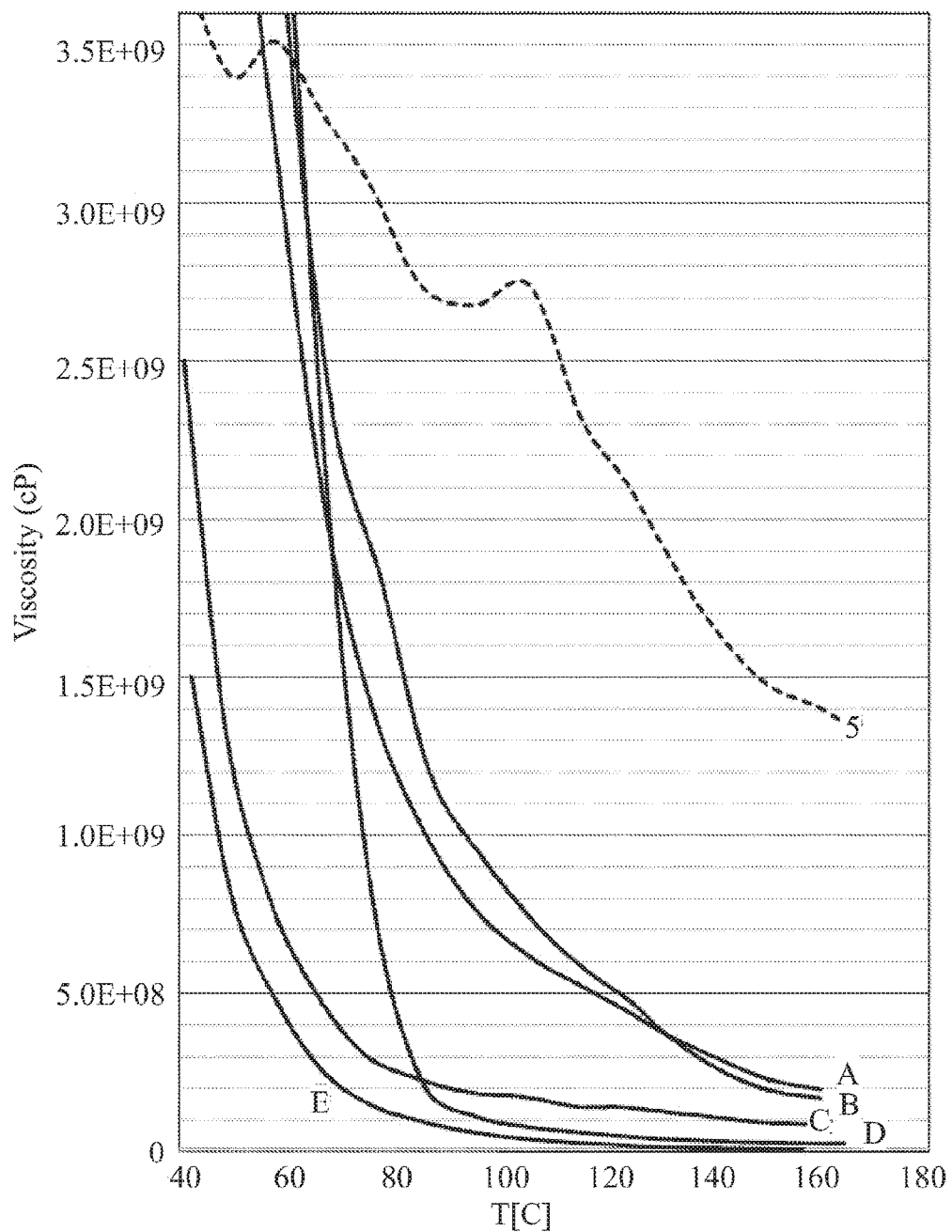
FIG. 9 is a magnified view of the plot of FIG. 8, for lower viscosities.

A magnified view of the plot of FIG. 8, for viscosities of less than $36 \cdot 10^8$, is provided in FIG. 9. Only the viscosity curves of the inventive formulations A to E, and that of prior-art formulation 5, may be seen in FIG. 9.

It is evident from the plots, and from the magnitude of the viscosities, that the dried ink residues of the various prior art ink formulations exhibit no or substantially no flow behavior over the entire measured range of temperatures, up to at least 160° C. The peaks observed at extremely high viscosities in some plots of the prior-art formulations would appear to have no physical meaning. The lowest measured viscosity for each of the prior art residue films was within a range of at least $135 \cdot 10^7$ cP to at least $33 \cdot 10^8$ cP. The lowest value within this ranee, $1.35 \cdot 10^7$ cP, is well over 6 times the highest viscosity value of any of the residues of the inventive ink formulations, at about 160° C.

Moreover, during the ramp-down phase of the experiment, Samples 1 to 5 of the prior art exhibited viscosity values that exceeded the viscosity measured at about 160° C., and/or appear sufficiently high so as to preclude transfer of the film. In practice, the inventors of the present invention successfully transferred all five of the inventive ink films to a printing substrate, but failed to transfer any of the five prior-art ink films to a printing substrate, even after heating to over 160° C.

The inventors have calculated the ratio of a "cold" dynamic viscosity, at least one temperature within a range of 50° C. to 85° C., to the "hot" dynamic viscosity, at least one temperature within a range of 125° C. to 160° C. The inventors believe that this ratio may be important in distinguishing between ink formulations that meet the multiple requirements of the inventive process, and ink formulations that fail to meet the multiple requirements of the inventive process.

Analysis of Ink Film on Printed Substrates
Basic Procedure:

Three sheets of Condat Gloss® paper (135 g/cm², B2, 750×530 mm) were printed on a digital press according to co-pending PCT Application No. PCT/IB2013/051716 (Agent's reference LIP 5/001 PCT), using ink formulations of the present invention (magenta, yellow, cyan and black). After 1 week, the sheets were cut into 3×3 cm pieces and introduced into 300 grams of a solution containing 1% 2-amino-2-methyl-1-propanol dissolved in water able to sufficiently dissolve ink images printed using various water-soluble inks. In this de-inking procedure, the solution was stirred for 10 minutes at room temperature (e.g., circa 23° C.), after which the mixture was filtered through a 10 micron filter. The filtrate, mainly containing the dissolved ink and the pigment particles, was dried using a rotary evaporator. The filtrate residue was then dissolved in 5 grams of dimethyl sulfoxide (DMSO) and was then dried in an oven at 110° C. for 12 hours to yield the "recovered residue".

The thermo-rheological behavior of the recovered residue obtained from the de-inking process was characterized by viscosity measurements in a ramp-up and ramp-down temperature sweep (as described hereinabove). The results obtained are plotted in FIG. 10.

Figure 10:
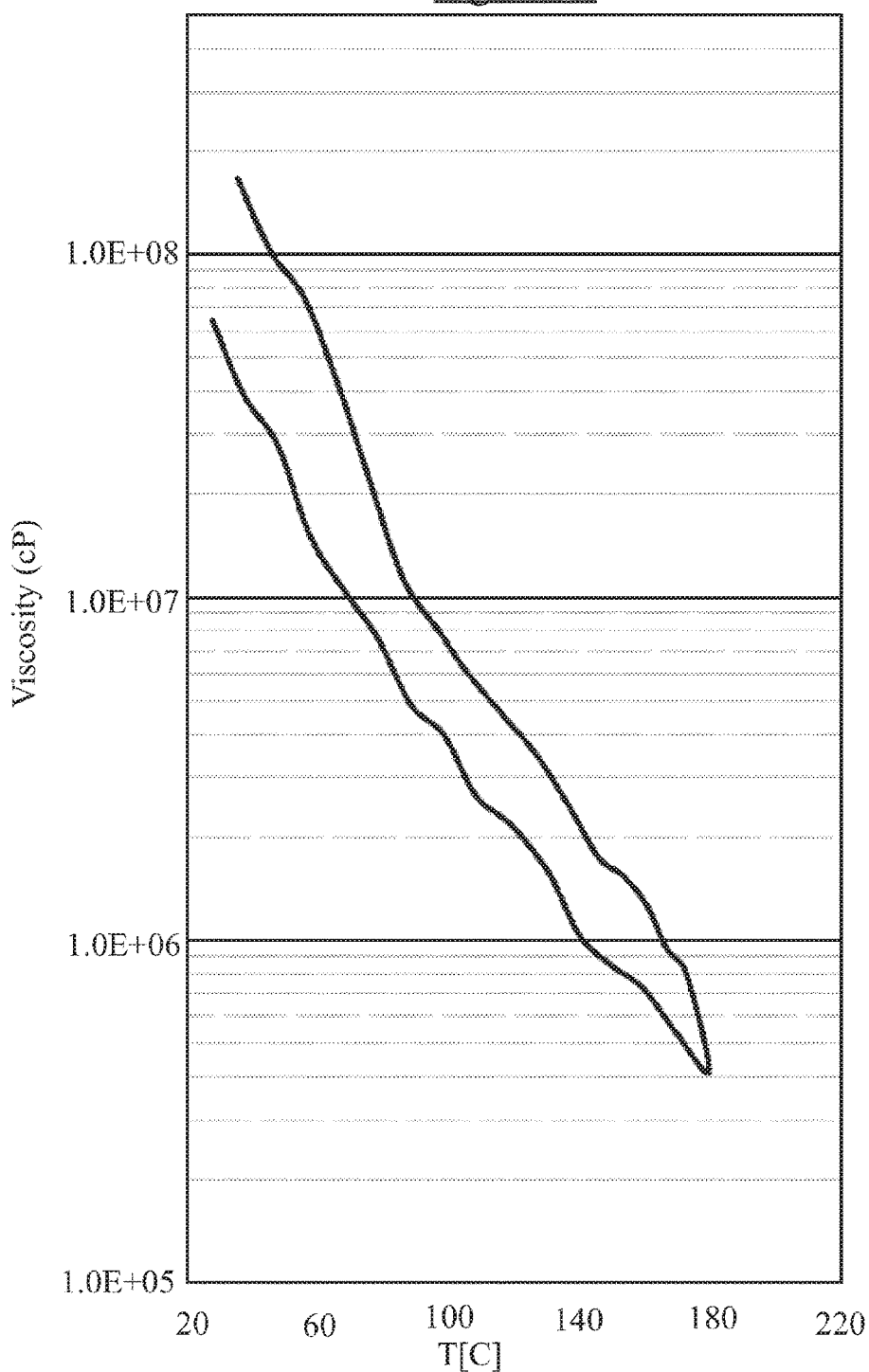
FIG. 10 plots viscosity as a function of temperature for an ink residue recovered from printed films, produced from ink formulations of the present invention.

From FIG. 10 it appears manifest that the thermo-rheological behavior of the ink solids extracted from the printed images is similar to the thermo-rheological behavior characteristic of the dried ink residues produced by directly drying ink formulations of the present invention. It further appears manifest that the thermo-rheological behavior of the recovered residue is markedly different from the thermo-rheological behavior of the dried residues of various water based ink-jet formulations such as samples 1 to 5 (as shown in FIG. 8).

Figure 11:
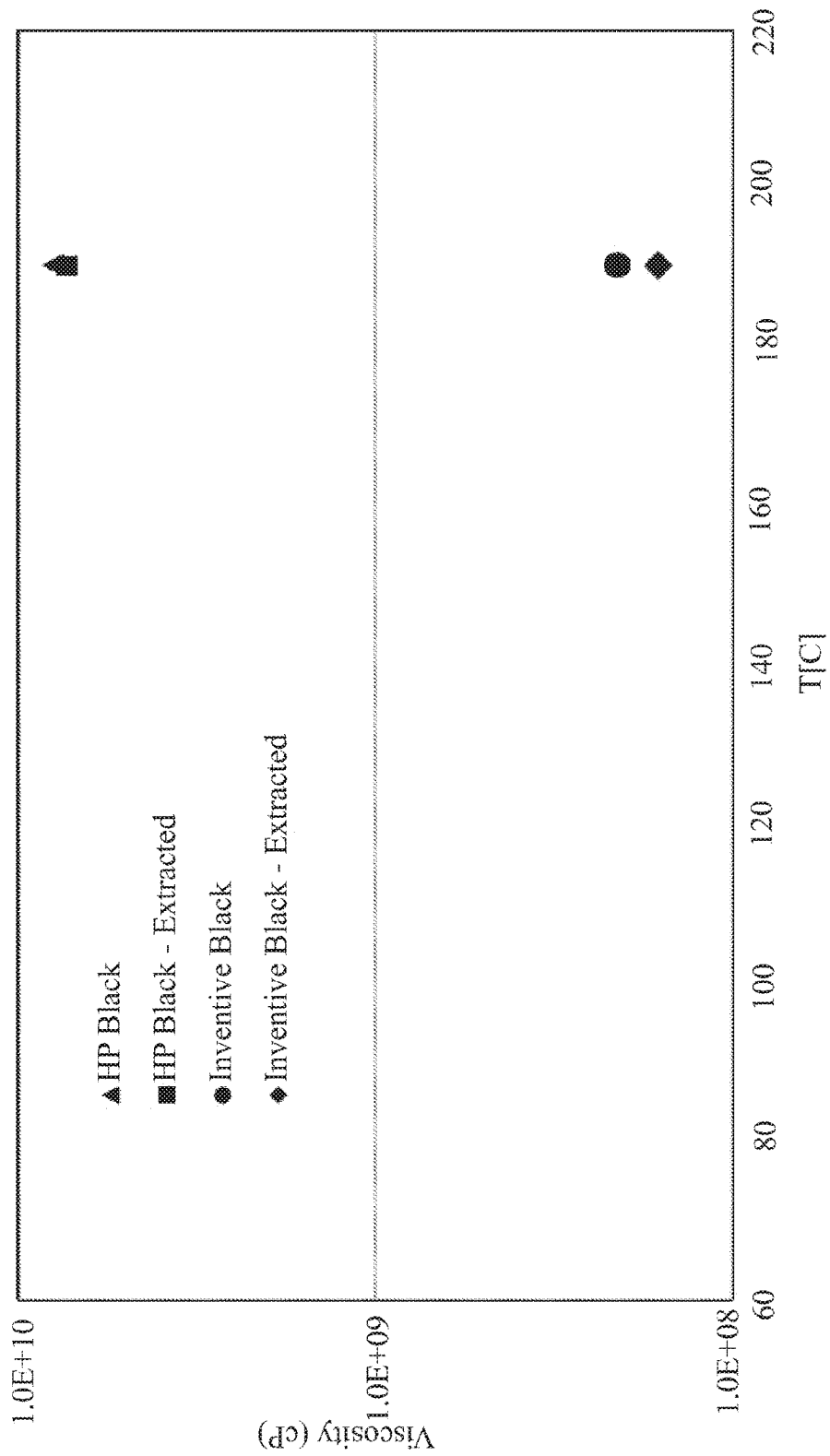
FIG. 11 provides a plot of dynamic viscosity measurements at high temperature for: a dry ink-residue of a black prior-art inkjet formulation; a dry ink-residue recovered from printed images of that prior-art inkjet formulation; a dry ink-residue of a black ink formulation of the present invention; and a dry ink-residue recovered from printed images of that inventive ink formulation.

In another test, HP black inkjet ink (as supplied for use in HP DeskJet 9803) from the cartridge was dried to form a residue. The residue was dissolved in 5 grams of dimethyl sulfoxide (DMSO) and was then dried in an oven at 110° C. for 12 hours. 100 mg of the dry sample was dissolved/dispersed in 0.5 ml of distilled water (or a suitable solvent such as DMSO). After stirring, the liquid material was introduced into a silicon rubber mold. Afterwards the mold was placed on a plate (heated to 250° C.) for 10 minutes. The dry tablet obtained was allowed to cool to room temperature, and was then subjected to a dynamic viscosity measurement at high temperature (~190° C.). The viscosity, in cP, is plotted in FIG. 11.

The identical black inkjet ink was also printed onto several sheets of Condat Gloss® paper using the aforementioned HP inkjet printer. After 1 week, the sheets were cut into small pieces and introduced into a 1% solution of 2-amino-2-methyl-1-propanol in distilled water, substantially as described hereinabove. The flask was stirred for 10 minutes at room temperature, after which the mixture was filtered through a 10 micron filter. The filtrate was dried using a rotary evaporator. The residue was dissolved in 5 grams of dimethyl sulfoxide (DMSO) and was then dried in an oven at 110° C. for 12 hours. 100 mg of the dry sample was dissolved in 0.5 ml of distilled water (or a suitable solvent such as DMSO). After stirring the liquid material was introduced into the silicon rubber mold. Afterwards the mold was placed on a plate (heated to 250° C.) for 10 minutes. The dry tablet obtained from de-inking of the 1-IP inkjet printed samples was allowed to cool to room temperature, and was then subjected to a dynamic viscosity measurement at high temperature (~190° C.). The viscosity, in cP, is plotted in FIG. 11.

The inkjet ink residue obtained by de-inking of the HP samples exhibited a dynamic viscosity that was similar to the dynamic viscosity exhibited by the dried residue of the identical HP inkjet ink.

A similar test was performed for a black ink formulation of the present invention. Dynamic viscosity measurements were conducted at high temperature (~190° C.) for both the dried ink residue and the ink residue recovered according to the above-described procedure. The viscosity of each sample, in cP, is plotted in FIG. 11.

Again, the recovered inkjet ink residue, obtained by de-inking of the inventive ink film constructions, exhibited a dynamic viscosity that was similar to the dynamic viscosity exhibited by the dried residue of the identical inventive inkjet ink.

In a more advanced procedure, 3 sheets of Condat paper (135 g/cm², B2, 750×530 mm) were printed on printed on a printing system as described in co-pending PCT application of the Applicant, No. PCT/IB2013/051716, using inks as herein described, and further detailed in co-pending PCT application No, PCT/IB2013/051755 (Agent's reference LIP 11/001 PCT) using Landa inks, and subjected to the following procedure: after 1 week, the sheets are cut into 3×3 cm pieces and introduced into 300 grams of a solution containing 1% 2-amino-2-methyl-1-propanol dissolved in water, which is able to sufficiently dissolve ink images printed using various water-soluble inks. If, however, the solution remains colorless, the water is separated off and an identical weight of a less polar solvent, ethanol, is introduced. Again, if the solution remains colorless, the solvent is separated off, and an identical weight of a less polar solvent, methyl ethyl ketone, is introduced. The procedure continues with successfully less polar solvents: ethyl acetate, toluene, and Isopar™ (synthetic mixture of isoparaffins). After 5 hours stirring at room temperature with the most appropriate solvent, the mixture is filtered through a 5 micrometer filter. The filtrate or filtrates containing the dissolved ink is dried using a rotary evaporator. The residues are then dissolved in 5 grams of DMSO (or one of the above-listed solvents) and dried in an oven at 110° C. for 12 hours to yield the "recovered residue". Thermo-rheological behavior of the recovered residue is characterized and compared with a dried sample of the original ink, when available.

The inventors attribute the improved thermo-rheological results of this procedure (i.e., appreciably closer to the results obtained by direct drying of inkjet ink) to the increased dissolution of the printed ink, due to both the increased residence time and the use of additional solvents.

Thus, this advanced procedure may advantageously be used to determine the thermo-rheological properties of the dried ink from ink residue recovered from printed matter such as magazines and brochures.

The absolute dynamic viscosity values of the prior-art inkjet ink residues exceed the dynamic viscosity values of the inventive inkjet ink residues by a factor of more than 30-40.

It is manifest that the absolute dynamic viscosity values of the prior-art and inventive inkjet ink residues may be substantially reproduced by measuring the absolute dynamic viscosity values of the corresponding inkjet ink residues recovered from printed images. It is further manifest that this method may be utilized to characterize an inkjet ink residue by reconstituting the ink from printed substrates.

One of ordinary skill in the art will readily appreciate that other, potentially superior, procedures may be used to de-ink a printed substrate and produce the recovered ink residue for rheological, thermo-rheological and/or chemical analysis.

Ink Formulations and Ink Film Compositions

Among other things, the present inkjet inks are aqueous inks, in that they contain water, usually at least 30 wt. % and more commonly around 50 wt. % or more; optionally, one or more water-miscible co-solvents; at least one colorant dispersed or at least partly dissolved in the water and optional co-solvent; and an organic polymeric resin binder, dispersed or at least partly dissolved in the water and optional co-solvent.

It will be appreciated that acrylic-based polymers may be negatively charged at alkaline pH. Consequently, in some embodiments, the resin binder has a negative charge at pH 8 or higher; in some embodiments the resin binder has a negative charge at pH 9 or higher. Furthermore, the solubility or the dispersability of the resin binder in water may be affected by pH. Thus in some embodiments, the formulation includes a pH-raising compound, non-limiting examples of which include diethyl amine, monoethanol amine, and 2-amino-2-methyl propanol. Such compounds, when included in the ink, are generally included in small amounts, e.g., about 1 wt. % of the formulation and usually not more than about 2 wt. % of the formulation.

It will also be appreciated that acrylic-based polymers having free carboxylic acid groups may be characterized in terms of their charge density or, equivalently, the acid number, i.e., the number of milligrams of KOH needed to neutralize one gram of dry polymer. Thus, in some embodiments, the acrylic-based polymer has an acid number in the range of 70-144.

The ink film of the inventive ink film construction contains at least one colorant. The concentration of the at least one colorant within the ink film may be at least 2%, at least 3%, at least 4%, at least 6%, at least 8%, at least 10%, at least 15%, at least 20%, or at least 22%, by weight of the complete ink formulation. Typically, the concentration of the at least one colorant within the ink film is at most 40%, at most 35%, at most 30%, or at most 25%.

More typically, the ink film may contain 2-30%, 3-25%, or 4-25% of the at least one colorant.

The colorant may be a pigment or a dye. The particle size of the pigments may depend on the type of pigment and on the size reduction methods used in the preparation of the pigments. Generally, the $d_{50}$ of the pigment particles may be within a range of 10 nm to 300 nm. Pigments of various particle sizes, utilized to give different colors, may be used for the same print.

The ink film contains at least one resin or resin binder, typically an organic polymeric resin. The concentration of the at least one resin within the ink film may be at least 10%, at least 15%, at least 20%, at least 25%, at least 35%, at least 40%, at least 50%, at least 60%, at least 70%, or at least 80%, by weight.

The total concentration of the colorant and the resin within the ink film may be at least 10%, at least 15%, at least 20%, at least 30%, or at least 40%, by weight. More typically, however, the total concentration of the colorant and the resin within the ink film may be at least 50%, at least 60%, at least 70%, at least 80%, or at least 85%. In many cases, the total concentration of the colorant and the resin within the ink film may be at least 90%, at least 95%, or at least 97% of the ink film weight.

Within the ink film, the weight ratio of the resin to the colorant may be at least 1:1, at least 2:1, at least 2.5:1, at least 3:1, at least 4:1, at least 5:1, or at least 7:1.

The weight ratio of the resin to the colorant within the ink film constructions of the invention may be at most 15:1, at most 12:1, or at most 10:1. In some applications, particularly when it is desirable to have an ultra-thin ink film laminated onto the printing substrate, the weight ratio of the resin to the colorant may be at most 7:1, at most 5:1, at most 3:1, at most 2.5:1, at most 2:1, at most 1.7:1, at most 1.5:1 at most 1.2:1, at most 1:1, at most 0.75:1, or at most 0.5:1.

Specific resins that may be suitable for use in the inventive ink formulation, system, and process of the present invention include water-soluble acrylic styrene copolymers within a particular range of molecular weights and a low glass transition temperature ($T_g$). Commercial examples of such copolymers may include Joncryl® HPD 296, Joncryl® 142E, Joncryl® 637, Joncryl® 638, and Joncryl® 8004; Neocryl® BT-100 Neocryl® BT-26, Neocryl® BT-9, and Neocryl® BT-102.

Nominally, the resin solution or dispersion may be, or include, an acrylic styrene co-polymer (or co(ethylacrylate metacrylic acid) solution or dispersion. The acrylic styrene co-polymer from the ink formulation ultimately remains in the ink film adhering to the printing substrate.

The average molecular weight of the acrylic styrene co-polymer (or co(ethylacrylate metacrylic acid) may be less than 100,000, less than 80,000, less than 70,000, less than 60,000, less than 40,000, or less than 20,000 g/mole.

The average molecular weight of the acrylic styrene co-polymer may be at least 10,000, at least 12,000, at least 13,000, or at least 14,000, and in some cases, at least 16,000, or at least 18,000 g/mole.

In one embodiment, the ink film in the ink film constructions according to the present invention is devoid or substantially devoid of wax. Typically, the ink film according to the present invention contains less than 30% wax, less than 20% wax, less than 15% wax, less than 10% wax, less than 7% wax, less than 5% wax, less than 3% wax, less than 2% wax, or less than 1% wax.

In one embodiment, the ink film according to the present invention is devoid or substantially devoid of oils such as mineral oils and vegetable oils (e.g., linseed oil and soybean oil), or various oils used in offset ink formulations. Typically, the ink film according to the present invention contains at most 20%, at most 12%, at most 8%, at most 5%, at most 3%, at most 1%, at most 0.5%, or at most 0.1%, by weight, of one or more oils, cross-linked fatty acids, or fatty acid derivatives produced upon air-drying.

In one embodiment, the ink film according to the present invention is devoid or substantially devoid of one or more salts, including salts used to coagulate or precipitate ink on a transfer member or on a substrate (e.g., calcium chloride). Typically, the ink film according to the present invention contains at most 8%, at most 5%, at most 4%, at most 3%, at most 1%, at most 0.5%, at most 0.3%, or at most 0.1% of one or more salts.

In one embodiment, the ink film according to the present invention is devoid or substantially devoid of one or more photoinitiators. Typically, the ink film according to the present invention contains at most 2%, at most 1%, at most 0.5%, at most 0.3%, at most 0.2%, or at most 0.1% of one or more photoinitiators.

In one embodiment, the printing substrate of the inventive ink film construction is devoid or substantially devoid of one or more soluble salts, including salts used for, or suitable for coagulating or precipitating ink, or components thereof, on the substrate (e.g., calcium chloride). In one embodiment, the printing substrate of the inventive ink film construction contains, per 1 m² of paper, at most 100 mg of soluble salts, at most 50 mg of soluble salts, or at most 30 mg of soluble salts, and more typically, at most 20 mg of soluble salts, at most 10 mg, of soluble salts, at most 5 mg of soluble salts, or at most 2 mg of soluble salts.

In one embodiment, the ink film in the ink film constructions according to the present invention contains at most 5%, at most 3%, at most 2%, at most 1%, or at most 0.5%, by weight, of inorganic filler particles such as silica.

In one embodiment, the dried resins present in the ink film of the invention may have a solubility of at least 3%, at least 5%, or at least 10% in water, at at least one particular temperature within a temperature range of 20° C. to 60° C., at a pH within a range of 8 to 10 or within a range of 8 to 11.

In one embodiment, the recovered ink film of the invention may have a solubility of at least 3%, at least 5%, or at least 10% in water, at at least one particular temperature within a temperature range of 20° C. to 60° C., at a pH within a range of 8 to 10 or within a range of 8 to 11.

Waterfastness of Print Images

ASTM Standard F2292-03 (2008), "Standard Practice for Determining the Waterfastness of Images Produced by Ink Jet Printers Utilizing Four Different Test Methods—Drip, Spray, Submersion and Rub", may be used to assess the waterfastness of ink dots and films printed on various substrates. The inventors used three of these test methods: drip, spray, and submersion, to evaluate waterfastness.

In all three tests, the inventive ink film constructions exhibited complete waterfastness; no ink bleeding, smearing or transfer was observed.

Identification of Nitrogen-Based Conditioners in a Printed Image on a Substrate

When, prior to printing, the outer surface of the ITM is pre-treated or conditioned with a chemical agent that is, or contains, at least one nitrogen-based conditioning agent such as a polyethylene imine (PEI), transfer of the printed image to a substrate may typically result in at least some of the nitrogen-based conditioner being transferred as well. This conditioner may be detected using X-ray photoelectron spectroscopy (XPS) or by other means that will be known to those of ordinary skill in the art of polymer analysis or chemical analysis of polymers or organic nitrogen-containing species.

In one exemplary demonstration, two printed paper substrates were prepared under substantially identical conditions (including: inkjetting aqueous inkjet ink having nano-pigment particles onto a transfer member; drying the ink on the transfer member; and transferring the ink film produced to the particular substrate), except that the first substrate was printed without preconditioning of the transfer member, while for the second substrate the ITM was conditioned with a polyethylene imine. XPS analysis of the printed images was conducted using a VG Scientific Sigma Probe and monochromatic Al Kα x-rays at 1486.6 eV having a beam size of 400 μm. Survey spectra were recorded with a pass energy of 150 eV. For chemical state identification of nitrogen, high energy resolution measurements of N1s were performed with a pass energy of 50 eV. The core level binding energies of the different peaks were normalized by setting the binding energy for the C1s at 285.0 eV. Deconvolution of the observed peaks revealed that the PEI pre-treated sample contained a unique peak at about 402 eV, which corresponds to a C—$NH_2^+$—C group.

Thus, in some embodiments of the invention, there is provided a printed ink image having an XPS peak at 402.0±0.4 eV, 402.0±0.3 eV, or 402.0±0.2 eV.

Inventors have found that at the top or upper surface of the film, distal to the top surface of the substrate, the surface concentration of nitrogen may appreciably exceed the concentration of nitrogen within the bulk of the film. The concentration of nitrogen within the bulk of the film may be measured at a depth of at least 30 nanometers, at least 50 nanometers, at least 100 nanometers, at least 200 nanometers, or at least 300 nanometers below the upper film surface.

In some embodiments, the ratio of the surface nitrogen concentration to a nitrogen concentration within the bulk of the film is at least 1.1:1, at least 1.2:1, at least 1.3:1, at least 1.5:1, at least 1.75:1, at least 2:1, at least 3:1, or at least 5:1.

In some embodiments, the ratio of nitrogen to carbon (N/C) at the upper film surface to a ratio of nitrogen to carbon (N/C) within the bulk of the film is at least 1.1:1, at least 1.2:1, at least 1.3:1, at least 1.5:1, at least 1.75:1, or at least 2:1.

In some embodiments, the concentration of a secondary amine group at the upper film surface exceeds a concentration of a secondary amine group within the bulk of the film.

In some embodiments, the concentration of a tertiary amine group at the upper film surface exceeds a concentration of a tertiary amine group within the bulk of the film.

In some embodiments, the concentration of secondary and tertiary amine groups at the upper film surface exceeds a concentration of secondary and tertiary amine groups within the bulk of the film.

In some embodiments, the upper film surface contains at least one PEI.

In some embodiments, the upper film surface contains at least one poly quaternium cationic guar, such as a guar hydroxypropyltrimonium chloride, and a hydroxypropyl guar hydroxypropyltrimonium chloride.

In some embodiments, the upper film surface contains a polymer having quaternary amine groups, such as an HCl salt of various primary amities.

As used herein in the specification and in the claims section that follows, the term "colorant" refers to a substance that is considered, or would be considered to be, a colorant in the art of printing.

As used herein in the specification and in the claims section that follows, the term "pigment" refers to a finely divided solid colorant having an average particle size ($D_{50}$) of at most 300 nm. Typically, the average particle size is within a range of 10 nm to 300 nm. The pigment may have an organic and/or inorganic composition. Typically, pigments are insoluble in, and essentially physically and chemically unaffected by, the vehicle or medium in which they are incorporated. Pigments may be colored, fluorescent, metallic, magnetic, transparent or opaque.

Pigments may alter appearance by selective absorption, interference and/or scattering of light. They are usually incorporated by dispersion in a variety of systems and may retain their crystal or particulate nature throughout the pigmentation process.

As used herein in the specification and in the claims section that follows, the term "dye" refers to at least one colored substance that is soluble or goes into solution during the application process and imparts color by selective absorption of light.

As used herein in the specification and in the claims section that follows, the term "average particle size", or "$d_{50}$", with reference to the particle size of pigments, refers to an average particle size, by volume, as determined by a laser diffraction particle size analyzer (e.g., Mastersizer™ 2000 of Malvern Instruments, England), using standard practice.

With regard to fibrous printing substrates, persons skilled in the printing arts will appreciate that coated papers used for printing may be generally classified, functionally and/or chemically, into two groups, coated papers designed for use with non-inkjet printing methods (e.g., offset printing) and coated papers designed specifically for use with inkjet printing methods employing aqueous inks. As is known in the art, the former type of coated papers utilize mineral fillers not only to replace some of the paper fibers in order to reduce costs, but to impart specific properties to paper, such as improved printability, brightness, opacity, and smoothness. In paper coating, minerals are used as white pigments to conceal the fiber, thereby improving brightness, whiteness, opacity, and smoothness. Minerals commonly used to this end are kaolin, calcined clay, ground calcium carbonate, precipitated calcium carbonate, talc, gypsum, alumina, satin white, blanc fixe, zinc sulfide, zinc oxide, and plastic pigment (polystyrene).

Coated papers designed for use in non-inkjet printing methods have hitherto been unsuitable for use with aqueous inkjet inks, or produce print dots or splotches that may be manifestly different from the printed ink film constructions of the present invention.

In contrast, specialty coated papers designed for use with inkjet inks, which in some cases may have layer of filler pigment as with other types of coated papers, may also include a layer of highly porous mineral, usually silica, in combination with a water-soluble polymer such as polyvinyl alcohol (PVA) or polyvinyl pyrrolidone (PVP), which acts as a binder, upon which the ink is printed. Such coated inkjet papers are designed to quickly remove the water from the printed ink, facilitating the printing of ink droplets with good uniformity and edge roughness. The present invention encompasses ink droplets printed on uncoated paper as well as coated paper not designed for inkjet use, but some embodiments of the present invention are not intended to encompass ink droplets printed on special coated inkjet paper.

Thus, in some embodiments, the substrate is an uncoated paper. In other embodiments, the substrate is a coated paper that does not contain a water-soluble polymer binder in a layer upon which the ink is printed.

As used herein in the specification and in the claims section that follows, the term "commodity coated fibrous printing substrate" is meant to exclude specialty and high-end coated papers, including photographic paper and coated inkjet papers.

In a typical paper coating of a commodity coated fibrous printing substrate, the coating formulation may be prepared by dispersing pigments, such as kaolin clay and calcium carbonate into water, then adding in binder, such as polystyrene butadiene copolymer and/or an aqueous solution of cooked starch. Other paper coating ingredients, such as rheological modifiers, biocides, lubricants, antifoaming compounds, crosslinkers, and pH adjusting additives may also be present in small amounts in the coating.

Examples of pigments that can be used in coating formulations are kaolin, calcium carbonate (chalk), China clay, amorphous silica, silicates, barium sulfate, satin white, aluminum trihydrate, talcum, titanium dioxide and mixtures thereof. Examples of binders are starch, casein, soy protein, polyvinylacetate, styrene butadiene latex, acrylate latex, vinylacrylic latex, and mixtures thereof. Other ingredients that may be present in the paper coating are, for example, dispersants such as polyacrylates, lubricants such as stearic acid salts, preservatives, antifoam agents that can be either oil based, such as dispersed silica in hydrocarbon oil, or water-based such as hexalene glycol, pH adjusting agents such as sodium hydroxide, rheology modifiers such as sodium alginates, carboxymethylcellulose, starch, protein, high viscosity hydroxyethylcellulose, and alkali-soluble lattices.

As used herein in the specification and in the claims section that follows, the term "fibrous printing substrate" of the present invention is specifically meant to include:
Newsprint papers including standard newsprint, telephone directory paper, machine-finished paper, and super-calendered paper;
Coated mechanical papers including light-weight coated paper, medium-weight coated paper, high-weight coated paper, machine finished coated papers, film coated offset;
Woodfree uncoated papers including offset papers, light-weight papers;
Woodfree coated papers including standard coated fine papers, low coat weight papers, art papers;
Special fine papers including copy papers, digital printing papers, continuous stationery;
Paperboards and Cartonboards; and
Containerboards.

As used herein in the specification and in the claims section that follows, the term "fibrous printing substrate" of the present invention is specifically meant to include all five types of fibrous offset substrates described in ISO 12647-2.

The patent or application file contains at least one drawing executed in color. Copies of this patent or patent application publication with color drawing(s) will be provided by the Office upon request and payment of the necessary fee.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, including the appendices, are hereby incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:
1. A method for preparing an ink dot construction which ink dot construction comprises:
(a) a printing substrate selected from the group consisting of an uncoated fibrous printing substrate, a commodity coated fibrous printing substrate, and a plastic printing substrate; and
(b) an ink dot set contained within a square geometric projection projecting on said first printing substrate, said ink dot set containing at least 10 distinct ink dots, fixedly adhered to a surface of said first printing substrate, all said ink dots within said square geometric projection being counted as individual members of said set, each of said ink dots containing at least one colorant dispersed in an organic polymeric resin, each of said dots having an average thickness of less than 2,000 nm, and a diameter of 5 to 300 micrometers;
each ink dot of said ink dots having a generally convex shape in which a deviation from convexity, ($DC_{dot}$), is defined by:

$$DC_{dot} = 1 - AA/CSA,$$

AA being a calculated projected area of said dot, said area disposed generally parallel to said first fibrous printing substrate; and CSA being a surface area of a convex shape that minimally bounds a contour of said projected area; wherein a mean deviation from convexity ($DC_{dotmean}$) of said ink dot set is at most 0.05;

the method comprising:
(iii) depositing onto a silicone release layer of an intermediate transfer member of a printing system, via a plurality of ink-jet printing heads, a plurality of droplets of a water-based ink formulation, the depositing being conducted such that each droplet spreads on impinging upon the intermediate transfer member to form a flattened liquid ink droplet, whereby to form a plurality of flattened liquid ink droplets;
(iv) heating the flattened liquid ink droplets sufficiently rapidly so as to dry them sufficiently to prevent their beading on said release layer and to produce a residue film;
(v) transferring the residue film from the silicone release layer to said substrate;
wherein said water-based ink formulation comprises (a) a solvent containing water and, optionally, a co-solvent, said water constituting at least 8 wt. % of the formulation; (b) at least one colorant dispersed or at least partly dissolved within said solvent, said colorant constituting at least 1 wt. % of the formulation; and (c) an organic polymeric resin having an average molecular weight of at least 8,000 which is dispersed or at least partially dissolved within said solvent, the resin constituting 6 to 40 wt. % of the formulation, the ink formulation being characterized in that the weight ratio of the resin to the colorant is at least 1.5:1.

2. The method of claim 1, further comprising, before said depositing,
(i) applying to said silicone release layer an aqueous solution or dispersion of a polymeric chemical agent which reduces the hydrophobic effect of the silicone layer, the chemical agent having at least one of (a) a positive charge density of at least 3 meq/g of chemical agent and an average molecular weight of at least 5,000, (b) a positive charge density of at least 6 meq/g of chemical agent and an average molecular weight of at least 1,000, (c) a nitrogen content of at least 1 wt. % and an average molecular weight of at least 50,000, and (d) a nitrogen content of at least 18 wt. % and an average molecular weight of at least 10,000; and
(ii) removing the aqueous solvent of said chemical agent.

3. A method for preparing an ink dot construction which ink dot construction comprises:
(a) a printing substrate selected from the group consisting of an uncoated fibrous printing substrate, a commodity coated fibrous printing substrate, and a plastic printing substrate; and
(b) an ink dot set contained within a square geometric projection projecting on said first printing substrate, said ink dot set containing at least 10 distinct ink dots, fixedly adhered to a surface of said first printing substrate, all said ink dots within said square geometric projection being counted as individual members of said set, each of said ink dots containing at least one colorant dispersed in an organic polymeric resin, each of said dots having an average thickness of less than 2,000 nm, and a diameter of 5 to 300 micrometers;

each ink dot of said ink dots having a generally convex shape in which a deviation from convexity, ($DC_{dot}$), is defined by:

$$DC_{dot}=1-AA/CSA,$$

AA being a calculated projected area of said dot, said area disposed generally parallel to said first fibrous printing substrate; and CSA being a surface area of a convex shape that minimally bounds a contour of said projected area; wherein a mean deviation from convexity ($DC_{dotmean}$) of said ink dot set is at most 0.05;

the method comprising:
(iii) depositing onto a silicone release layer of an intermediate transfer member of a printing system, via a plurality of ink-jet printing heads, a plurality of droplets of a water-based ink formulation, the depositing being conducted such that each droplet spreads on impinging upon the intermediate transfer member to form a flattened liquid ink droplet, whereby to form a plurality of flattened liquid ink droplets;
(iv) heating the ink films sufficiently rapidly so as to dry them sufficiently to prevent their beading on said release layer and to produce a residue film; and
(v) transferring the residue film from the silicone release layer to said substrate;
wherein said water-based ink formulation comprises (a) a solvent containing water and, optionally, a co-solvent, said water constituting at least 8 wt. % of the formulation; (b) at least one colorant dispersed or at least partly dissolved within said solvent, said colorant constituting at least 1 wt. % of the formulation; and (c) an organic polymeric resin having an average molecular weight of at least 8,000 which is dispersed or at least partially dissolved within said solvent, the resin constituting 6 to 40 wt. % of the formulation, the ink formulation being characterized in that is has at least one of (i) a viscosity of 2 to 25 cP at at least one temperature in the range of 20-60° C. and (ii) a surface tension of not more than 50 milliNewton/m at at least one temperature in the range of 20-60° C.

4. The method of claim 3, further comprising, before said depositing,
(i) applying to said silicone release layer an aqueous solution or dispersion of a polymeric chemical agent which reduces the hydrophobic effect of the silicone layer, the chemical agent having at least one of (a) a positive charge density of at least 3 meq/g of chemical agent and an average molecular weight of at least 5,000, (b) a positive charge density of at least 6 meq/g of chemical agent and an average molecular weight of at least 1,000, (c) a nitrogen content of at least 1 wt. % and an average molecular weight of at least 50,000, and (d) a nitrogen content of at least 18 wt. % and an average molecular weight of at least 10,000; and
(ii) removing the aqueous solvent of said chemical agent.

5. The method of claim 2, wherein said colorant comprises a pigment or mixture of pigment, at least one said pigment having an average particle size ($D_{50}$) in the range of from 20 to 120 nm inclusive.

6. The method of claim 2 wherein the ink is such that, when substantially dried, (a) at at least one temperature in the range of 90° C. to 195° C., the dried ink has a first dynamic viscosity in the range of 1,000,000 ($1 \times 10^6$) cP to 300,000,000 ($3 \times 10^8$) cP, and (b) at at least one temperature in the range of 50° C. to 85° C., the dried ink has a second dynamic viscosity of at least 80,000,000 ($8 \times 10^7$) cP, wherein the second dynamic viscosity exceeds the first dynamic viscosity.

7. The method of claim 2, wherein the polymeric resin is an acrylic-based polymer selected from an acrylic polymer and an acrylic-styrene copolymer.

8. The method of claim 2, wherein the ink formulation further comprises a surfactant, in addition to the polymeric resin, colorant, water and optional co-solvent, said surfactant being present in an amount of not more than 2 wt. %.

9. The method of claim 2, wherein the ink formulation, when substantially dried, has a $T_g$ of at most 50° C.

10. The method of claim 2, wherein said heating comprises first heating the flattened liquid ink droplets sufficiently rapidly so as to dry them sufficiently to prevent their beading on said release layer, and further heating them to produce a residue film.

11. The method of claim 2, wherein after removing the solvent from said chemical agent, said chemical agent forms a coating of not more than 300 nm thickness on said release layer.

12. The method of claim 11, wherein the ratio of charges in the ink droplets to the charges in the chemical agent in the region covered by said ink droplets is at least 2:1.

13. The method of claim 12, wherein the charge density of the chemical agent is at least 6 meq/g.

14. The method of claim 13, wherein the charge density of said coating is at least 12 meq/m$^2$.

15. The method of claim 4, wherein the printing substrate is a fibrous printing substrate selected from the group consisting of an uncoated fibrous printing substrate and a commodity coated fibrous printing substrate; and said ink dot set comprises a plurality of ink dots, each said ink dot covering a continuous area of said top substrate surface; each said ink dot being disposed entirely above said continuous area, such that a projected perpendicular line, extending down towards said top substrate surface, first meets said ink dot, before meeting said top substrate surface, at every point in said continuous area;

each said ink dot having a diameter of 15 to 300 micrometers;

each of said ink dots being characterized by a dimensionless aspect ratio ($R_{aspect}$) defined by:

$$R_{aspect} = D_{dot}/H_{dot}$$

wherein $D_{dot}$ is said diameter; and $H_{dot}$ is said average thickness;

said aspect ratio being at least 50, each of said ink dots having an average or characteristic thickness of at most 1,800 nm.

* * * * *